US012641234B2

(12) United States Patent
Kanoh et al.

(10) Patent No.: US 12,641,234 B2
(45) Date of Patent: *May 26, 2026

(54) ENCODER, DECODER, ENCODING METHOD, AND DECODING METHOD

(71) Applicant: Panasonic Intellectual Property Corporation of America, Torrance, CA (US)

(72) Inventors: Ryuichi Kanoh, Osaka (JP); Tadamasa Toma, Osaka (JP); Kiyofumi Abe, Osaka (JP); Takahiro Nishi, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/002,158

(22) Filed: Dec. 26, 2024

(65) Prior Publication Data

US 2025/0133207 A1     Apr. 24, 2025

Related U.S. Application Data

(63) Continuation of application No. 18/522,760, filed on Nov. 29, 2023, now Pat. No. 12,219,137, which is a
(Continued)

(51) Int. Cl.
*H04N 19/12*          (2014.01)
*H04N 19/154*         (2014.01)
(Continued)

(52) U.S. Cl.
CPC ........... *H04N 19/12* (2014.11); *H04N 19/154* (2014.11); *H04N 19/157* (2014.11); *H04N 19/61* (2014.11)

(58) Field of Classification Search
None
See application file for complete search history.

(56) References Cited

U.S. PATENT DOCUMENTS 10,142,657 B2   11/2018  Lee
11,044,481 B2    6/2021  Ohkawa
(Continued)

FOREIGN PATENT DOCUMENTS

WO      WO-2017058615 A1 *   4/2017   ............. H04N 19/18

OTHER PUBLICATIONS

International Search Report (ISR) issued on Sep. 4, 2018 in International (PCT) Application No. PCT/JP2018/024076.
(Continued)

*Primary Examiner* — Tyler W. Sullivan
(74) *Attorney, Agent, or Firm* — Wenderoth, Lind & Ponack, L.L.P.

(57) ABSTRACT

An encoder that encodes a video includes a processor and memory. Using the memory, the processor: derives a prediction error of an image included in the video, by subtracting a prediction image of the image from the image; determines a secondary transform basis based on a primary transform basis, the primary transform basis being a transform basis for a primary transform to be performed on the prediction error, the secondary transform basis being a transform basis for a secondary transform to be performed on a result of the primary transform; performs the primary transform on the prediction error using the primary transform basis; performs the secondary transform on a result of the primary transform using the secondary transform basis; performs quantization on a result of the secondary transform; and encodes a result of the quantization as data of the image.

4 Claims, 37 Drawing Sheets

| PRIMARY TRANSFORM BASIS CANDIDATE | VERTICAL DCT2 HORIZONTAL DCT2 | VERTICAL DCT2 HORIZONTAL DST7 | VERTICAL DST7 HORIZONTAL DCT2 | VERTICAL DST7 HORIZONTAL DST7 | TRANSFORM BASIS 1a ... |
|---|---|---|---|---|---|
| | | TRANSFORM BASIS 2a | TRANSFORM BASIS 2b | TRANSFORM BASIS 2c | NO TRANSFORM | VERTICAL TRANSFORM BASIS 2a1 HORIZONTAL TRANSFORM BASIS 2a2 ... |
| SECONDARY TRANSFORM BASIS CANDIDATE | TRANSFORM BASIS 2e | TRANSFORM BASIS 2f | VERTICAL TRANSFORM BASIS 2c1 HORIZONTAL TRANSFORM BASIS 2c2 | | |
| | VERTICAL TRANSFORM BASIS 2a1 HORIZONTAL TRANSFORM BASIS 2a2 | | | | |

Related U.S. Application Data continuation of application No. 17/732,693, filed on Apr. 29, 2022, now Pat. No. 11,870,992, which is a continuation of application No. 16/728,784, filed on Dec. 27, 2019, now abandoned, which is a continuation of application No. PCT/JP2018/024076, filed on Jun. 26, 2018.

(60) Provisional application No. 62/528,193, filed on Jul. 3, 2017.

(51) Int. Cl.
  *H04N 19/157* (2014.01)
  *H04N 19/61* (2014.01)

(56) References Cited

U.S. PATENT DOCUMENTS

| | | | |
|---|---|---|---|
| 11,070,837 | B2 | 7/2021 | Kanoh |
| 11,284,071 | B2 | 3/2022 | Lu |
| 11,375,207 | B2 | 6/2022 | Ohkawa |
| 11,870,992 | B2 | 1/2024 | Kanoh |
| 2013/0003856 | A1 | 1/2013 | Saxena |
| 2014/0254661 | A1 | 9/2014 | Saxena |
| 2016/0241868 | A1 | 8/2016 | Li |
| 2017/0026644 | A1 | 1/2017 | Lee |
| 2017/0048553 | A1 | 2/2017 | Mukherjee et al. |
| 2017/0094313 | A1 | 3/2017 | Zhao |
| 2017/0094314 | A1 | 3/2017 | Zhao |
| 2018/0352220 | A1 | 12/2018 | He |
| 2020/0053365 | A1 | 2/2020 | Aono |
| 2020/0213626 | A1 | 7/2020 | Ikai |
| 2022/0394299 | A1 | 12/2022 | Tsukuba |

OTHER PUBLICATIONS

H.265 (ISO/IEC 23008-2 High Efficiency video coding (HEVC)), Dec. 1, 2013.

Youji Shibahara, et al., "CE7: Mode Dependent 2-step Transform for Intra Coding", Joint Collaborative Team on Video Coding (JCT-VC) of ITU-T SG16 WP3 and ISO/IEC JTC1/SC29/WG11, Document: JCTVC-F224, Jul. 2011.

Office Action and Search Report issued Nov. 19, 2021 in corresponding Taiwanese Patent Application No. 107122143, with English translation of Search Report.

Shibahara, Youji et al., "Mode Dependent 2-step Transform for Intra Coding", Joint Collaborative Team on Video Coding (JCT-VC) of ITU-T SG16 WP3 and ISO/IEC JTC1/SC29/WG11, JCTVC-D151, Jan. 2011, pp. 1-4.

Zhao, X. et al., "TU-level non-separable secondary transform", Joint Video Exploration Team (JVET) of ITU-T SG 16 WP3 and ISO/IEC JTC1/SC29/WG11, JVET-B0059, 2nd Meeting: San Diego, USA, Feb. 2016, pp. 1-5.

Chen, Jianle et al., "Algorithm Description of Joint Exploration Test Model 2", Joint Video Exploration Team (JVET) of ITU-T SG 16 WP 3 and ISO/IEC JTC1/SC29/WG11, JVET-B1001_v3, 2nd Meeting: San Diego, USA, Mar. 2016, pp. i-ii, 1-3, 20-24.

Search Report issued Nov. 7, 2022 in Taiwan Patent Application No. 111128772, with English language translation.

* cited by examiner

| TRANSFORM TYPE | BASIS FUNCTION $T_i(j)$, $i, j = 0, 1, ..., N \cdot 1$ |
|---|---|
| DCT - II | $T_i(j) = \omega_0 \cdot \sqrt{\dfrac{2}{N}} \cdot \cos\left(\dfrac{\pi \cdot i \cdot (2j+1)}{2N}\right)$ <br><br> WHERE $\omega_0 = \begin{cases} \sqrt{\dfrac{2}{N}} & i = 0 \\ 1 & i \neq 0 \end{cases}$ |
| DCT - V | $T_i(j) = \omega_0 \cdot \omega_1 \cdot \sqrt{\dfrac{2}{2N \cdot 1}} \cdot \cos\left(\dfrac{2\pi \cdot i \cdot j}{2N \cdot 1}\right)$ <br><br> WHERE $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT - VIII | $T_i(j) = \sqrt{\dfrac{4}{2N+1}} \cdot \cos\left(\dfrac{\pi \cdot (2i+1) \cdot (2j+1)}{4N+2}\right)$ |
| DST - I | $T_i(j) = \sqrt{\dfrac{2}{N+1}} \cdot \sin\left(\dfrac{\pi \cdot (i+1) \cdot (j+1)}{N+1}\right)$ |
| DST - VII | $T_i(j) = \sqrt{\dfrac{4}{2N+1}} \cdot \sin\left(\dfrac{\pi \cdot (2i+1) \cdot (j+1)}{2N+1}\right)$ |

0 : PLANAR
1 : DC

TEMPLATE GENERATED BASED ON REFERENCE PIXEL OF
CANDIDATE MV (L0) AND REFERENCE PIXEL OF CANDIDATE MV (L1)

| | TRANSFORM BASIS 2a | TRANSFORM BASIS 2b | TRANSFORM BASIS 2c | TRANSFORM BASIS 2d |
|---|---|---|---|---|
| SEPARABLE PRIMARY TRANSFORM BASIS CANDIDATE | VERTICAL DCT2 HORIZONTAL DCT2 | VERTICAL DCT2 HORIZONTAL DST7 | VERTICAL DST7 HORIZONTAL DCT2 | VERTICAL DST7 HORIZONTAL DST7 |
| NON-SEPARABLE SECONDARY TRANSFORM BASIS CANDIDATE | | | | |

FIG. 13

| SEPARABLE PRIMARY TRANSFORM BASIS CANDIDATE | NON-SEPARABLE SECONDARY TRANSFORM BASIS CANDIDATE |
|---|---|
| VERTICAL DCT2 HORIZONTAL DCT2 | TRANSFORM BASIS 2a |
| VERTICAL DCT2 HORIZONTAL DST7 | TRANSFORM BASIS 2b |
| VERTICAL DST7 HORIZONTAL DCT2 | TRANSFORM BASIS 2b |
| VERTICAL DST7 HORIZONTAL DST7 | TRANSFORM BASIS 2b |

FIG. 14

| SEPARABLE PRIMARY TRANSFORM BASIS CANDIDATE | VERTICAL DCT2 HORIZONTAL DCT2 | VERTICAL DCT2 HORIZONTAL DST7 | VERTICAL DST7 HORIZONTAL DCT2 | VERTICAL DST7 HORIZONTAL DST7 |
|---|---|---|---|---|
| NON-SEPARABLE SECONDARY TRANSFORM BASIS CANDIDATE | TRANSFORM BASIS 2a | TRANSFORM BASIS 2b | TRANSFORM BASIS 2c | NO TRANSFORM |

FIG. 15

| SEPARABLE PRIMARY TRANSFORM BASIS CANDIDATE | VERTICAL DCT2 HORIZONTAL DCT2 | VERTICAL DCT2 HORIZONTAL DST7 | VERTICAL DST7 HORIZONTAL DCT2 | VERTICAL DST7 HORIZONTAL DST7 |
|---|---|---|---|---|
| NON-SEPARABLE SECONDARY TRANSFORM BASIS CANDIDATE | TRANSFORM BASIS 2a | TRANSFORM BASIS 2b | TRANSFORM BASIS 2c | TRANSFORM BASIS 2d |
| | TRANSFORM BASIS 2e | TRANSFORM BASIS 2f | TRANSFORM BASIS 2g | |

FIG. 16

| SEPARABLE PRIMARY TRANSFORM BASIS CANDIDATE | NON-SEPARABLE SECONDARY TRANSFORM BASIS CANDIDATE | |
|---|---|---|
| VERTICAL DCT2 HORIZONTAL DCT2 | TRANSFORM BASIS 2a | TRANSFORM BASIS 2e |
| VERTICAL DCT2 HORIZONTAL DST7 | TRANSFORM BASIS 2b | TRANSFORM BASIS 2g |
| VERTICAL DST7 HORIZONTAL DCT2 | TRANSFORM BASIS 2c | NO TRANSFORM |
| VERTICAL DST7 HORIZONTAL DST7 | NO TRANSFORM | |

FIG. 17

| SEPARABLE PRIMARY TRANSFORM BASIS CANDIDATE | VERTICAL DCT2 HORIZONTAL DCT2 | VERTICAL DCT2 HORIZONTAL DST7 | VERTICAL DST7 HORIZONTAL DCT2 | VERTICAL DST7 HORIZONTAL DST7 |
|---|---|---|---|---|
| SEPARABLE SECONDARY TRANSFORM BASIS CANDIDATE | VERTICAL TRANSFORM BASIS 2a1 HORIZONTAL TRANSFORM BASIS 2a2 | VERTICAL TRANSFORM BASIS 2b1 HORIZONTAL TRANSFORM BASIS 2b2 | VERTICAL TRANSFORM BASIS 2c1 HORIZONTAL TRANSFORM BASIS 2c2 | VERTICAL TRANSFORM BASIS 2d1 HORIZONTAL TRANSFORM BASIS 2d2 |

FIG. 18

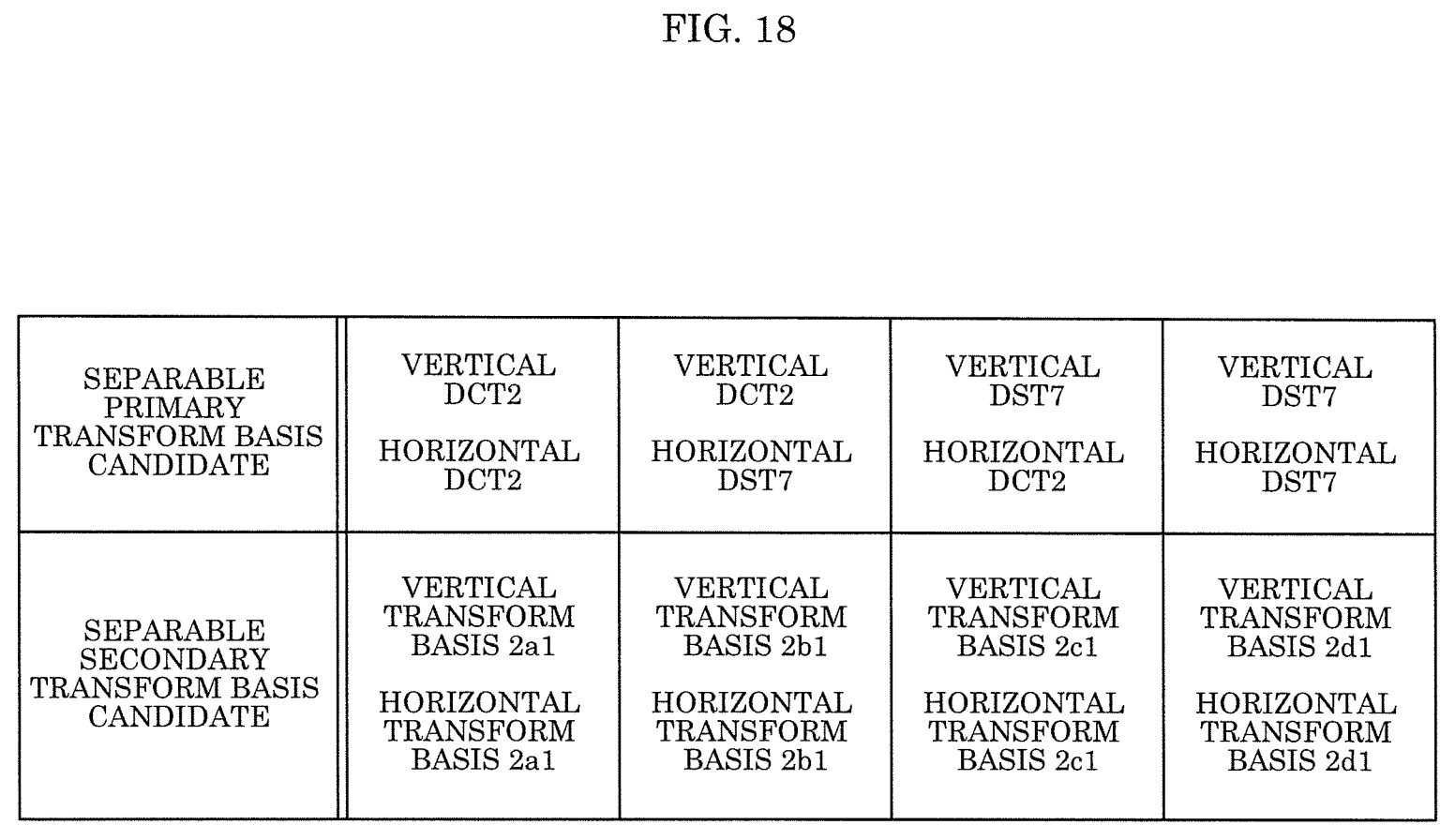

| SEPARABLE PRIMARY TRANSFORM BASIS CANDIDATE | VERTICAL DCT2 HORIZONTAL DCT2 | VERTICAL DCT2 HORIZONTAL DST7 | VERTICAL DST7 HORIZONTAL DCT2 | VERTICAL DST7 HORIZONTAL DST7 |
| SEPARABLE SECONDARY TRANSFORM BASIS CANDIDATE | VERTICAL TRANSFORM BASIS 2a1 HORIZONTAL TRANSFORM BASIS 2a1 | VERTICAL TRANSFORM BASIS 2b1 HORIZONTAL TRANSFORM BASIS 2b1 | VERTICAL TRANSFORM BASIS 2c1 HORIZONTAL TRANSFORM BASIS 2c1 | VERTICAL TRANSFORM BASIS 2d1 HORIZONTAL TRANSFORM BASIS 2d1 |

FIG. 19

| NON-SEPARABLE PRIMARY TRANSFORM BASIS CANDIDATE | TRANSFORM BASIS 1a | TRANSFORM BASIS 1b | TRANSFORM BASIS 1c | TRANSFORM BASIS 1d |
|---|---|---|---|---|
| NON-SEPARABLE SECONDARY TRANSFORM BASIS CANDIDATE | TRANSFORM BASIS 2a | TRANSFORM BASIS 2b | TRANSFORM BASIS 2c | TRANSFORM BASIS 2d |

FIG. 20

| NON-SEPARABLE PRIMARY TRANSFORM BASIS CANDIDATE | TRANSFORM BASIS 1a | TRANSFORM BASIS 1b | TRANSFORM BASIS 1c | TRANSFORM BASIS 1d |
|---|---|---|---|---|
| SEPARABLE SECONDARY TRANSFORM BASIS CANDIDATE | VERTICAL TRANSFORM BASIS 2a1 | VERTICAL TRANSFORM BASIS 2b1 | VERTICAL TRANSFORM BASIS 2c1 | VERTICAL TRANSFORM BASIS 2d1 |
| | HORIZONTAL TRANSFORM BASIS 2a2 | HORIZONTAL TRANSFORM BASIS 2b2 | HORIZONTAL TRANSFORM BASIS 2c2 | HORIZONTAL TRANSFORM BASIS 2d2 |

FIG. 21

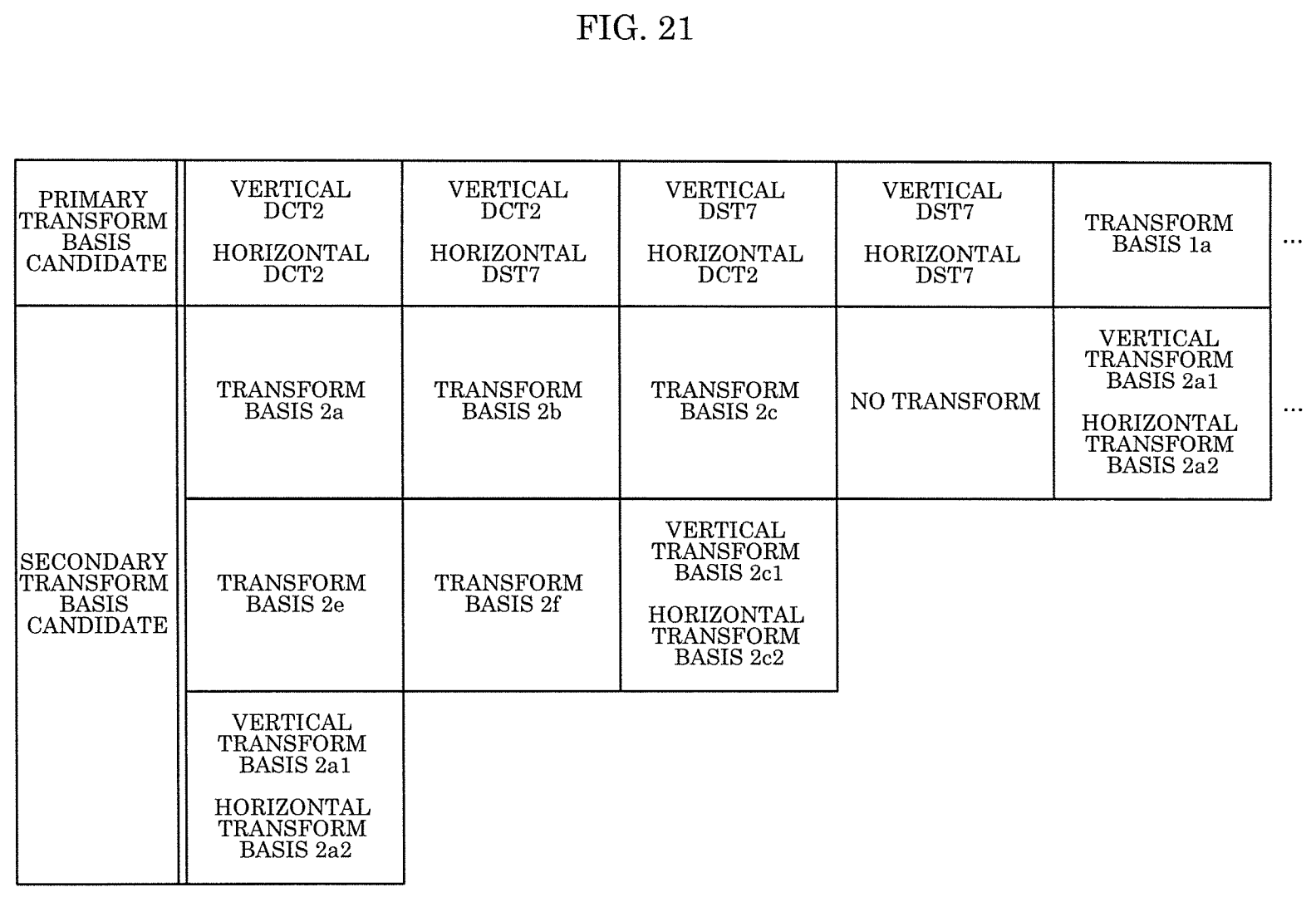

| PRIMARY TRANSFORM BASIS CANDIDATE | VERTICAL DCT2 / HORIZONTAL DCT2 | VERTICAL DCT2 / HORIZONTAL DST7 | VERTICAL DST7 / HORIZONTAL DCT2 | VERTICAL DST7 / HORIZONTAL DST7 | TRANSFORM BASIS 1a ⋮ |
|---|---|---|---|---|---|
| SECONDARY TRANSFORM BASIS CANDIDATE | TRANSFORM BASIS 2a | TRANSFORM BASIS 2b | TRANSFORM BASIS 2c | NO TRANSFORM | VERTICAL TRANSFORM BASIS 2a1 / HORIZONTAL TRANSFORM BASIS 2a2 ⋮ |
| | TRANSFORM BASIS 2e | TRANSFORM BASIS 2f | VERTICAL TRANSFORM BASIS 2c1 / HORIZONTAL TRANSFORM BASIS 2c2 | | |
| | VERTICAL TRANSFORM BASIS 2a1 / HORIZONTAL TRANSFORM BASIS 2a2 | | | | |

FIG. 23

| INTRA PREDICTION MODE | PLANAR PREDICTION | | | | DC PREDICTION | | | | ⋯ |
|---|---|---|---|---|---|---|---|---|---|
| SEPARABLE PRIMARY TRANSFORM BASIS CANDIDATE | VERTICAL DCT2 HORIZONTAL DCT2 | VERTICAL DCT2 HORIZONTAL DST7 | VERTICAL DST7 HORIZONTAL DCT2 | VERTICAL DST7 HORIZONTAL DST7 | VERTICAL DCT2 HORIZONTAL DCT2 | VERTICAL DCT2 HORIZONTAL DST7 | VERTICAL DST7 HORIZONTAL DCT2 | VERTICAL DST7 HORIZONTAL DST7 | ⋯ |
| NON-SEPARABLE SECONDARY TRANSFORM BASIS CANDIDATE | TRANSFORM BASIS 2a | TRANSFORM BASIS 2b | TRANSFORM BASIS 2c | TRANSFORM BASIS 2d | TRANSFORM BASIS 2e | TRANSFORM BASIS 2f | TRANSFORM BASIS 2g | TRANSFORM BASIS 2h | ⋯ |

ENCODER, DECODER, ENCODING METHOD, AND DECODING METHOD

CROSS REFERENCE TO RELATED APPLICATIONS

This application is a continuation of U.S. application Ser. No. 18/522,760 filed on Nov. 29, 2023, which is a continuation of U.S. application Ser. No. 17/732,693, now U.S. Pat. No. 11,870,992, filed on Apr. 29, 2022, which is a continuation of U.S. application Ser. No. 16/728,784, now abandoned, filed on Dec. 27, 2019, which is a continuation application of PCT International Patent Application Number PCT/JP2018/024076 filed on Jun. 26, 2018, claiming the benefit of priority of U.S. Provisional Application No. 62/528,193 filed on Jul. 3, 2017. The entire disclosures of the above-identified applications, including the specifications, drawings, and claims are incorporated herein by reference in their entirety.

BACKGROUND

1. Technical Field

The present disclosure relates to an encoder etc. that encodes a video.

2. Description of the Related Art

Conventionally, as a standard for coding a video, there is H.265 that is also referred to as high efficiency video coding (HEVC) (see, H.265 (ISO/IEC 23008-2 HEVC)/HEVC (High Efficiency Video Coding)).

SUMMARY

An encoder according to one aspect of the present disclosure is an encoder that encodes a video, and includes a processor and memory. Using the memory, the processor: derives a prediction error of an image included in the video, by subtracting a prediction image of the image from the image; determines a secondary transform basis based on a primary transform basis, the primary transform basis being a transform basis for a primary transform to be performed on the prediction error, the secondary transform basis being a transform basis for a secondary transform to be performed on a result of the primary transform; performs the primary transform on the prediction error using the primary transform basis; performs the secondary transform on a result of the primary transform using the secondary transform basis; performs quantization on a result of the secondary transform; and encodes a result of the quantization as data of the image.

It should be noted that these general or specific aspects may be implemented by a system, a device, a method, an integrated circuit, a computer program, or a non-transitory computer-readable recording medium such as a compact disc read only memory (CD-ROM), or by any combination of systems, devices, methods, integrated circuits, computer programs, or recording media.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 1 is a block diagram illustrating a functional configuration of an encoder according to Embodiment 1.

FIG. 3 is a chart indicating transform basis functions for each transform type.

FIG. 10 is a block diagram illustrating a functional configuration of a decoder according to Embodiment 1.

FIG. 12 is a relationship diagram illustrating the first specific example of an association between separable primary transform basis candidates and non-separable secondary transform basis candidates.

FIG. 13 is a relationship diagram illustrating the second specific example of an association between separable primary transform basis candidates and non-separable secondary transform basis candidates.

FIG. 14 is a relationship diagram illustrating the third specific example of an association between separable primary transform basis candidates and non-separable secondary transform basis candidates.

FIG. 15 is a relationship diagram illustrating the fourth specific example of an association between separable primary transform basis candidates and non-separable secondary transform basis candidates.

FIG. 16 is a relationship diagram illustrating the fifth specific example of an association between separable primary transform basis candidates and non-separable secondary transform basis candidates.

FIG. 17 is a relationship diagram illustrating the first specific example of an association between separable primary transform basis candidates and separable secondary transform basis candidates.

FIG. 18 is a relationship diagram illustrating the second specific example of an association between separable primary transform basis candidates and separable secondary transform basis candidates.

FIG. 19 is a relationship diagram illustrating a specific example of an association between non-separable primary transform basis candidates and non-separable secondary transform basis candidates.

FIG. 20 is a relationship diagram illustrating a specific example of an association between non-separable primary transform basis candidates and separable secondary transform basis candidates.

FIG. 21 is a relationship diagram illustrating a specific example of an association between primary transform basis candidates and secondary transform basis candidates in a state in which separable transforms and non-separable transforms are present.

FIG. 23 is a relationship diagram illustrating a specific example of an association between intra prediction modes, separable primary transform basis candidates, and non-separable secondary transform basis candidates.

FIG. 32 illustrates an example of a display screen of a web page.

Figure 2:
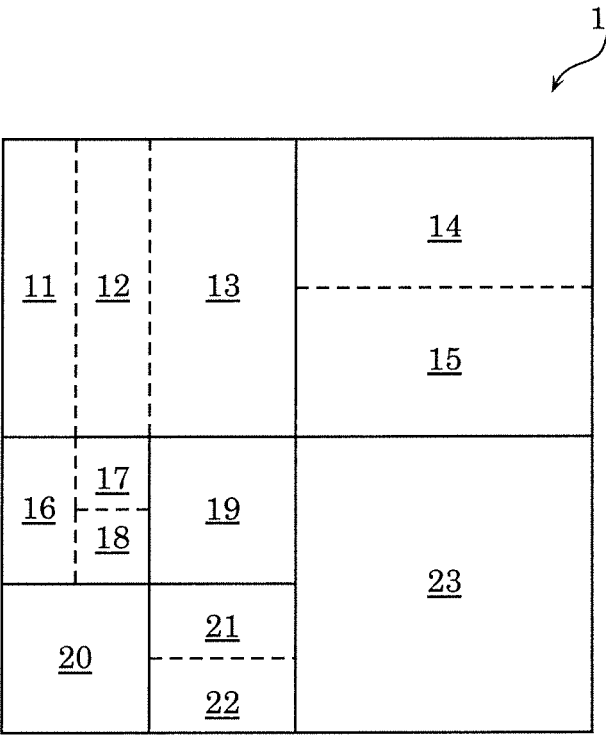
FIG. 2 illustrates one example of block splitting according to Embodiment 1.

DETAILED DESCRIPTION OF THE EMBODIMENTS (Underlying Knowledge Forming Basis of the Present Disclosure)

For example, when an encoder encodes a video, the encoder derives a prediction error by subtracting a prediction image from an image included in the video. Next, the encoder performs a frequency transform and quantization on the prediction error, and encodes the results as data of the image.

In a natural image, the amount of high frequency components is relatively small. Accordingly, a frequency transform concentrates information in the low frequency side, thereby enabling efficient coding. In addition, quantization removes the relatively small amount of high frequency components, thereby reducing the amount of information. The high frequency components have a small impact on image quality, so the negative effects of the deterioration in the image quality are small.

For example, since the amount of high frequency components is relatively small, a frequency transform and quantization successively generate coefficients having a value of 0 in the high frequency region. Here, a coefficient having a value of 0 is referred to as a zero coefficient, and a coefficient having a value other than 0 is referred to as a nonzero coefficient. The encoder can reduce the coding amount of zero coefficients generated successively. Accordingly, the encoder can reduce the total coding amount by performing the frequency transform and quantization.

Moreover, the encoder may perform a secondary transform after the frequency transform and before the quantization so that more zero coefficients are generated successively. In this case, the frequency transform is also expressed as a primary transform. The primary transform is not limited to a frequency transform, and may be an orthogonal transform etc. The secondary transform is basically the orthogonal transform.

In other words, the encoder may perform the primary transform, the secondary transform, and the quantization on the prediction error. There is a possibility of further reducing the coding amount by performing the secondary transform in addition to the primary transform.

A decoder performs operations equivalent to those performed by the encoder. Specifically, the decoder decodes the data of the image. Next, the decoder performs inverse quantization, an inverse secondary transform, and an inverse primary transform on the data of the image. Then, the decoder derives the image by adding, as the prediction error, the results of the inverse quantization, the inverse secondary transform, and the inverse primary transform to the prediction image.

However, if the secondary transform is not performed properly, there is a possibility that the number of zero coefficients generated successively does not increase. Stated differently, if the secondary transform is not performed properly, it is difficult to reduce the coding amount.

In view of this, for example, an encoder according to one aspect of the present disclosure is an encoder that encodes a video, and includes a processor and memory. Using the memory, the processor: derives a prediction error of an image included in the video, by subtracting a prediction image of the image from the image; determines a secondary transform basis based on a primary transform basis, the primary transform basis being a transform basis for a primary transform to be performed on the prediction error, the secondary transform basis being a transform basis for a secondary transform to be performed on a result of the primary transform; performs the primary transform on the prediction error using the primary transform basis; performs the secondary transform on a result of the primary transform using the secondary transform basis; performs quantization on a result of the secondary transform; and encodes a result of the quantization as data of the image.

With this, the encoder can perform the primary transform and the secondary transform using the appropriate combination of the primary transform basis and the secondary transform basis. For this reason, the encoder can properly perform processing relating to transform. Accordingly, the encoder can perform encoding efficiently based on the continuity of zero coefficients.

Moreover, for example, the processor determines the secondary transform basis based on the primary transform basis and a parameter encoded when the processor encodes the video.

With this, the encoder can perform the primary transform and the secondary transform using the appropriate combination of the primary transform basis, the secondary transform basis, and the parameter encoded.

Moreover, for example, the parameter indicates an intra prediction mode, and the processor determines the secondary transform basis based on the primary transform basis and the intra prediction mode indicated by the parameter.

With this, the encoder can perform the primary transform and the secondary transform using the appropriate combination of the primary transform basis, the secondary transform basis, and the intra prediction mode.

Moreover, for example, the processor: determines the primary transform basis from among a plurality of primary transform basis candidates; and determines the secondary transform basis from among at least one secondary transform basis candidate associated with a primary transform basis candidate determined as the primary transform basis among the plurality of primary transform basis candidates.

With this, the encoder can adaptively determine the secondary transform basis from among the at least one secondary transform basis candidate associated with the primary transform basis.

Moreover, for example, at least two of the plurality of primary transform basis candidates are associated with a common secondary transform basis candidate.

This standardizes and simplifies the processing. Accordingly, it is possible to reduce the processing resources.

Moreover, for example, a total number of the at least one secondary transform basis candidate associated with the primary transform basis candidate depends on the primary transform basis candidate.

With this, the total number of the at least one secondary transform basis candidate can be appropriately determined based on the primary transform basis candidate.

Moreover, for example, the secondary transform basis determined when the primary transform basis is a combination of a first transform basis for a vertical direction and a second transform basis for a horizontal direction is identical to the secondary transform basis determined when the primary transform basis is a combination of the second transform basis for the vertical direction and the first transform basis for the horizontal direction.

With this, the encoder can use the common secondary transform basis for the two primary transform bases having an inverse relationship between the vertical direction and the horizontal direction. It is assumed that the characteristics of these two primary transform bases will not change significantly. Accordingly, even when the encoder uses the common secondary transform basis for the two primary transform bases, the encoder can properly perform the primary transform and the secondary transform on the two primary transform bases.

Moreover, for example, the secondary transform basis determined when the primary transform basis is a combination of a first transform basis for a vertical direction and a second transform basis for a horizontal direction is a transform basis obtained by transposing the secondary transform basis determined when the primary transform basis is a combination of the second transform basis for the vertical direction and the first transform basis for the horizontal direction.

With this, the encoder can use the two secondary transform bases one of which is obtained by transposing the other, for the two primary transform bases having an inverse relationship between the vertical direction and the horizontal direction. It is assumed that vertical characteristics and horizontal characteristics have been transposed in the two primary transform bases. Accordingly, by using the two secondary transform bases, one of which is obtained by transposing the other, for the two primary transform bases, the encoder can properly perform the primary transform and the secondary transform.

Moreover, for example, when the secondary transform basis is a combination of a transform basis for a vertical direction and a transform basis for a horizontal direction, the transform basis for the vertical direction and the transform basis for the horizontal direction are identical.

This standardizes and simplifies the processing. Accordingly, it is possible to reduce the processing resources.

Moreover, for example, when there is only one secondary transform basis candidate associated with a primary transform basis candidate determined as the primary transform basis, the processor avoids encoding information indicating the secondary transform basis determined.

With this, the encoder can reduce the amount of information encoded when the secondary transform basis is uniquely determined. Accordingly, it is possible to reduce the coding amount.

Moreover, for example, when a total number of transform basis candidates for one of information indicating the primary transform basis and information indicating the secondary transform basis is limited to one, the processor encodes only the other of the information indicating the primary transform basis and the information indicating the secondary transform basis.

With this, the encoder can reduce the amount of information encoded, compared to a case in which both the information indicating the primary transform basis and the information indicating the secondary transform basis are encoded. Accordingly, it is possible to reduce the coding amount.

Moreover, for example, the secondary transform basis is a transform basis learned based on the primary transform basis.

With this, the encoder can use the secondary transform basis obtained based on the characteristics of the primary transform basis. Accordingly, the encoder can properly perform the primary transform and the secondary transform.

Moreover, for example, when the secondary transform basis is a separable transform basis, the processor performs a separable transform as the secondary transform, and when the secondary transform basis is a non-separable transform basis, the processor performs a non-separable transform as the secondary transform.

With this, the encoder can adaptively switch between the separable secondary transform and the non-separable secondary transform.

Moreover, for example, the processor determines whether to perform the secondary transform, and the secondary transform basis when the secondary transform is performed, based on the primary transform basis.

With this, the encoder can properly determine whether to perform the secondary transform, based on the primary transform basis. In addition, the encoder can properly determine the secondary transform basis when the secondary transform is performed, based on the primary transform basis.

Moreover, for example, each of the primary transform and the secondary transform is a separable transform or a non-separable transform, and the processor: (i) separates the primary transform into a plurality of directional primary transforms, and performs the primary transform by performing the plurality of directional primary transforms, or (ii) performs the primary transform without separating the primary transform into the plurality of directional primary transforms; and (i) separates the secondary transform into a plurality of directional secondary transforms, and performs the secondary transform by performing the plurality of directional secondary transforms, or (ii) performs the secondary transform without separating the secondary transform into the plurality of directional secondary transforms.

With this, the encoder can separate the primary transform into a primary transform for the vertical direction and a primary transform for the horizontal direction, and can perform both the primary transform for the vertical direction and the primary transform for the horizontal direction. Alternatively, the encoder can perform the primary transform without dividing the primary transform into a primary transform for the vertical direction and a primary transform for the horizontal direction. Further, the encoder can separate the secondary transform into a secondary transform for the vertical direction and a secondary transform for the horizontal direction, and can perform both the secondary transform for the vertical direction and the secondary transform for the horizontal direction. Alternatively, the encoder can perform the secondary transform without dividing the secondary transform into a secondary transform for the vertical direction and a secondary transform for the horizontal direction.

For example, a decoder according to one aspect of the present disclosure is a decoder that decodes a video, and includes a processor; and memory. Using the memory, the processor: decodes data of an image included in the video; performs inverse quantization on the data; determines an inverse secondary transform basis based on an inverse primary transform basis, the inverse primary transform basis being a transform basis for an inverse primary transform to be performed on a result of an inverse secondary transform, the inverse secondary transform basis being a transform basis for the inverse secondary transform to be performed on a result of the inverse quantization; performs the inverse secondary transform on a result of the inverse quantization using the inverse secondary transform basis; performs the inverse primary transform on a result of the inverse secondary transform using the inverse primary transform basis; and derives the image by adding a result of the inverse primary transform as a prediction error of the image to a prediction image of the image.

With this, the decoder can perform the inverse primary transform and the inverse secondary transform using the appropriate combination of the inverse primary transform basis and the inverse secondary transform basis. For this reason, the decoder can properly perform processing relating to transform. Accordingly, the decoder can perform decoding efficiently based on the continuity of zero coefficients.

Moreover, for example, the processor determines the inverse secondary transform basis based on the inverse primary transform basis and a parameter decoded when the processor decodes the video.

With this, the decoder can perform the inverse primary transform and the inverse secondary transform using the appropriate combination of the inverse primary transform basis, the inverse secondary transform basis, and a parameter decoded.

Moreover, for example, the parameter indicates an intra prediction mode, and the processor determines the inverse secondary transform basis based on the inverse primary transform basis and the intra prediction mode indicated by the parameter.

With this, the decoder can perform the inverse primary transform and the inverse secondary transform using the appropriate combination of the inverse primary transform basis, the inverse secondary transform basis, and the intra prediction mode.

Moreover, for example, the processor: determines the inverse primary transform basis from among a plurality of inverse primary transform basis candidates; and determines the inverse secondary transform basis from among at least one inverse secondary transform basis candidate associated with an inverse primary transform basis candidate determined as the inverse primary transform basis among the plurality of inverse primary transform basis candidates.

With this, the decoder can adaptively determine the inverse secondary transform basis from among the at least one inverse secondary transform basis candidate associated with the inverse primary transform basis.

Moreover, for example, at least two of the plurality of inverse primary transform basis candidates are associated with a common inverse secondary transform basis candidate.

This standardizes and simplifies the processing. Accordingly, it is possible to reduce the processing resources.

Moreover, for example, a total number of the at least one inverse secondary transform basis candidate associated with the inverse primary transform basis candidate depends on the inverse primary transform basis candidate.

With this, the total number of the at least one inverse secondary transform basis candidate can be appropriately determined based on the inverse primary transform basis candidate.

Moreover, for example, the inverse secondary transform basis determined when the inverse primary transform basis is a combination of a first transform basis for a vertical direction and a second transform basis for a horizontal direction is identical to the inverse secondary transform basis determined when the inverse primary transform basis is a combination of the second transform basis for the vertical direction and the first transform basis for the horizontal direction.

With this, the decoder can use the common inverse secondary transform basis for the two inverse primary transform bases having an inverse relationship between the vertical direction and the horizontal direction. It is assumed that the characteristics of these two inverse primary transform bases will not change significantly. Accordingly, even when the decoder uses the common inverse secondary transform basis for the two inverse primary transform bases, the decoder can properly perform the inverse primary transform and the inverse secondary transform.

Moreover, for example, the inverse secondary transform basis determined when the inverse primary transform basis is a combination of a first transform basis for a vertical direction and a second transform basis for a horizontal direction is a transform basis obtained by transposing the inverse secondary transform basis determined when the inverse primary transform basis is a combination of the second transform basis for the vertical direction and the first transform basis for the horizontal direction.

With this, the decoder can use the two inverse secondary transform bases one of which is obtained by transposing the other, for the two inverse primary transform bases having an inverse relationship between the vertical direction and the horizontal direction. It is assumed that vertical characteristics and horizontal characteristics have been transposed in the two inverse primary transform bases. Accordingly, by using the two inverse secondary transform bases, one of which is obtained by transposing the other, for the two inverse primary transform bases, the decoder can properly perform the inverse primary transform and the inverse secondary transform.

Moreover, for example, when the inverse secondary transform basis is a combination of a transform basis for a vertical direction and a transform basis for a horizontal direction, the transform basis for the vertical direction and the transform basis for the horizontal direction are identical.

This standardizes and simplifies the processing. Accordingly, it is possible to reduce the processing resources.

Moreover, for example, when there is only one inverse secondary transform basis candidate associated with an inverse primary transform basis candidate determined as the inverse primary transform basis, the processor avoids decoding information indicating the inverse secondary transform basis determined.

With this, the decoder can reduce the amount of information decoded when the inverse secondary transform basis is uniquely determined. Accordingly, it is possible to reduce the coding amount.

Moreover, for example, when a total number of transform basis candidates for one of information indicating the inverse primary transform basis and information indicating the inverse secondary transform basis is limited to one, the processor decodes only the other of the information indicating the inverse primary transform basis and the information indicating the inverse secondary transform basis.

With this, the decoder can reduce the amount of information decoded, compared to a case in which both the information indicating the inverse primary transform basis and the information indicating the inverse secondary transform basis are decoded. Accordingly, it is possible to reduce the coding amount.

Moreover, for example, the inverse secondary transform basis is a transform basis learned based on the inverse primary transform basis.

With this, the decoder can use the inverse secondary transform basis obtained based on the characteristics of the inverse primary transform basis. Accordingly, the decoder can properly perform the inverse primary transform and the inverse secondary transform.

Moreover, for example, when the inverse secondary transform basis is a separable inverse transform basis, the processor performs a separable inverse transform as the inverse secondary transform, and when the inverse secondary transform basis is a non-separable inverse transform basis, the processor performs a non-separable inverse transform as the inverse secondary transform.

With this, the decoder can adaptively switch between the separable inverse secondary transform and the non-separable inverse secondary transform.

Moreover, for example, the processor determines whether to perform the inverse secondary transform, and the inverse secondary transform basis when the inverse secondary transform is performed, based on the inverse primary transform basis.

With this, the decoder can properly determine whether to perform the inverse secondary transform, based on the inverse primary transform basis. In addition, the decoder can properly determine the inverse secondary transform basis when the inverse secondary transform is performed, based on the inverse primary transform basis.

Moreover, for example, each of the inverse primary transform and the inverse secondary transform is a separable inverse transform or a non-separable inverse transform, and the processor: (i) separates the inverse primary transform into a plurality of directional inverse primary transforms, and performs the inverse primary transform by performing the plurality of directional inverse primary transforms, or (ii) performs the inverse primary transform without separating the inverse primary transform into the plurality of directional inverse primary transforms; and (i) separates the inverse secondary transform into a plurality of directional inverse secondary transforms, and performs the inverse secondary transform by performing the plurality of directional inverse secondary transforms, or (ii) performs the inverse secondary transform without separating the inverse secondary transform into the plurality of directional inverse secondary transforms.

With this, the decoder can separate the inverse primary transform into an inverse primary transform for the vertical direction and an inverse primary transform for the horizontal direction, and can perform both the inverse primary transform for the vertical direction and the inverse primary transform for the horizontal direction. Alternatively, the decoder can perform the inverse primary transform without dividing the inverse primary transform into an inverse primary transform for the vertical direction and an inverse primary transform for the horizontal direction. Further, the decoder can separate the inverse secondary transform into an inverse secondary transform for the vertical direction and an inverse secondary transform for the horizontal direction, and can perform both the inverse secondary transform for the vertical direction and the inverse secondary transform for the horizontal direction. Alternatively, the decoder can perform the inverse secondary transform without dividing the inverse secondary transform into an inverse secondary transform for the vertical direction and an inverse secondary transform for the horizontal direction.

For example, an encoding method according to one aspect of the present disclosure is an encoding method of encoding a video, the encoding method including: deriving a prediction error of an image included in the video, by subtracting a prediction image of the image from the image; determining a secondary transform basis based on a primary transform basis, the primary transform basis being a transform basis for a primary transform to be performed on the prediction error, the secondary transform basis being a transform basis for a secondary transform to be performed on a result of the primary transform; performing the primary transform on the prediction error using the primary transform basis; performing the secondary transform on a result of the primary transform using the secondary transform basis; performing quantization on a result of the secondary transform; and encoding a result of the quantization as data of the image.

With this, it is possible to perform the primary transform and the secondary transform using the appropriate combination of the primary transform basis and the secondary transform basis. For this reason, it is possible to properly perform processing relating to transform. Accordingly, it is possible to efficiency perform encoding based on the continuity of zero coefficients.

For example, a decoding method according to one aspect of the present disclosure is a decoding method of decoding a video, the decoding method including: decoding data of an image included in the video; performing inverse quantization on the data; determining an inverse secondary transform basis based on an inverse primary transform basis, the inverse primary transform basis being a transform basis for an inverse primary transform to be performed on a result of an inverse secondary transform, the inverse secondary transform basis being a transform basis for the inverse secondary transform to be performed on a result of the inverse quantization; performing the inverse secondary transform on a result of the inverse quantization using the inverse secondary transform basis; performing the inverse primary transform on a result of the inverse secondary transform using the inverse primary transform basis; and deriving the image by adding a result of the inverse primary transform as a prediction error of the image to a prediction image of the image.

With this, it is possible to perform the inverse primary transform and the inverse secondary transform using the appropriate combination of the inverse primary transform basis and the inverse secondary transform basis. For this reason, it is possible to properly perform processing relating to transform. Accordingly, it is possible to efficiency perform decoding based on the continuity of zero coefficients.

Furthermore, these general or specific aspects may be implemented by a system, a device, a method, an integrated circuit, a computer program, or a non-transitory computer-readable recording medium such as a compact disc read only memory (CD-ROM), or by any combination of systems, devices, methods, integrated circuits, computer programs, or recording media.

Hereinafter, embodiments will be described specifically with reference to the drawings.

It should be noted that the embodiments described below each show a general or specific example. The numerical values, shapes, materials, components, the arrangement and connection of the components, steps, order of the steps, etc., indicated in the following embodiments are mere examples, and therefore are not intended to limit the scope of the claims. Further, among the components in the following embodiments, those not recited in any of the independent claims defining the broadest generic concepts are described as optional components.

Embodiment 1

First, an outline of Embodiment 1 will be presented. Embodiment 1 is one example of an encoder and a decoder to which the processes and/or configurations presented in subsequent description of aspects of the present disclosure are applicable. Note that Embodiment 1 is merely one example of an encoder and a decoder to which the processes and/or configurations presented in the description of aspects of the present disclosure are applicable. The processes and/or configurations presented in the description of aspects of the present disclosure can also be implemented in an encoder and a decoder different from those according to Embodiment 1.

When the processes and/or configurations presented in the description of aspects of the present disclosure are applied to Embodiment 1, for example, any of the following may be performed.

(1) regarding the encoder or the decoder according to Embodiment 1, among components included in the encoder or the decoder according to Embodiment 1, substituting a component corresponding to a component presented in the description of aspects of the present disclosure with a component presented in the description of aspects of the present disclosure;

(2) regarding the encoder or the decoder according to Embodiment 1, implementing discretionary changes to functions or implemented processes performed by one or more components included in the encoder or the decoder according to Embodiment 1, such as addition, substitution, or removal, etc., of such functions or implemented processes, then substituting a component corresponding to a component presented in the description of aspects of the present disclosure with a component presented in the description of aspects of the present disclosure;

(3) regarding the method implemented by the encoder or the decoder according to Embodiment 1, implementing discretionary changes such as addition of processes and/or substitution, removal of one or more of the processes included in the method, and then substituting a processes corresponding to a process presented in the description of aspects of the present disclosure with a process presented in the description of aspects of the present disclosure;

(4) combining one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(5) combining a component including one or more functions included in one or more components included in the encoder or the decoder according to Embodiment 1, or a component that implements one or more processes implemented by one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(6) regarding the method implemented by the encoder or the decoder according to Embodiment 1, among processes included in the method, substituting a process corresponding to a process presented in the description of aspects of the present disclosure with a process presented in the description of aspects of the present disclosure; and (7) combining one or more processes included in the method implemented by the encoder or the decoder according to Embodiment 1 with a process presented in the description of aspects of the present disclosure.

Note that the implementation of the processes and/or configurations presented in the description of aspects of the present disclosure is not limited to the above examples. For example, the processes and/or configurations presented in the description of aspects of the present disclosure may be implemented in a device used for a purpose different from the moving picture/picture encoder or the moving picture/picture decoder disclosed in Embodiment 1. Moreover, the processes and/or configurations presented in the description of aspects of the present disclosure may be independently implemented. Moreover, processes and/or configurations described in different aspects may be combined.

[Encoder Outline]

Figure 1:
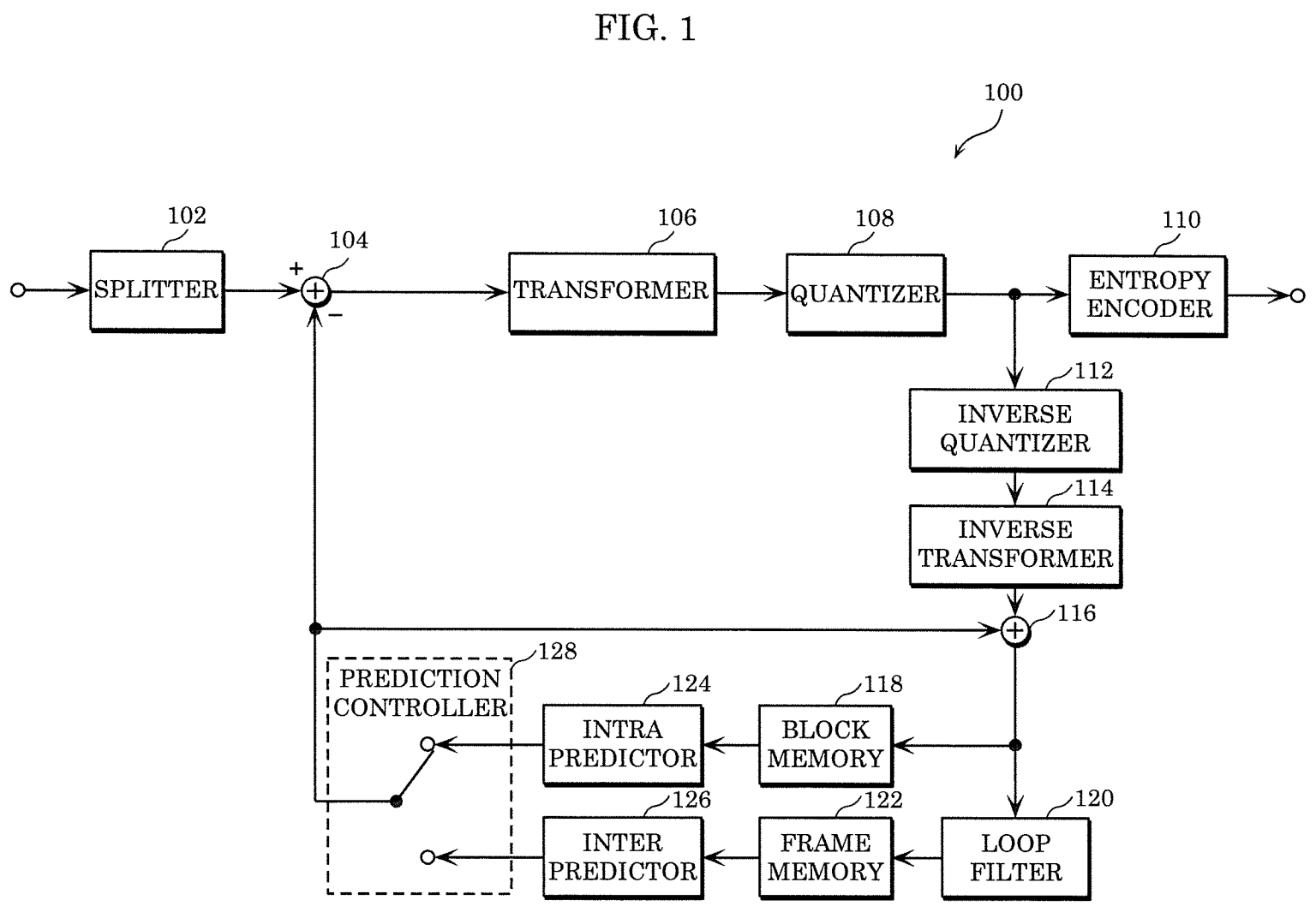

First, the encoder according to Embodiment 1 will be outlined. FIG. 1 is a block diagram illustrating a functional configuration of encoder 100 according to Embodiment 1.

Encoder 100 is a moving picture/picture encoder that encodes a moving picture/picture block by block.

As illustrated in FIG. 1, encoder 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoder 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoder 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoder 100 will be described.

[Splitter]

Splitter 102 splits each picture included in an input moving picture into blocks, and outputs each block to subtractor 104. For example, splitter 102 first splits a picture into blocks of a fixed size (for example, 128×128). The fixed size block is also referred to as coding tree unit (CTU). Splitter 102 then splits each fixed size block into blocks of variable sizes (for example, 64×64 or smaller), based on recursive quadtree and/or binary tree block splitting. The variable size block is also referred to as a coding unit (CU), a prediction unit (PU), or a transform unit (TU). Note that in this embodiment, there is no need to differentiate between CU, PU, and TU; all or some of the blocks in a picture may be processed per CU, PU, or TU.

FIG. 2 illustrates one example of block splitting according to Embodiment 1. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting).

As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

Note that in FIG. 2, one block is split into four or two blocks (quadtree or binary tree block splitting), but splitting is not limited to this example. For example, one block may be split into three blocks (ternary block splitting). Splitting including such ternary block splitting is also referred to as multi-type tree (MBT) splitting.

[Subtractor]

Subtractor 104 subtracts a prediction signal (prediction sample) from an original signal (original sample) per block split by splitter 102. In other words, subtractor 104 calculates prediction errors (also referred to as residuals) of a block to be encoded (hereinafter referred to as a current block). Subtractor 104 then outputs the calculated prediction errors to transformer 106.

The original signal is a signal input into encoder 100, and is a signal representing an image for each picture included in a moving picture (for example, a luma signal and two chroma signals). Hereinafter, a signal representing an image is also referred to as a sample.

[Transformer]

Transformer 106 transforms spatial domain prediction errors into frequency domain transform coefficients, and outputs the transform coefficients to quantizer 108. More specifically, transformer 106 applies, for example, a predefined discrete cosine transform (DCT) or discrete sine transform (DST) to spatial domain prediction errors.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction), and may depend on intra prediction mode.

Information indicating whether to apply such EMT or AMT (referred to as, for example, an AMT flag) and information indicating the selected transform type is signalled at the CU level. Note that the signaling of such information need not be performed at the CU level, and may be performed at another level (for example, at the sequence level, picture level, slice level, tile level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are signalled at the CU level. Note that the signaling of such information need not be performed at the CU level, and may be performed at another level (for example, at the sequence level, picture level, slice level, tile level, or CTU level).

Here, a separate transform is a method in which a transform is performed a plurality of times by separately performing a transform for each direction according to the number of dimensions input. A non-separable transform is a method of performing a collective transform in which two or more dimensions in a multidimensional input are collectively regarded as a single dimension.

In one example of a non-separable transform, when the input is a 4×4 block, the 4×4 block is regarded as a single array including 16 components, and the transform applies a 16×16 transform matrix to the array.

Moreover, similar to above, after an input 4×4 block is regarded as a single array including 16 components, a transform that performs a plurality of Givens rotations on the array (i.e., a Hypercube-Givens Transform) is also one example of a non-separable transform.

[Quantizer]

Quantizer 108 quantizes the transform coefficients output from transformer 106. More specifically, quantizer 108 scans, in a predetermined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112.

A predetermined order is an order for quantizing/inverse quantizing transform coefficients. For example, a predetermined scanning order is defined as ascending order of frequency (from low to high frequency) or descending order of frequency (from high to low frequency).

A quantization parameter is a parameter defining a quantization step size (quantization width). For example, if the value of the quantization parameter increases, the quantization step size also increases. In other words, if the value of the quantization parameter increases, the quantization error increases.

[Entropy Encoder]

Entropy encoder 110 generates an encoded signal (encoded bitstream) by variable length encoding quantized coefficients, which are inputs from quantizer 108. More specifically, entropy encoder 110, for example, binarizes quantized coefficients and arithmetic encodes the binary signal.

[Inverse Quantizer]

Inverse quantizer 112 inverse quantizes quantized coefficients, which are inputs from quantizer 108. More specifically, inverse quantizer 112 inverse quantizes, in a predetermined scanning order, quantized coefficients of the current block. Inverse quantizer 112 then outputs the inverse quantized transform coefficients of the current block to inverse transformer 114.

[Inverse Transformer]

Inverse transformer 114 restores prediction errors by inverse transforming transform coefficients, which are inputs from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116.

Note that since information is lost in quantization, the restored prediction errors do not match the prediction errors calculated by subtractor 104. In other words, the restored prediction errors include quantization errors.

[Adder]

Adder 116 reconstructs the current block by summing prediction errors, which are inputs from inverse transformer 114, and prediction samples, which are inputs from prediction controller 128. Adder 116 then outputs the reconstructed block to block memory 118 and loop filter 120. A reconstructed block is also referred to as a local decoded block.

[Block Memory]

Block memory 118 is storage for storing blocks in a picture to be encoded (hereinafter referred to as a current picture) for reference in intra prediction. More specifically, block memory 118 stores reconstructed blocks output from adder 116.

[Loop Filter]

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO), and an adaptive loop filter (ALF).

In ALF, a least square error filter for removing compression artifacts is applied. For example, one filter from among a plurality of filters is selected for each 2×2 sub-block in the current block based on direction and activity of local gradients, and is applied.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, C=5D+A). Then, based on classification index C, each sub-block is categorized into one out of a plurality of classes (for example, 15 or 25 classes).

For example, gradient directionality D is calculated by comparing gradients of a plurality of directions (for example, the horizontal, vertical, and two diagonal directions). Moreover, for example, gradient activity A is calculated by summing gradients of a plurality of directions and quantizing the sum.

The filter to be used for each sub-block is determined from among the plurality of filters based on the result of such categorization.

Figure 4A:
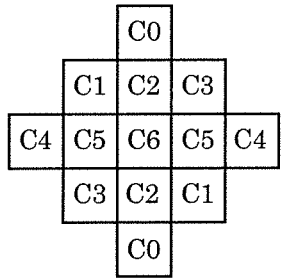
FIG. 4A illustrates one example of a filter shape used in ALF.
Figure 4B:
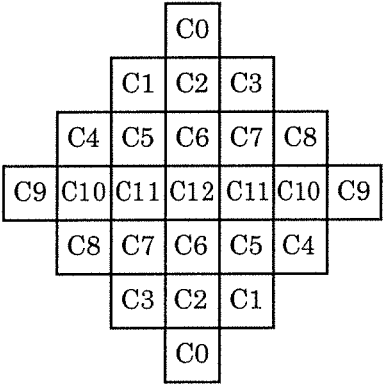
FIG. 4B illustrates another example of a filter shape used in ALF.
Figure 4C:
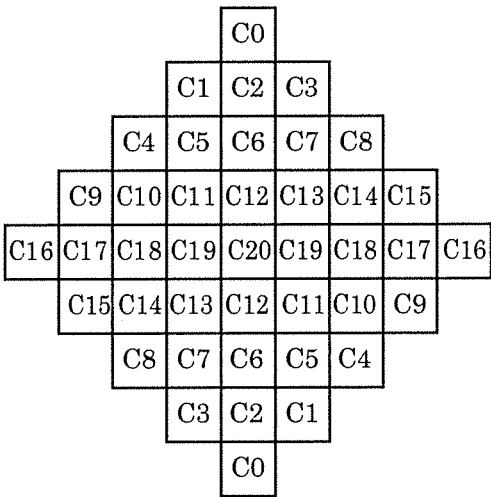
FIG. 4C illustrates another example of a filter shape used in ALF.

The filter shape to be used in ALF is, for example, a circular symmetric filter shape. FIG. 4A through FIG. 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is signalled at the picture level. Note that the signaling of information indicating the filter shape need not be performed at the picture level, and may be performed at another level (for example, at the sequence level, slice level, tile level, CTU level, or CU level).

The enabling or disabling of ALF is determined at the picture level or CU level. For example, for luma, the decision to apply ALF or not is done at the CU level, and for chroma, the decision to apply ALF or not is done at the picture level. Information indicating whether ALF is enabled or disabled is signalled at the picture level or CU level. Note that the signaling of information indicating whether ALF is enabled or disabled need not be performed at the picture level or CU level, and may be performed at another level (for example, at the sequence level, slice level, tile level, or CTU level).

The coefficients set for the plurality of selectable filters (for example, 15 or 25 filters) is signalled at the picture level. Note that the signaling of the coefficients set need not be performed at the picture level, and may be performed at another level (for example, at the sequence level, slice level, tile level, CTU level, CU level, or sub-block level).

[Frame Memory]

Frame memory 122 is storage for storing reference pictures used in inter prediction, and is also referred to as a frame buffer. More specifically, frame memory 122 stores reconstructed blocks filtered by loop filter 120.

[Intra Predictor]

Intra predictor 124 generates a prediction signal (intra prediction signal) by intra predicting the current block with reference to a block or blocks in the current picture and stored in block memory 118 (also referred to as intra frame prediction). More specifically, intra predictor 124 generates an intra prediction signal by intra prediction with reference to samples (for example, luma and/or chroma values) of a block or blocks neighboring the current block, and then outputs the intra prediction signal to prediction controller 128.

For example, intra predictor 124 performs intra prediction by using one mode from among a plurality of predefined intra prediction modes. The intra prediction modes include one or more non-directional prediction modes and a plurality of directional prediction modes.

The one or more non-directional prediction modes include, for example, planar prediction mode and DC prediction mode defined in the H.265/high-efficiency video coding (HEVC) standard (see NPL 1).

Figure 5A:
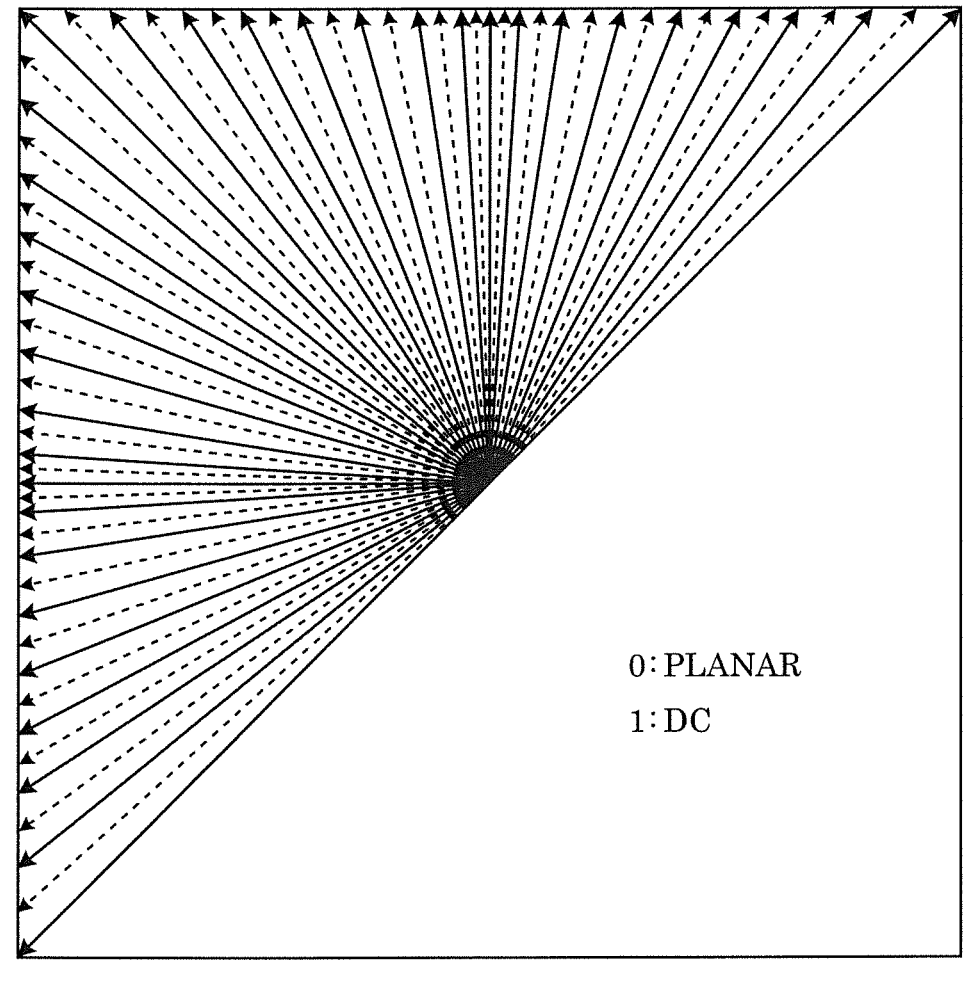
FIG. 5A illustrates 67 intra prediction modes used in intra prediction.

The plurality of directional prediction modes include, for example, the 33 directional prediction modes defined in the H.265/HEVC standard. Note that the plurality of directional prediction modes may further include 32 directional prediction modes in addition to the 33 directional prediction modes (for a total of 65 directional prediction modes). FIG. 5A illustrates 67 intra prediction modes used in intra prediction (two non-directional prediction modes and 65 directional prediction modes). The solid arrows represent the 33 directions defined in the H.265/HEVC standard, and the dashed arrows represent the additional 32 directions.

Note that a luma block may be referenced in chroma block intra prediction. In other words, a chroma component of the current block may be predicted based on a luma component of the current block. Such intra prediction is also referred to as cross-component linear model (CCLM) prediction. Such a chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is, for example, signalled at the CU level. Note that the signaling of this information need not be performed at the CU level, and may be performed at another level (for example, on the sequence level, picture level, slice level, tile level, or CTU level).

[Inter Predictor]

Inter predictor 126 generates a prediction signal (inter prediction signal) by inter predicting the current block with reference to a block or blocks in a reference picture, which is different from the current picture and is stored in frame memory 122 (also referred to as inter frame prediction). Inter prediction is performed per current block or per sub-block (for example, per 4×4 block) in the current block. For example, inter predictor 126 performs motion estimation in a reference picture for the current block or sub-block. Inter predictor 126 then generates an inter prediction signal of the current block or sub-block by motion compensation by using motion information (for example, a motion vector) obtained from motion estimation. Inter predictor 126 then outputs the generated inter prediction signal to prediction controller 128.

The motion information used in motion compensation is signalled. A motion vector predictor may be used for the signaling of the motion vector. In other words, the difference between the motion vector and the motion vector predictor may be signalled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from motion estimation and a prediction signal based on motion information for a neighboring block. Such inter prediction (motion compensation) is also referred to as overlapped block motion compensation (OBMC).

In such an OBMC mode, information indicating sub-block size for OBMC (referred to as, for example, OBMC block size) is signalled at the sequence level. Moreover, information indicating whether to apply the OBMC mode or not (referred to as, for example, an OBMC flag) is signalled at the CU level. Note that the signaling of such information need not be performed at the sequence level and CU level, and may be performed at another level (for example, at the picture level, slice level, tile level, CTU level, or sub-block level).

Figure 5B:
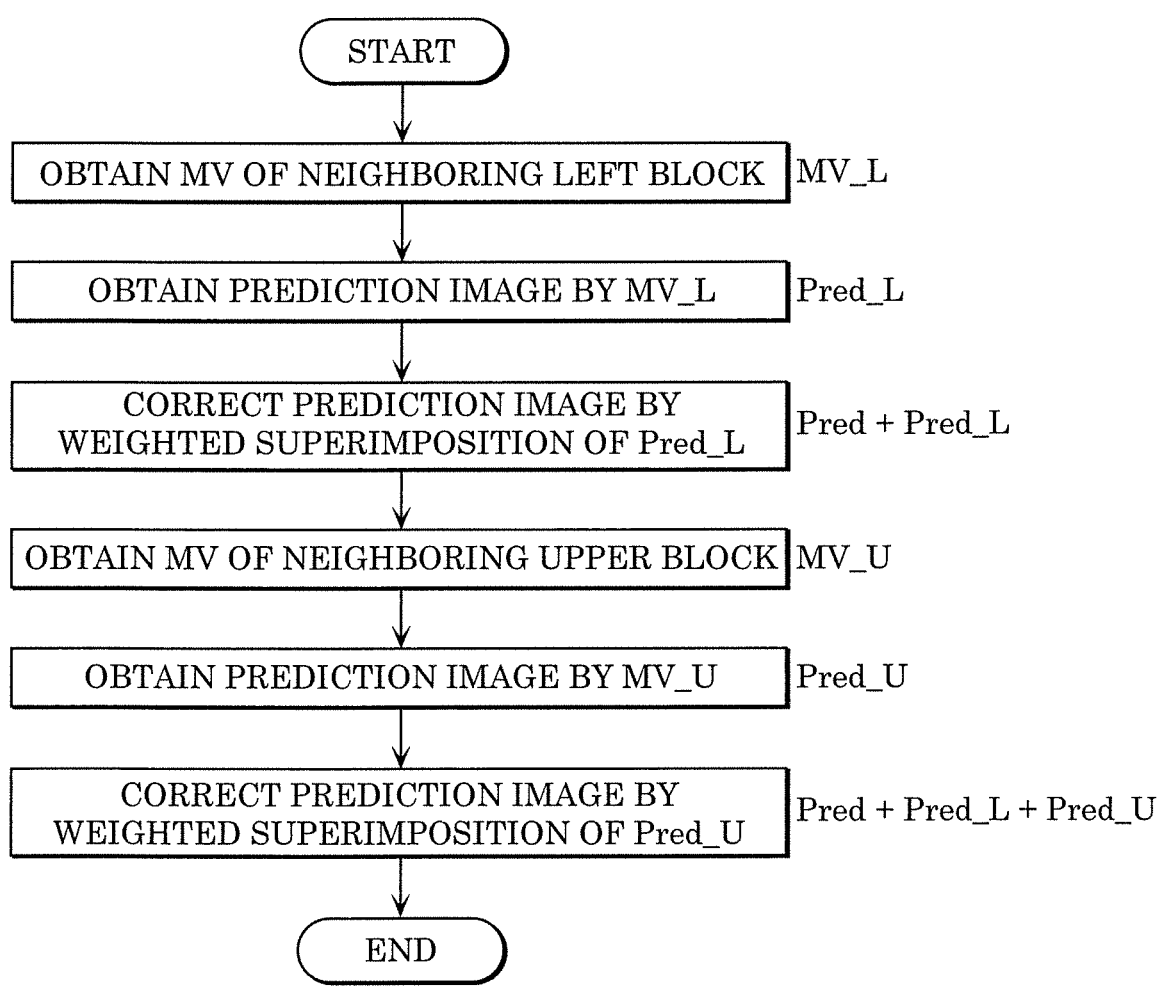
FIG. 5B is a flow chart for illustrating an outline of a prediction image correction process performed via OBMC processing.
Figure 5C:
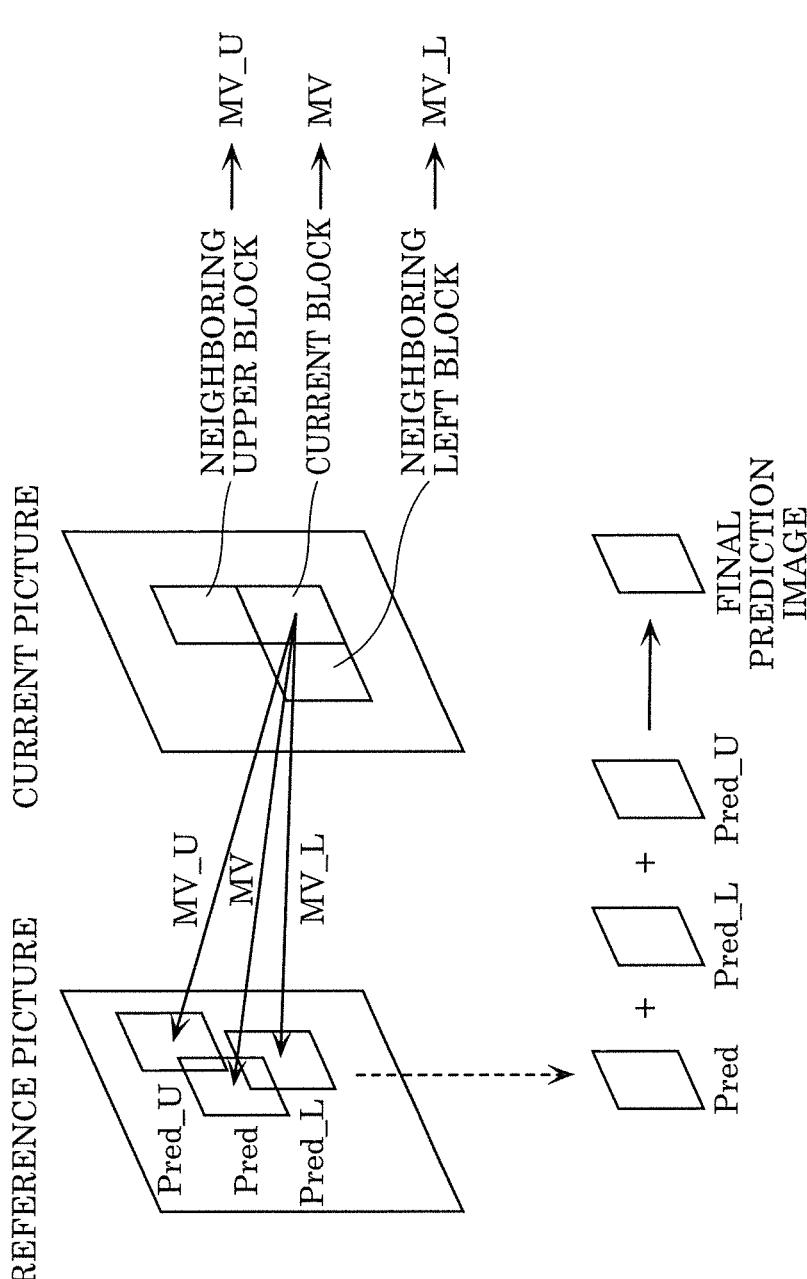
FIG. 5C is a conceptual diagram for illustrating an outline of a prediction image correction process performed via OBMC processing.

Hereinafter, the OBMC mode will be described in further detail. FIG. 5B is a flowchart and FIG. 5C is a conceptual diagram for illustrating an outline of a prediction image correction process performed via OBMC processing.

First, a prediction image (Pred) is obtained through typical motion compensation using a motion vector (MV) assigned to the current block.

Next, a prediction image (Pred_L) is obtained by applying a motion vector (MV_L) of the encoded neighboring left block to the current block, and a first pass of the correction of the prediction image is made by superimposing the prediction image and Pred_L.

Similarly, a prediction image (Pred_U) is obtained by applying a motion vector (MV_U) of the encoded neighboring upper block to the current block, and a second pass of the correction of the prediction image is made by superimposing the prediction image resulting from the first pass and Pred_U. The result of the second pass is the final prediction image.

Note that the above example is of a two-pass correction method using the neighboring left and upper blocks, but the method may be a three-pass or higher correction method that also uses the neighboring right and/or lower block.

Note that the region subject to superimposition may be the entire pixel region of the block, and, alternatively, may be a partial block boundary region.

Note that here, the prediction image correction process is described as being based on a single reference picture, but the same applies when a prediction image is corrected based on a plurality of reference pictures. In such a case, after corrected prediction images resulting from performing correction based on each of the reference pictures are obtained, the obtained corrected prediction images are further superimposed to obtain the final prediction image.

Note that the unit of the current block may be a prediction block and, alternatively, may be a sub-block obtained by further dividing the prediction block.

One example of a method for determining whether to implement OBMC processing is by using an obmc_flag, which is a signal that indicates whether to implement OBMC processing. As one specific example, the encoder determines whether the current block belongs to a region including complicated motion. The encoder sets the obmc_flag to a value of "1" when the block belongs to a region including complicated motion and implements OBMC processing when encoding, and sets the obmc_flag to a value of "0" when the block does not belong to a region including complication motion and encodes without implementing OBMC processing. The decoder switches between implementing OBMC processing or not by decoding the obmc_flag written in the stream and performing the decoding in accordance with the flag value.

Note that the motion information may be derived on the decoder side without being signalled. For example, a merge mode defined in the H.265/HEVC standard may be used. Moreover, for example, the motion information may be derived by performing motion estimation on the decoder side. In this case, motion estimation is performed without using the pixel values of the current block.

Here, a mode for performing motion estimation on the decoder side will be described. A mode for performing motion estimation on the decoder side is also referred to as pattern matched motion vector derivation (PMMVD) mode or frame rate up-conversion (FRUC) mode.

Figure 5D:
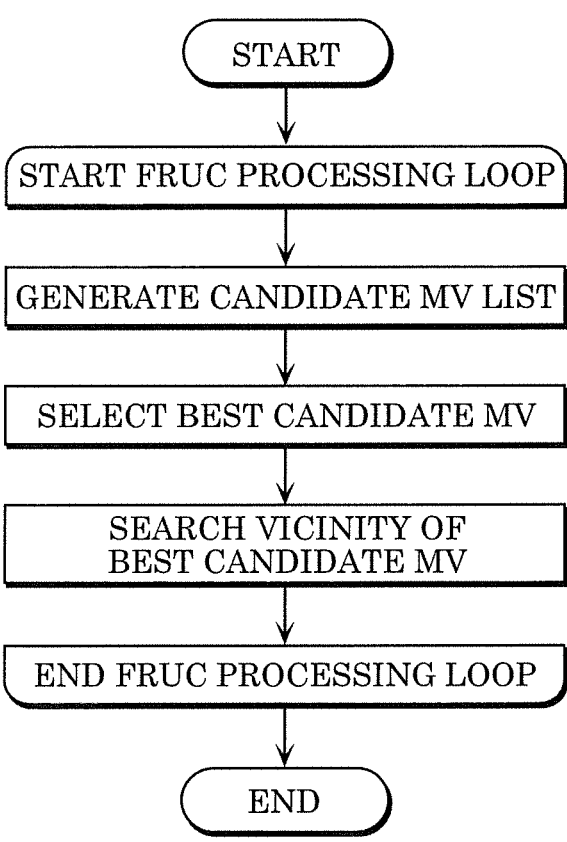
FIG. 5D illustrates one example of FRUC.

One example of FRUC processing is illustrated in FIG. 5D. First, a candidate list (a candidate list may be a merge list) of candidates each including a motion vector predictor is generated with reference to motion vectors of encoded blocks that spatially or temporally neighbor the current block. Next, the best candidate MV is selected from among a plurality of candidate MVs registered in the candidate list. For example, evaluation values for the candidates included in the candidate list are calculated and one candidate is selected based on the calculated evaluation values.

Next, a motion vector for the current block is derived from the motion vector of the selected candidate. More specifically, for example, the motion vector for the current block is calculated as the motion vector of the selected candidate (best candidate MV), as-is. Alternatively, the motion vector for the current block may be derived by pattern matching performed in the vicinity of a position in a reference picture corresponding to the motion vector of the selected candidate. In other words, when the vicinity of the best candidate MV is searched via the same method and an MV having a better evaluation value is found, the best candidate MV may be updated to the MV having the better evaluation value, and the MV having the better evaluation value may be used as the final MV for the current block. Note that a configuration in which this processing is not implemented is also acceptable.

The same processes may be performed in cases in which the processing is performed in units of sub-blocks.

Note that an evaluation value is calculated by calculating the difference in the reconstructed image by pattern matching performed between a region in a reference picture corresponding to a motion vector and a predetermined region. Note that the evaluation value may be calculated by using some other information in addition to the difference.

The pattern matching used is either first pattern matching or second pattern matching. First pattern matching and second pattern matching are also referred to as bilateral matching and template matching, respectively.

In the first pattern matching, pattern matching is performed between two blocks along the motion trajectory of the current block in two different reference pictures. Therefore, in the first pattern matching, a region in another reference picture conforming to the motion trajectory of the current block is used as the predetermined region for the above-described calculation of the candidate evaluation value.

Figure 6:
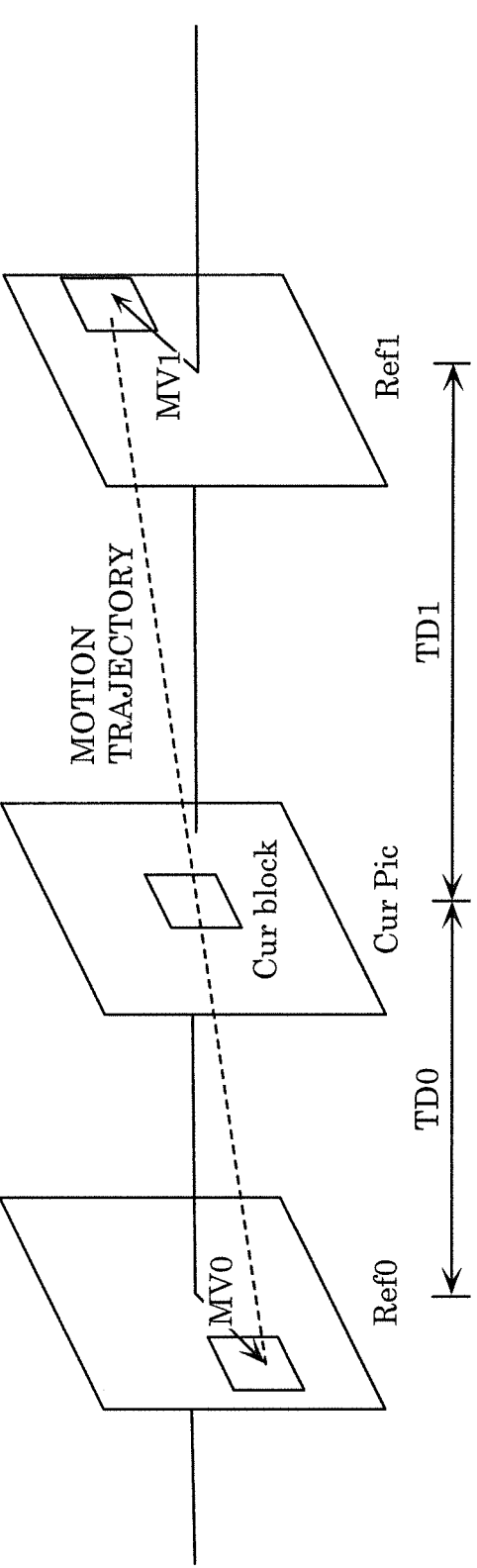
FIG. 6 is for illustrating pattern matching (bilateral matching) between two blocks along a motion trajectory.

FIG. 6 is for illustrating one example of pattern matching (bilateral matching) between two blocks along a motion trajectory. As illustrated in FIG. 6, in the first pattern matching, two motion vectors (MV0, MV1) are derived by finding the best match between two blocks along the motion trajectory of the current block (Cur block) in two different reference pictures (Ref0, Ref1). More specifically, a difference between (i) a reconstructed image in a specified position in a first encoded reference picture (Ref0) specified by a candidate MV and (ii) a reconstructed picture in a specified position in a second encoded reference picture (Ref1) specified by a symmetrical MV scaled at a display time interval of the candidate MV may be derived, and the evaluation value for the current block may be calculated by using the derived difference. The candidate MV having the best evaluation value among the plurality of candidate MVs may be selected as the final MV.

Under the assumption of continuous motion trajectory, the motion vectors (MV0, MV1) pointing to the two reference blocks shall be proportional to the temporal distances (TD0, TD1) between the current picture (Cur Pic) and the two reference pictures (Ref0, Ref1). For example, when the current picture is temporally between the two reference pictures and the temporal distance from the current picture to the two reference pictures is the same, the first pattern matching derives a mirror based bi-directional motion vector.

In the second pattern matching, pattern matching is performed between a template in the current picture (blocks neighboring the current block in the current picture (for example, the top and/or left neighboring blocks)) and a block in a reference picture. Therefore, in the second pattern matching, a block neighboring the current block in the current picture is used as the predetermined region for the above-described calculation of the candidate evaluation value.

Figure 7:
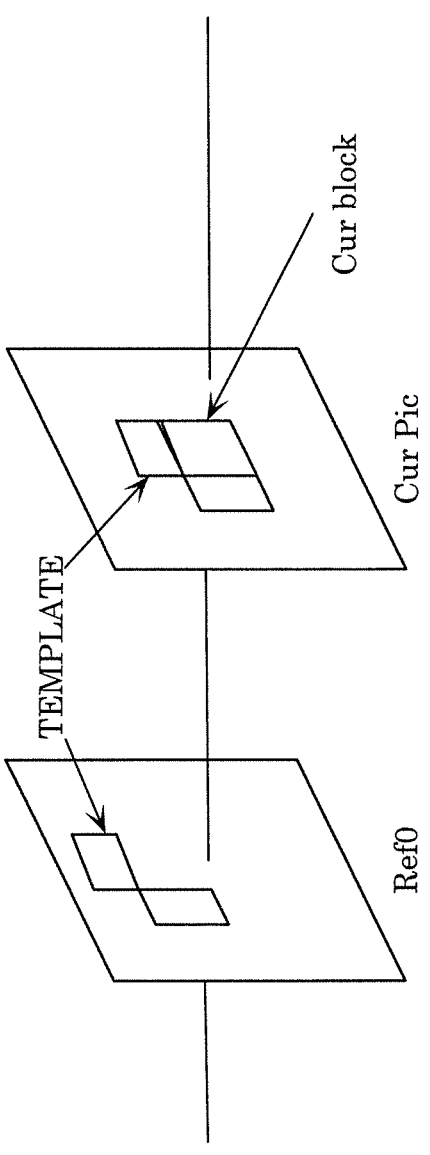
FIG. 7 is for illustrating pattern matching (template matching) between a template in the current picture and a block in a reference picture.

FIG. 7 is for illustrating one example of pattern matching (template matching) between a template in the current picture and a block in a reference picture. As illustrated in FIG. 7, in the second pattern matching, a motion vector of the current block is derived by searching a reference picture (Ref0) to find the block that best matches neighboring blocks of the current block (Cur block) in the current picture (Cur Pic). More specifically, a difference between (i) a reconstructed image of an encoded region that is both or one of the neighboring left and neighboring upper region and (ii) a reconstructed picture in the same position in an encoded reference picture (Ref0) specified by a candidate MV may be derived, and the evaluation value for the current block may be calculated by using the derived difference. The candidate MV having the best evaluation value among the plurality of candidate MVs may be selected as the best candidate MV.

Information indicating whether to apply the FRUC mode or not (referred to as, for example, a FRUC flag) is signalled at the CU level. Moreover, when the FRUC mode is applied (for example, when the FRUC flag is set to true), information indicating the pattern matching method (first pattern matching or second pattern matching) is signalled at the CU level. Note that the signaling of such information need not be performed at the CU level, and may be performed at another level (for example, at the sequence level, picture level, slice level, tile level, CTU level, or sub-block level).

Here, a mode for deriving a motion vector based on a model assuming uniform linear motion will be described. This mode is also referred to as a bi-directional optical flow (BIO) mode.

Figure 8:
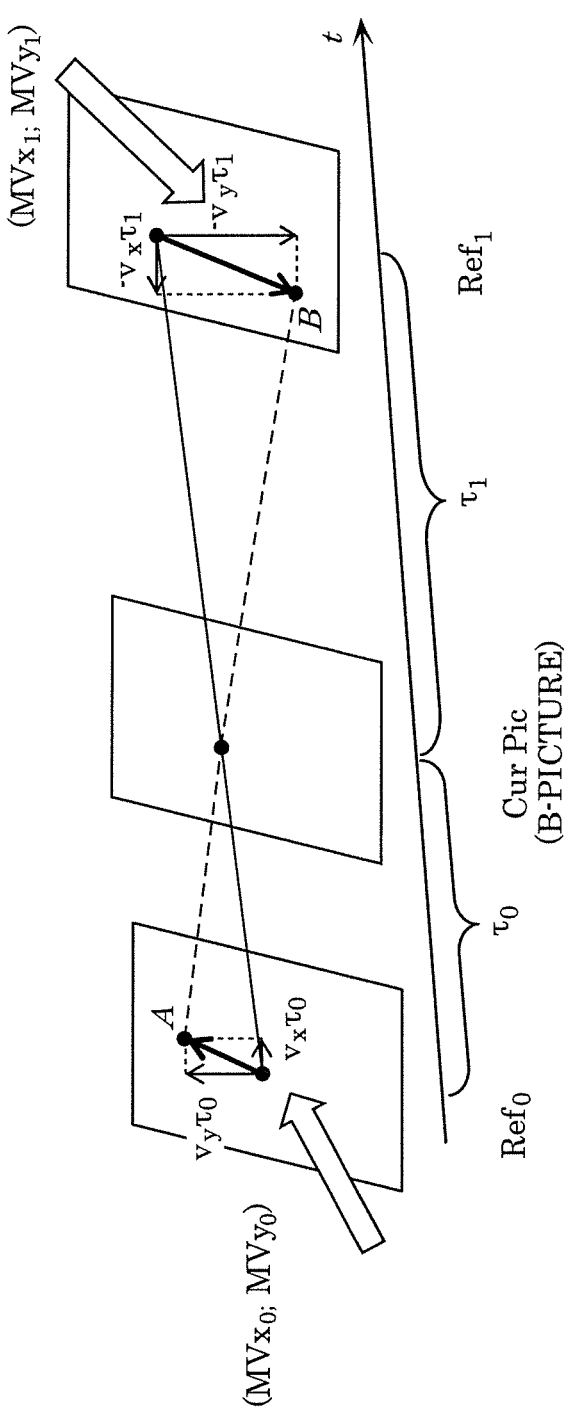
FIG. 8 is for illustrating a model assuming uniform linear motion.

FIG. 8 is for illustrating a model assuming uniform linear motion. In FIG. 8, $(V_x, V_y)$ denotes a velocity vector, and $T_0$ and $T_1$ denote temporal distances between the current picture (Cur Pic) and two reference pictures (Ref$_0$, Ref$_1$). (MVx$_0$, MVy$_0$) denotes a motion vector corresponding to reference picture Ref$_0$, and (MVx$_1$, MVy$_1$) denotes a motion vector corresponding to reference picture Ref1.

Here, under the assumption of uniform linear motion exhibited by velocity vector $(V_x, V_y)$, (MVx$_0$, MVy$_0$) and (MVx$_1$, MVy$_1$) are represented as $(V_xT_0, V_yT_0)$ and $(-V_xT_1, -V_yT_1)$, respectively, and the following optical flow equation is given.

MATH. 1

$$\partial I^{(k)}/\partial t + v_x\partial I^{(k)}/\partial x + v_y\partial I^{(k)}/\partial y = 0. \qquad (1)$$

Here, $I^{(k)}$ denotes a luma value from reference picture k (k=0, 1) after motion compensation. This optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture is equal to zero. A motion vector of each block obtained from, for example, a merge list is corrected pixel by pixel based on a combination of the optical flow equation and Hermite interpolation.

Note that a motion vector may be derived on the decoder side using a method other than deriving a motion vector based on a model assuming uniform linear motion. For example, a motion vector may be derived for each sub-block based on motion vectors of neighboring blocks.

Here, a mode in which a motion vector is derived for each sub-block based on motion vectors of neighboring blocks will be described. This mode is also referred to as affine motion compensation prediction mode.

Figure 9A:
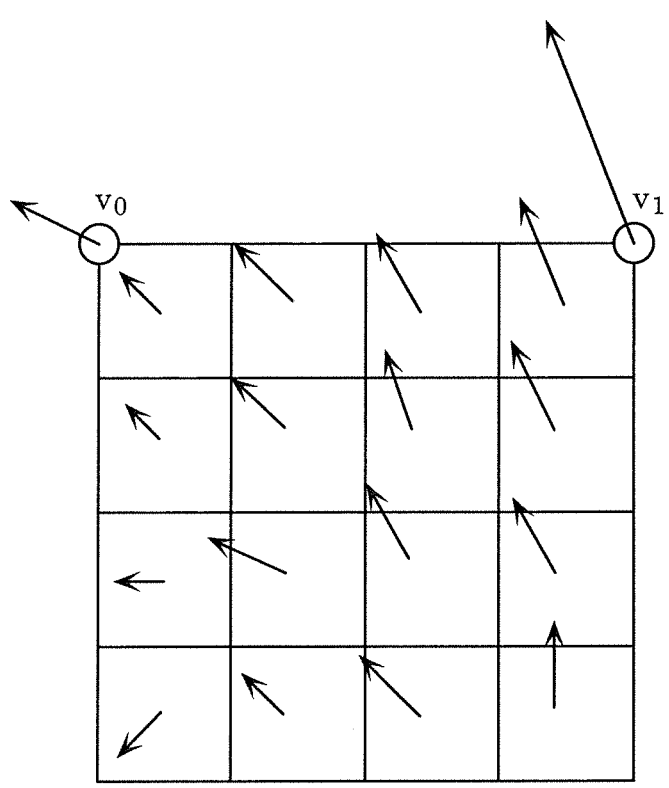
FIG. 9A is for illustrating deriving a motion vector of each sub-block based on motion vectors of neighboring blocks.

FIG. 9A is for illustrating deriving a motion vector of each sub-block based on motion vectors of neighboring blocks. In FIG. 9A, the current block includes 16 4×4 sub-blocks. Here, motion vector $v_0$ of the top left corner control point in the current block is derived based on motion vectors of neighboring sub-blocks, and motion vector $v_1$ of the top right corner control point in the current block is derived based on motion vectors of neighboring blocks. Then, using the two motion vectors $v_0$ and $v_1$, the motion vector $(V_x, V_y)$ of each sub-block in the current block is derived using Equation 2 below.

MATH. 2

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \qquad (2)$$

Here, x and y are the horizontal and vertical positions of the sub-block, respectively, and w is a predetermined weighted coefficient.

Such an affine motion compensation prediction mode may include a number of modes of different methods of deriving the motion vectors of the top left and top right corner control points. Information indicating such an affine motion compensation prediction mode (referred to as, for example, an affine flag) is signalled at the CU level. Note that the signaling of information indicating the affine motion compensation prediction mode need not be performed at the CU level, and may be performed at another level (for example, at the sequence level, picture level, slice level, tile level, CTU level, or sub-block level).

[Prediction Controller]

Prediction controller 128 selects either the intra prediction signal or the inter prediction signal, and outputs the selected prediction signal to subtractor 104 and adder 116.

Figure 9B:
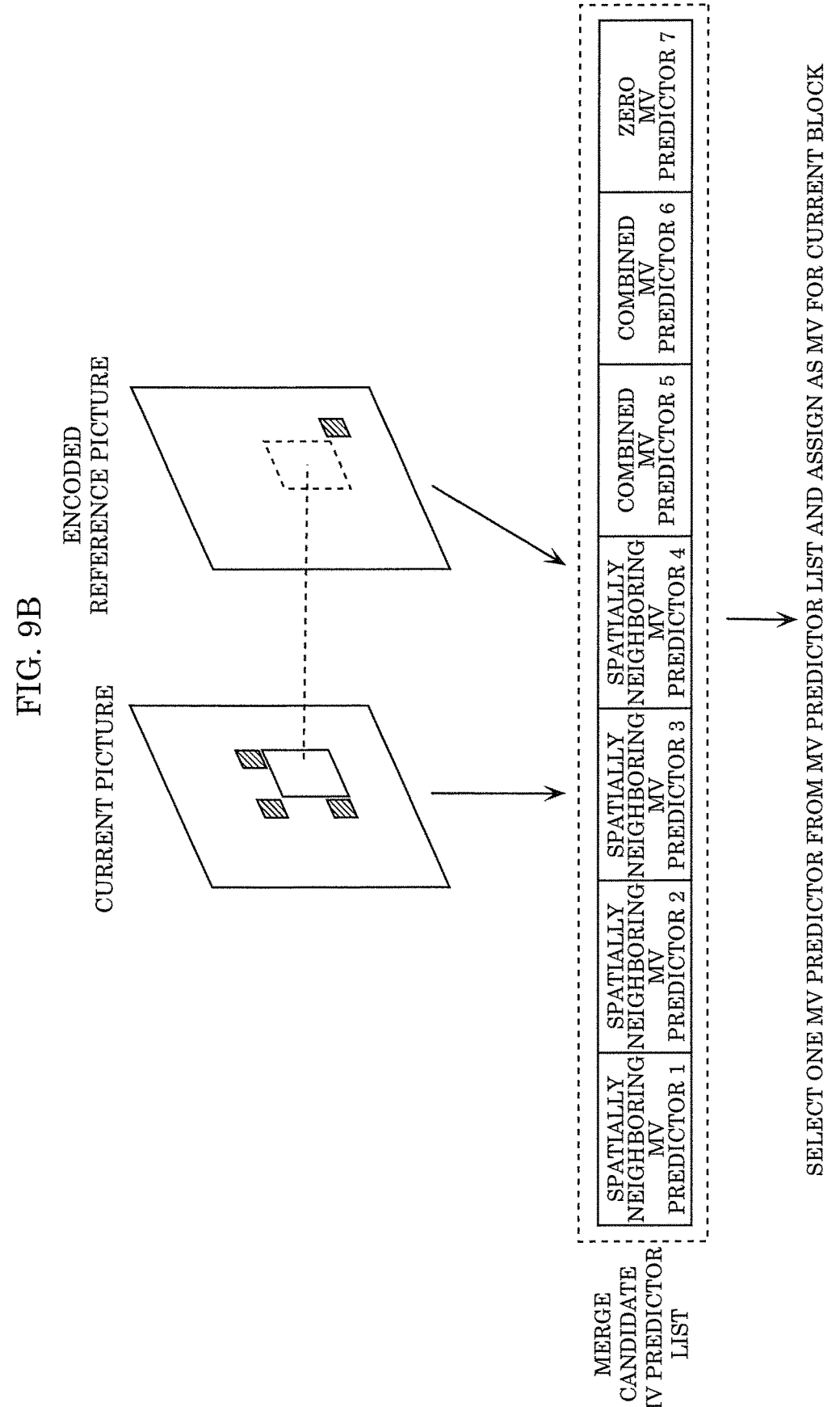
FIG. 9B is for illustrating an outline of a process for deriving a motion vector via merge mode.

Here, an example of deriving a motion vector via merge mode in a current picture will be given. FIG. 9B is for illustrating an outline of a process for deriving a motion vector via merge mode.

First, an MV predictor list in which candidate MV predictors are registered is generated. Examples of candidate MV predictors include: spatially neighboring MV predictors, which are MVs of encoded blocks positioned in the spatial vicinity of the current block; a temporally neighboring MV predictor, which is an MV of a block in an encoded reference picture that neighbors a block in the same location as the current block; a combined MV predictor, which is an MV generated by combining the MV values of the spatially neighboring MV predictor and the temporally neighboring MV predictor; and a zero MV predictor, which is an MV whose value is zero.

Next, the MV of the current block is determined by selecting one MV predictor from among the plurality of MV predictors registered in the MV predictor list.

Furthermore, in the variable-length encoder, a merge_idx, which is a signal indicating which MV predictor is selected, is written and encoded into the stream.

Note that the MV predictors registered in the MV predictor list illustrated in FIG. 9B constitute one example. The number of MV predictors registered in the MV predictor list may be different from the number illustrated in FIG. 9B, the MV predictors registered in the MV predictor list may omit one or more of the types of MV predictors given in the example in FIG. 9B, and the MV predictors registered in the MV predictor list may include one or more types of MV predictors in addition to and different from the types given in the example in FIG. 9B.

Note that the final MV may be determined by performing DMVR processing (to be described later) by using the MV of the current block derived via merge mode.

Here, an example of determining an MV by using DMVR processing will be given.

Figure 9C:
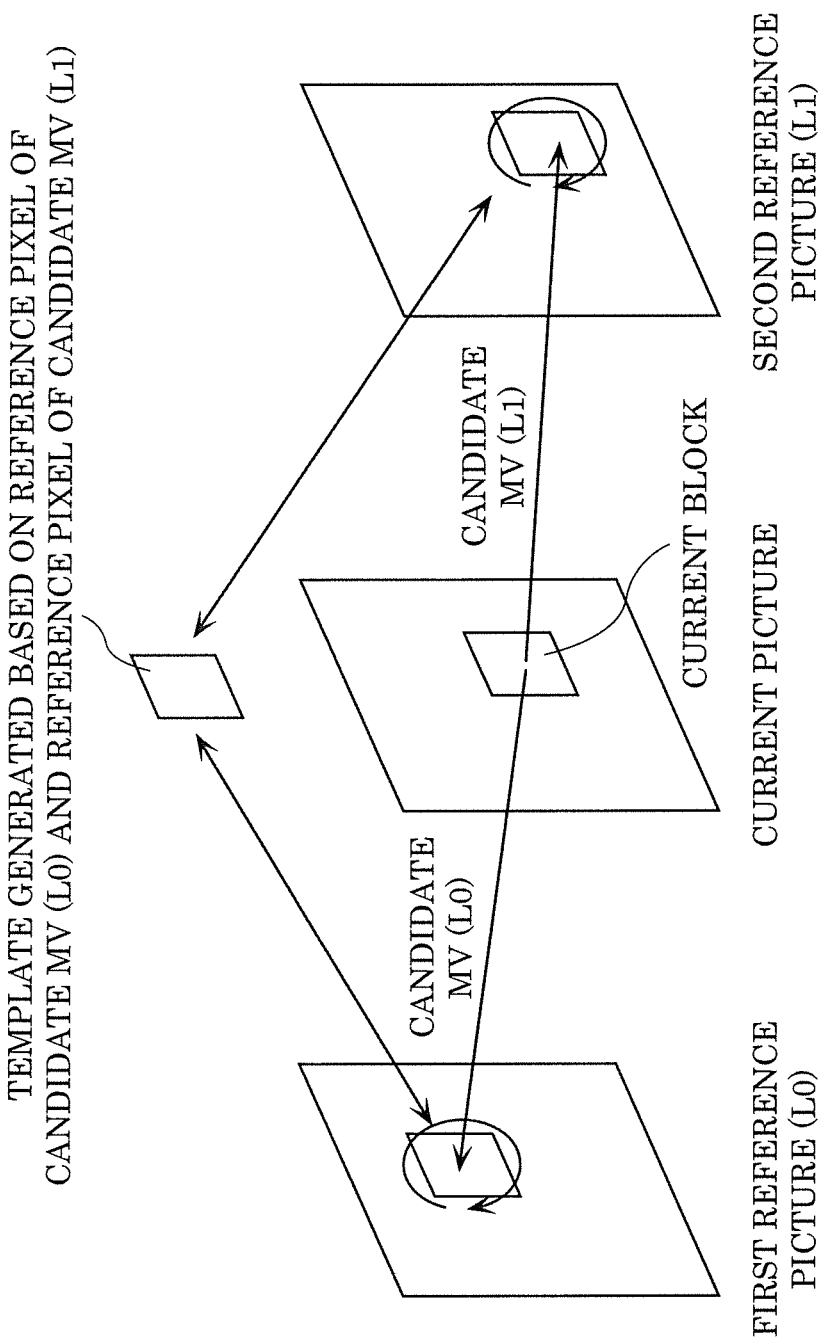
FIG. 9C is a conceptual diagram for illustrating an outline of DMVR processing.

FIG. 9C is a conceptual diagram for illustrating an outline of DMVR processing.

First, the most appropriate MVP set for the current block is considered to be the candidate MV, reference pixels are obtained from a first reference picture, which is a picture processed in the L0 direction in accordance with the candidate MV, and a second reference picture, which is a picture processed in the L1 direction in accordance with the candidate MV, and a template is generated by calculating the average of the reference pixels.

Next, using the template, the surrounding regions of the candidate MVs of the first and second reference pictures are searched, and the MV with the lowest cost is determined to be the final MV. Note that the cost value is calculated using, for example, the difference between each pixel value in the template and each pixel value in the regions searched, as well as the MV value.

Note that the outlines of the processes described here are fundamentally the same in both the encoder and the decoder.

Note that processing other than the processing exactly as described above may be used, so long as the processing is capable of deriving the final MV by searching the surroundings of the candidate MV.

Here, an example of a mode that generates a prediction image by using LIC processing will be given.

Figure 9D:
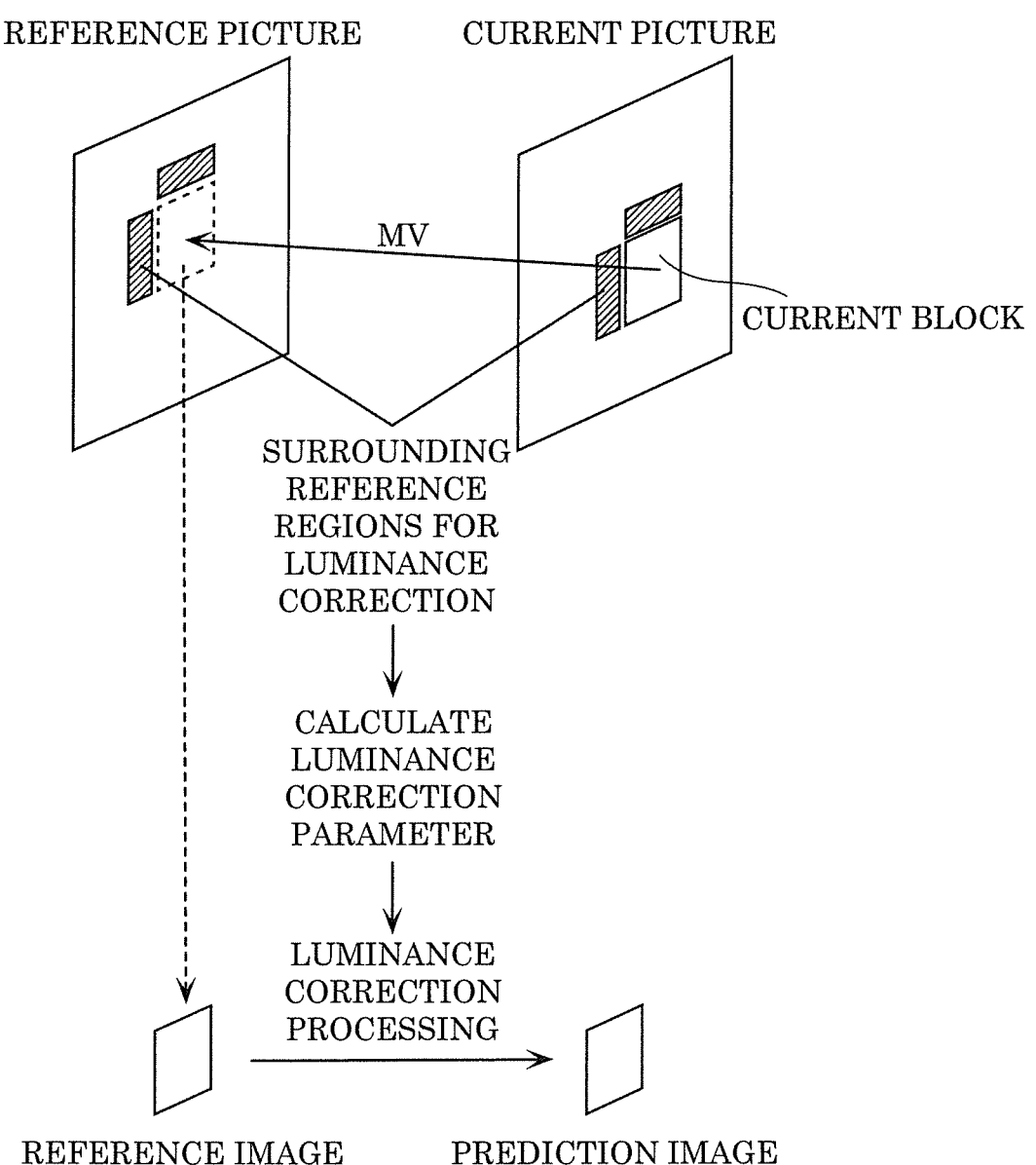
FIG. 9D is for illustrating an outline of a prediction image generation method using a luminance correction process performed via LIC processing.

FIG. 9D is for illustrating an outline of a prediction image generation method using a luminance correction process performed via LIC processing.

First, an MV is extracted for obtaining, from an encoded reference picture, a reference image corresponding to the current block.

Next, information indicating how the luminance value changed between the reference picture and the current picture is extracted and a luminance correction parameter is calculated by using the luminance pixel values for the encoded left neighboring reference region and the encoded upper neighboring reference region, and the luminance pixel value in the same location in the reference picture specified by the MV.

The prediction image for the current block is generated by performing a luminance correction process by using the luminance correction parameter on the reference image in the reference picture specified by the MV.

Note that the shape of the surrounding reference region illustrated in FIG. 9D is just one example; the surrounding reference region may have a different shape.

Moreover, although a prediction image is generated from a single reference picture in this example, in cases in which a prediction image is generated from a plurality of reference pictures as well, the prediction image is generated after performing a luminance correction process, via the same method, on the reference images obtained from the reference pictures.

One example of a method for determining whether to implement LIC processing is by using an lic_flag, which is a signal that indicates whether to implement LIC processing. As one specific example, the encoder determines whether the current block belongs to a region of luminance change. The encoder sets the lic_flag to a value of "1" when the block belongs to a region of luminance change and implements LIC processing when encoding, and sets the lic_flag to a value of "0" when the block does not belong to a region of luminance change and encodes without implementing LIC processing. The decoder switches between implementing LIC processing or not by decoding the lic_flag written in the stream and performing the decoding in accordance with the flag value.

One example of a different method of determining whether to implement LIC processing is determining so in accordance with whether LIC processing was determined to be implemented for a surrounding block. In one specific example, when merge mode is used on the current block, whether LIC processing was applied in the encoding of the surrounding encoded block selected upon deriving the MV in the merge mode processing may be determined, and whether to implement LIC processing or not can be switched based on the result of the determination. Note that in this example, the same applies to the processing performed on the decoder side.

[Decoder Outline]

Figure 10:
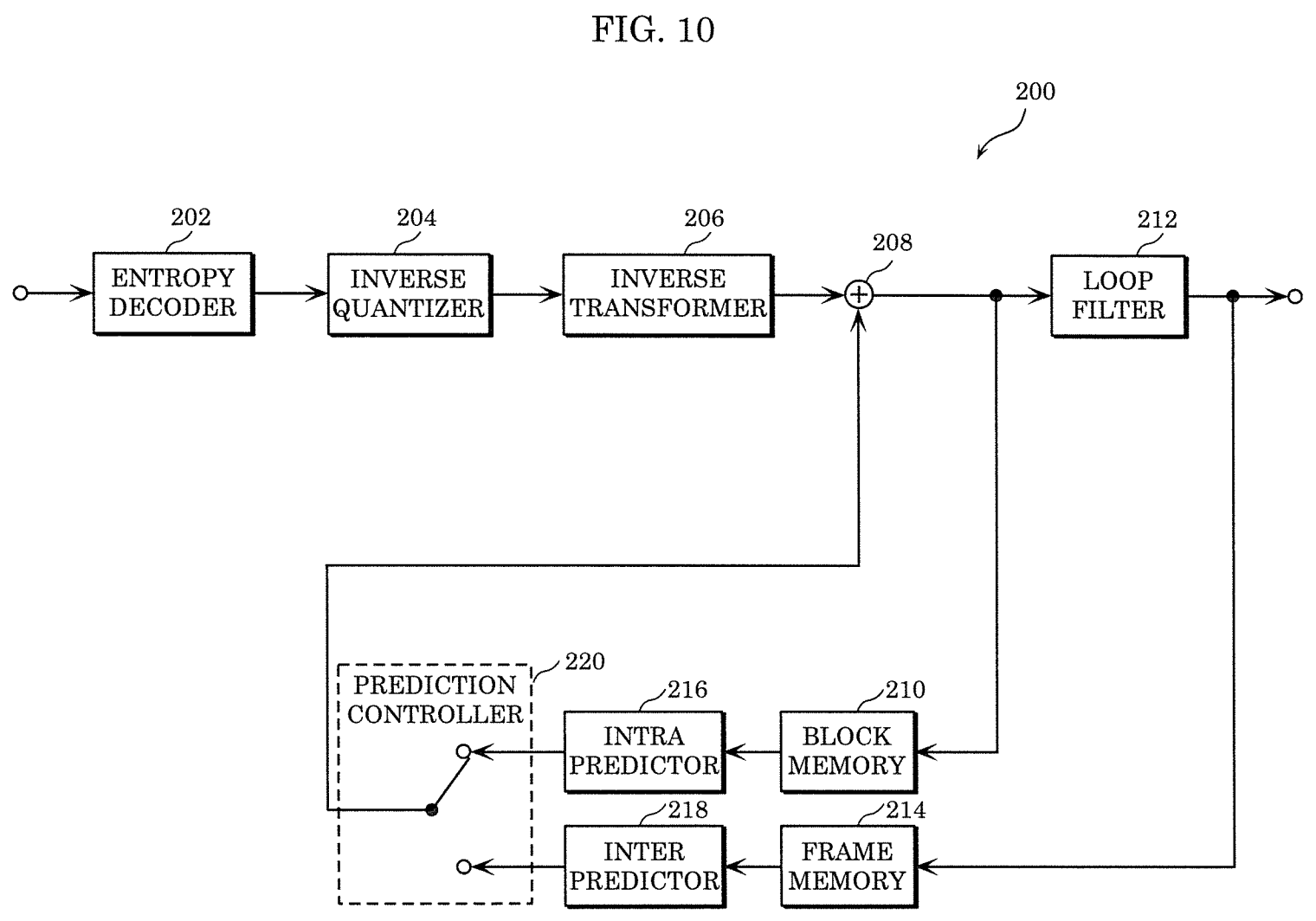

Next, a decoder capable of decoding an encoded signal (encoded bitstream) output from encoder 100 will be described. FIG. 10 is a block diagram illustrating a functional configuration of decoder 200 according to Embodiment 1. Decoder 200 is a moving picture/picture decoder that decodes a moving picture/picture block by block.

As illustrated in FIG. 10, decoder 200 includes entropy decoder 202, inverse quantizer 204, inverse transformer 206, adder 208, block memory 210, loop filter 212, frame memory 214, intra predictor 216, inter predictor 218, and prediction controller 220.

Decoder 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoder 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoder 200 will be described.

[Entropy Decoder]

Entropy decoder 202 entropy decodes an encoded bitstream. More specifically, for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204.

[Inverse Quantizer]

Inverse quantizer 204 inverse quantizes quantized coefficients of a block to be decoded (hereinafter referred to as a current block), which are inputs from entropy decoder 202. More specifically, inverse quantizer 204 inverse quantizes quantized coefficients of the current block based on quantization parameters corresponding to the quantized coefficients. Inverse quantizer 204 then outputs the inverse quantized coefficients (i.e., transform coefficients) of the current block to inverse transformer 206.

[Inverse Transformer]

Inverse transformer 206 restores prediction errors by inverse transforming transform coefficients, which are inputs from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type.

Moreover, for example, when information parsed from an encoded bitstream indicates application of NSST, inverse transformer 206 applies a secondary inverse transform to the transform coefficients.

[Adder]

Adder 208 reconstructs the current block by summing prediction errors, which are inputs from inverse transformer 206, and prediction samples, which is an input from prediction controller 220. Adder 208 then outputs the reconstructed block to block memory 210 and loop filter 212.

[Block Memory]

Block memory 210 is storage for storing blocks in a picture to be decoded (hereinafter referred to as a current picture) for reference in intra prediction. More specifically, block memory 210 stores reconstructed blocks output from adder 208.

[Loop Filter]

Loop filter 212 applies a loop filter to blocks reconstructed by adder 208, and outputs the filtered reconstructed blocks to frame memory 214 and, for example, a display device.

When information indicating the enabling or disabling of ALF parsed from an encoded bitstream indicates enabled, one filter from among a plurality of filters is selected based on direction and activity of local gradients, and the selected filter is applied to the reconstructed block.

[Frame Memory]

Frame memory 214 is storage for storing reference pictures used in inter prediction, and is also referred to as a frame buffer. More specifically, frame memory 214 stores reconstructed blocks filtered by loop filter 212.

[Intra Predictor]

Intra predictor 216 generates a prediction signal (intra prediction signal) by intra prediction with reference to a block or blocks in the current picture and stored in block memory 210. More specifically, intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream, intra predictor 216 corrects post-intra-prediction pixel values based on horizontal/vertical reference pixel gradients.

[Inter Predictor]

Inter predictor 218 predicts the current block with reference to a reference picture stored in frame memory 214. Inter prediction is performed per current block or per sub-block (for example, per 4×4 block) in the current block. For example, inter predictor 218 generates an inter prediction signal of the current block or sub-block by motion compensation by using motion information (for example, a motion vector) parsed from an encoded bitstream, and outputs the inter prediction signal to prediction controller 220.

Note that when the information parsed from the encoded bitstream indicates application of OBMC mode, inter predictor 218 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation using the derived motion information.

Moreover, when BIO mode is to be applied, inter predictor 218 derives a motion vector based on a model assuming uniform linear motion. Moreover, when the information parsed from the encoded bitstream indicates that affine motion compensation prediction mode is to be applied, inter predictor 218 derives a motion vector of each sub-block based on motion vectors of neighboring blocks.

[Prediction Controller]

Prediction controller 220 selects either the intra prediction signal or the inter prediction signal, and outputs the selected prediction signal to adder 208.

[Selection of Secondary Transform Basis]

The following describes selection of a secondary transform basis based on a primary transform basis. For example, transformer 106 of encoder 100 performs a transform on a prediction error, and performs a re-transform on the result of the transform. Then, quantizer 108 of encoder 100 performs quantization on the result of the re-transform. The transform performed on the prediction error is referred to as a primary transform. The re-transform performed on the result of the transform is referred to as a secondary transform. In other words, transformer 106 performs the primary transform on the prediction error, and performs the secondary transform on the result of the primary transform.

More specifically, transformer 106 performs the primary transform on the prediction error using a primary transform basis. Next, transformer 106 performs the secondary transform on the result of the primary transform using a secondary transform basis. The primary transform basis is a transform basis for the primary transform, and the secondary transform basis is a transform basis for the secondary transform. For example, a transform basis includes data patterns. Each data pattern may be referred to as a basis. In this case, the transform basis may be regarded as a basis set including bases.

For example, transformer 106 performs the primary transform on a prediction image by deriving, from a prediction image, a component value of each data pattern of a primary transform basis. In other words, the result of the primary transform is equivalent to the component values derived from the prediction image, and is equivalent to the component values corresponding to the data patterns of the primary transform basis.

Next, transformer 106 performs the secondary transform on the result of the primary transform by deriving, from the result of the primary transform, a component value of each data pattern of a secondary transform basis. In other words, the result of the secondary transform is equivalent to the component values derived from the result of the primary transform, and is equivalent to the component values corresponding to the data patterns of the secondary transform basis.

Decoder 200 performs operations equivalent to those of encoder 100. Specifically, inverse transformer 206 of decoder 200 performs an inverse secondary transform on the result of inverse quantization using an inverse secondary transform basis. In addition, inverse transformer 206 performs an inverse primary transform on the result of the inverse secondary transform using an inverse primary transform basis.

Here, the inverse primary transform is a transform inverse of the primary transform. Decoder 200 derives data before the primary transform from data after the primary transform by performing the inverse primary transform using the inverse primary transform basis. The inverse primary transform basis is a transform basis for the inverse primary transform, and is a transform basis equivalent to the primary transform basis.

Specifically, decoder 200 may perform the inverse primary transform in a procedure opposite to that of the primary transform, using the inverse primary transform basis equivalent to the primary transform basis.

Moreover, the inverse secondary transform is a transform inverse of the secondary transform. Decoder 200 derives data before the secondary transform from data after the secondary transform by performing the inverse secondary transform using the inverse secondary transform basis. The inverse secondary transform basis is a transform basis for the inverse secondary transform, and is a transform basis equivalent to the secondary transform basis.

Specifically, decoder 200 may perform the inverse secondary transform in a procedure opposite to that of the secondary transform, using the inverse secondary transform basis equivalent to the secondary transform basis.

The result of the inverse quantization performed by decoder 200 is equivalent to the result of the secondary transform performed by encoder 100. In other words, the result of the inverse quantization is equivalent to the component values derived from the result of the primary transform, and is equivalent to the component values corresponding to the data patterns of the secondary transform basis. For example, when inverse transformer 206 performs the inverse secondary transform on the result of the inverse quantization, inverse transformer 206 derives the result of the primary transform by combining these component values using the inverse secondary transform basis.

Accordingly, the result of the inverse secondary transform is equivalent to the result of the primary transform performed by encoder 100. In other words, the result of the inverse secondary transform is equivalent to the component values derived from the prediction image, and is equivalent to the component values corresponding to the data patterns of the primary transform basis. For example, when inverse transformer 206 performs the inverse primary transform on the result of the inverse secondary transform, inverse transformer 206 derives a prediction error by combining these component values using the inverse primary transform basis.

Encoder 100 in the present embodiment determines the secondary transform basis for use in the secondary transform based on the primary transform basis for use in the primary transform. Similarly, decoder 200 determines the inverse secondary transform basis for use in the inverse secondary transform based on the inverse primary transform basis for use in the inverse primary transform.

Although the following mainly describes encoder 100 as an example, decoder 200 operates in the same manner as encoder 100. In particular, inverse transformer 206 of decoder 200 operates in the same manner as transformer 106 of encoder 100. For example, the transform, primary transform, secondary transform, primary transform basis, secondary transform basis, etc. in the following description may be appropriately interchangeable with the inverse transform, inverse primary transform, inverse secondary transform, inverse primary transform basis, inverse secondary transform basis, etc.

However, inverse transformer 206 of decoder 200 performs the inverse primary transform after the inverse secondary transform. Encoder 100 encodes information, and decoder 200 decodes the information. For example, when encoder 100 selects a transform basis based on a coding amount, a difference between an original image and a reconstructed image, etc., encoder 100 encodes the information of the transform basis, and decoder 200 decodes the information of the transform basis.

Figure 11:
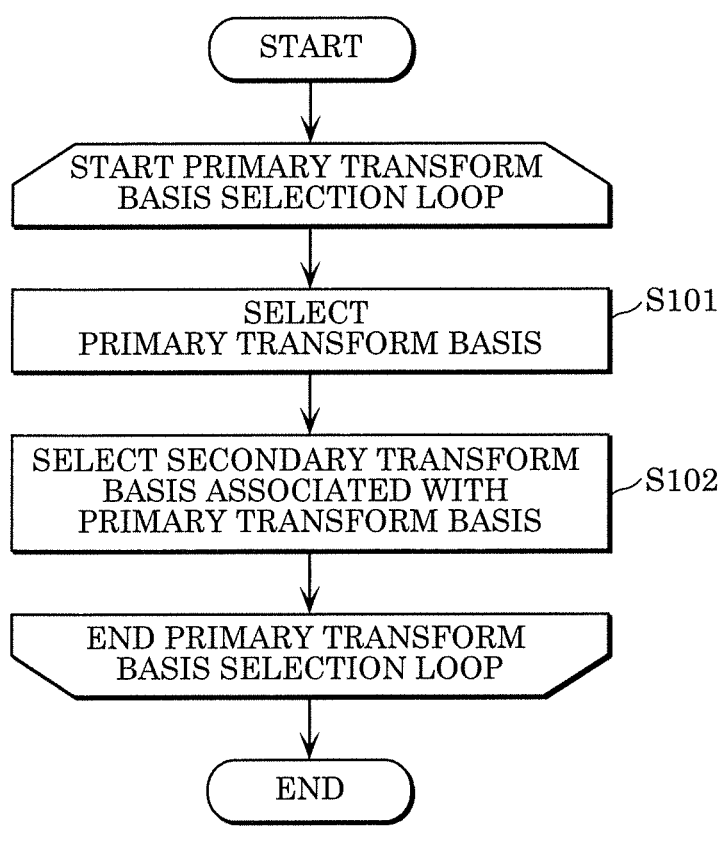
FIG. 11 is a flow chart illustrating selection of a secondary transform basis based on a primary transform basis.

FIG. 11 is a flow chart illustrating selection of a secondary transform basis based on a primary transform basis. For example, transformer 106 of encoder 100 illustrated in FIG. 1 performs the selection illustrated in FIG. 11. Transformer 106 performs the selection of the secondary transform basis based on the primary transform basis before performing a secondary transform. Transformer 106 may perform the selection of the secondary transform basis not only immediately before the secondary transform but also before a primary transform.

For example, transformer 106 selects a primary transform basis for each block or each unit of other data, and selects a secondary transform basis based on the primary transform basis. Here, the block may be a sub-block. In other words, in a loop of selecting a primary transform basis, transformer 106 selects a secondary transform basis based on a primary transform basis.

Specifically, first, transformer 106 selects a primary transform basis (S101). For example, transformer 106 selects a primary transform basis from among primary transform basis candidates that are candidates for the primary transform basis. A primary transform basis candidate is basically an orthogonal transform basis. Any orthogonal transform basis can be used as a primary transform basis candidate.

For example, a primary transform basis candidate may be a transform basis equivalent to DCT2 (DCT-II), DCT5 (DCT-V), DCT8 (DCT-VIII), DST1 (DST-I), or DST7 (DST-VII).

Moreover, transformer 106 may select a primary transform basis based on an evaluation value. This evaluation value may be based on cost evaluation called rate distortion (RD) cost, or may be specifically based on a coding amount and a difference between an original image and a reconstructed image. For example, transformer 106 may calculate an evaluation value for each of primary transform basis candidates, and select a primary transform basis candidate having the highest evaluation value as a primary transform basis from among the primary transform basis candidates.

Alternatively, transformer 106 may select a primary transform basis based on any coding parameter, such as a block size or intra prediction mode. For example, transformer 106 may select a primary transform basis associated with a coding parameter.

Next, transformer 106 selects a secondary transform basis associated with the primary transform basis (S102). For example, transformer 106 selects a secondary transform basis associated with the primary transform basis from among secondary transform basis candidates that are candidates for the secondary transform basis. A secondary transform basis candidate is also basically an orthogonal transform basis. Any orthogonal transform basis can be used as a secondary transform basis candidate.

For example, a transform basis for Karhunen-Loeve (KL) transform may be optimized by offline learning, or may be used as a secondary transform basis candidate. In addition, in offline learning, training data may be selected on a condition based on an association between primary transform basis candidates and secondary primary transform basis candidates. For example, in offline learning of a secondary transform basis candidate associated with a primary transform basis candidate corresponding to DCT2, only the result of primary transform using DCT2 may be used as training data.

A secondary transform basis candidate equivalent to the KL transform may be determined based on training data, or may be associated with a primary transform basis candidate used in selecting the training data. With this, transformer 106 can use the secondary transform basis candidate updated based on the primary transform basis candidate by offline learning. Accordingly, transformer 106 can properly perform the second transform on the result of the primary transform. As a result, it is possible to reduce a coding amount.

Alternatively, a secondary transform basis candidate equivalent to the KL transform may be determined by a primary transform result model equivalent to a prediction error model based on a Gauss-Markov model etc., or may be associated with a primary transform basis candidate used in the primary transform. With this, transformer 106 can use the secondary transform basis candidate determined based on the prediction error model, the primary transform basis candidate, etc. Accordingly, transformer 106 can properly perform the second transform on the result of the primary transform. As a result, it is possible to reduce a coding amount.

Moreover, transformer 106 can reduce an amount of processing by selecting a secondary transform basis associated with a primary transform basis from among secondary transform basis candidates, compared to evaluating each of the secondary transform basis candidates.

In the above description, transformer 106 selects one primary transform basis candidate as the primary transform basis from among the primary transform basis candidates, and then selects the secondary transform basis associated with the primary transform basis from among the secondary transform basis candidates. However, these selections need not be the final selections of the primary transform basis and the secondary transform basis.

For example, by sequentially selecting a secondary transform basis candidate based on an association between primary transform basis candidates and secondary transform basis candidates while sequentially selecting a primary transform basis candidate, transformer 106 may sequentially select a combination of the primary transform basis candidate and the secondary transform basis candidate. Next, transformer 106 may derive an evaluation value, such as a RD cost, for each combination selected sequentially.

Then, transformer 106 may finally select the primary transform basis candidate and the secondary transform basis candidate constituting the combination having the best evaluation value, as a primary transform basis and a secondary transform basis. Consequently, such a selection results in selecting the secondary transform basis based on the primary transform basis.

Moreover, the KL transform may be used as the primary transform. Primary transform basis candidates may each be a transform basis equivalent to the KL transform, or may include a transform basis for the KL transform.

Moreover, the primary transform may be a separable transform, that is, a separable primary transform. Alternatively, the primary transform may be a non-separable transform, that is, a non-separable primary transform. Likewise, the secondary transform may be a separable transform, that is, a separable secondary transform. Alternatively, the secondary transform may be a non-separable transform, that is, a non-separable secondary transform.

Moreover, a transform basis for the separable primary transform and a transform basis for the non-separable primary transform can be also expressed as a separable primary transform basis and a non-separable primary transform basis, respectively. In addition, their candidates can be also expressed as a separable primary transform basis candidate and a non-separable primary transform basis candidate.

Moreover, a transform basis for the separable secondary transform and a transform basis for the non-separable secondary transform can be also expressed as a separable secondary transform basis and a non-separable secondary transform basis, respectively. In addition, their candidates can be also expressed as a separable secondary transform basis candidate and a non-separable secondary transform basis candidate.

Similarly, the inverse primary transform may be a separable inverse transform, that is, a separable inverse primary transform. Alternatively, the inverse primary transform may be a non-separable inverse transform, that is, a non-separable inverse primary transform. Likewise, the inverse secondary transform may be a separable inverse transform, that is, a separable inverse secondary transform. Alternatively, the inverse secondary transform may be a non-separable inverse transform, that is, a non-separable inverse secondary transform.

Moreover, a transform basis for the separable inverse primary transform and a transform basis for the non-separable inverse primary transform can be also expressed as a separable inverse primary transform basis and a non-separable inverse primary transform basis, respectively. In addition, their candidates can be also expressed as a separable inverse primary transform basis candidate and a non-separable inverse primary transform basis candidate.

Moreover, a transform basis for the separable inverse secondary transform and a transform basis for the non-separable inverse secondary transform can be also expressed as a separable inverse secondary transform basis and a non-separable inverse secondary transform basis, respectively. In addition, their candidates can be also expressed as a separable inverse secondary transform basis candidate and a non-separable inverse secondary transform basis candidate.

Here, the separable transform is a transform separable into directional transforms, for example, a transform separable into a vertical transform and a horizontal transform. The non-separable transform is a transform inseparable into directional transforms, for example, a transform inseparable into a vertical transform and a horizontal transform.

Similarly, the separable inverse transform is an inverse transform separable into directional inverse transforms, for example, an inverse transform separable into a vertical inverse transform and a horizontal inverse transform. The non-separable inverse transform is an inverse transform inseparable into directional inverse transforms, for example, an inverse transform inseparable into a vertical inverse transform and a horizontal inverse transform.

Moreover, for example, transformer 106 holds a table in which primary transform basis candidates are associated with secondary transform basis candidates. Transformer 106 selects, as a secondary transform basis, a secondary transform basis candidate associated with a primary transform basis candidate selected as a primary transform basis, by reference to the table.

Moreover, for example, inverse transformer 206 of decoder 200 holds candidates and associations corresponding to the candidates and association held by transformer 106 of encoder 100. Inverse transformer 206 of decoder 200 can determine an inverse primary transform basis and an inverse secondary transform basis in accordance with the candidates and the association in the same manner as transformer 106 of encoder 100.

Hereinafter, examples of an association between primary transform basis candidates and secondary transform basis candidates will be described. It should be noted that, hereinafter, an expression such as DCT2 or DST7 may mean a transform basis such as DCT2 or DST7.

FIG. 12 illustrates the first specific example of an association between separable primary transform basis candidates and non-separable secondary transform basis candidates. In this example, a primary transform is a separable transform equivalent to only DCT2 and DST7, and a secondary transform is a non-separable transform.

The example shows four primary transform basis candidates and four secondary transform basis candidates. Specifically, the four primary transform basis candidates include combinations of vertical DCT2 or DST7 and horizontal DCT2 or DST7. The four secondary transform basis candidates are transform bases 2a, 2b, 2c, and 2d. For example, each of transform bases 2a, 2b, 2c, and 2d is a transform basis equivalent to the KL transform.

Transform basis 2a is associated with the combination of vertical DCT2 and horizontal DCT2. Transform basis 2b is associated with the combination of vertical DCT2 and horizontal DST7. Transform basis 2c is associated with the combination of vertical DST7 and horizontal DCT2. Transform basis 2d is associated with the combination of vertical DST7 and horizontal DST7.

Transformer 106 selects, as a secondary transform basis, a secondary transform basis candidate associated with a primary transform basis candidate selected as a primary transform basis. For example, when transformer 106 selects the combination of vertical DST7 and horizontal DCT2 as a primary transform basis, transformer 106 selects transform basis 2c as a secondary transform basis.

Although the primary transform is equivalent to only DCT2 and DST7 in the example, the primary transform may be equivalent to another transform. Moreover, although the four primary transform basis candidates are used in the example, one primary transform basis candidate may be used, two primary transform basis candidates may be used, three primary transform basis candidates may be used, or at least five primary transform basis candidates may be used.

Furthermore, although the primary transform is the separable transform and the second transform is the non-separable transform in the example, the primary transform is not limited to the separable transform and the secondary transform is not limited to the non-separable transform.

In the example, the four secondary transform basis candidates are each associated with a corresponding one of the four primary transform basis candidates, which are different. In other words, a secondary transform basis candidate can be different for each primary transform basis candidate. However, a secondary transform basis candidate need not always be independent for each primary transform basis candidate. For example, one common secondary transform basis candidate may be associated with at least two of the four primary transform basis candidates, which are different.

Moreover, transform bases 2b and 2c are each associated with a corresponding one of the combination of vertical DCT2 and horizontal DST7 and the combination of vertical DST7 and horizontal DCT2. However, one common secondary transform basis candidate may be associated with primary transform basis candidates constituting combinations of common transform bases having only different direction attributes.

Moreover, two primary transform basis candidates for which the vertical direction and the horizontal direction are interchanged as described above may be associated with two secondary transform basis candidates one of which is obtained by transposing the other. For example, a secondary transform basis candidate is transposed by interchanging data patterns constituting the secondary transform basis candidate. More specifically, the data patterns constituting the secondary transform basis candidate constitute a matrix for the vertical direction and the horizontal direction, and the secondary transform basis candidate may be transposed by transposing this matrix.

Moreover, one primary transform basis candidate may be associated with secondary transform basis candidates. When transformer 106 selects, as a primary transform basis, one primary transform basis candidate associated with secondary transform basis candidates, transformer 106 selects, as a secondary transform basis, one of the secondary transform basis candidates associated with the one primary transform basis candidate.

In this case, transformer 106 may select a secondary transform basis from among these secondary transform basis candidates, based on an evaluation value. Specifically, transformer 106 may calculate an evaluation value, such as a RD cost, for each of the secondary transform basis candidates, and may select, as a secondary transform basis, the secondary transform basis candidate having the best evaluation value from among the secondary transform basis candidates. Alternatively, transformer 106 may select a secondary transform basis from among the secondary transform basis candidates, based on any coding parameter, such as a block size or intra prediction mode.

Moreover, the number of at least one secondary transform basis candidate associated with each primary transform basis candidate need not be constant. In other words, when a primary transform basis candidate changes, the number of the at least one secondary transform basis candidate associated with the primary transform basis candidate may vary. For example, the number of at least one secondary transform basis candidate associated with the primary transform basis candidate may be different for each primary transform basis candidate.

Moreover, when a primary transform basis candidate not associated with a secondary transform basis candidate in the table held by transformer 106 etc. is selected, a predetermined transform basis may be selected.

FIG. 13 is a relationship diagram illustrating the second specific example of an association between separable primary transform basis candidates and non-separable secondary transform basis candidates. FIG. 13 illustrates an example in which one common secondary transform basis candidate is associated with at least two of primary transform basis candidates. Specifically, in this example, transform basis 2b is associated with the combination of vertical DST7 and horizontal DCT2 and the combination of vertical DST7 and horizontal DST7, compared to the example illustrated in FIG. 12.

In other words, transform basis 2a is associated with the combination of vertical DCT2 and horizontal DCT2, and transform basis 2b is associated with the other combinations. Only when transformer 106 selects the combination of vertical DCT2 and horizontal DCT2 as a primary transform basis, transformer 106 selects transform basis 2a as a secondary transform basis; and in other cases, transformer 106 selects transform basis 2b as a secondary transform basis.

FIG. 14 is a relationship diagram illustrating the third specific example of an association between separable primary transform basis candidates and non-separable secondary transform basis candidates. In this example, no transform is associated with the combination of vertical DST7 and horizontal DST7, compared to the example illustrated in FIG. 12.

In other words, when transformer 106 selects the combination of vertical DST7 and horizontal DST7 as a primary transform basis, transformer 106 performs no secondary transform (i.e., the secondary transform is skipped). In other cases, transformer 106 selects a secondary transform basis based on a primary transform basis. Accordingly, transformer 106 determines whether to perform the secondary transform, and the secondary transform basis when the secondary transform is performed, based on the primary transform basis.

It should be noted that, for example, performing no secondary transform is equivalent to performing no secondary transform that changes data. For this reason, performing no secondary transform includes formally performing a secondary transform that maintains data. A secondary transform basis candidate of no transform may be a transform basis for maintaining data. Conversely, for example, performing a secondary transform is equivalent to performing a secondary transform that changes data.

FIG. 15 is a relationship diagram illustrating the fourth specific example of an association between separable primary transform basis candidates and non-separable secondary transform basis candidates. FIG. 15 illustrates an example in which secondary transform basis candidates are associated with one primary transform basis candidate.

Specifically, in this example, transform basis 2*e* is further associated with the combination of vertical DCT2 and horizontal DCT2, compared to the example illustrated in FIG. 12. Moreover, transform basis 2*f* is further associated with the combination of vertical DCT2 and horizontal DST7. Furthermore, transform basis 2*g* is further associated with the combination of vertical DST7 and horizontal DCT2.

In other words, at least one secondary transform basis candidate is associated with one primary transform basis candidate. When transformer 106 selects, as a primary transform basis, one primary transform basis candidate associated with secondary transform basis candidates, transformer 106 selects, as a secondary transform basis, one of the secondary transform basis candidates associated with the one primary transform basis candidate.

In this case, transformer 106 may select a secondary transform basis from among these secondary transform basis candidates, based on an evaluation value, such as a RD cost. Alternatively, transformer 106 may select a secondary transform basis from among the secondary transform basis candidates, based on any coding parameter, such as a block size or intra prediction mode.

For example, when transformer 106 selects the combination of vertical DCT2 and horizontal DCT2 as a primary transform basis, transformer 106 selects transform basis 2*a* or transform basis 2*e* as a secondary transform basis, based on an evaluation value or a coding parameter.

When transformer 106 selects, as a primary transform basis, one primary transform basis candidate associated with one secondary transform basis candidate, transformer 106 selects, as a secondary transform basis, the one secondary transform basis candidate associated with the one primary transform basis candidate. In this example, when transformer 106 selects the combination of vertical DST7 and horizontal DST7 as a primary transform basis, transformer 106 selects transform basis 2*d* as a secondary transform basis.

Moreover, in the example, the one secondary transform basis candidate is associated with the primary transform basis candidate corresponding to the combination of vertical DST7 and horizontal DST7. Two secondary transform basis candidates are associated with each of three other primary transform basis candidates. As in the example, the number of at least one secondary transform basis candidate associated with each primary transform basis candidate need not be constant.

FIG. 16 is a relationship diagram illustrating the fifth specific example of an association between separable primary transform basis candidates and non-separable secondary transform basis candidates. In this example, no transform is used instead of transform basis 2*d* and transform basis 2*g*, compared to the example illustrated in FIG. 15.

In other words, at least one secondary transform basis candidate is associated with one primary transform basis candidate. Further, the at least one secondary transform basis candidate associated with the one primary transform basis candidate may include no transform.

For example, transform basis 2*c* and no transform are associated with the combination of vertical DST7 and horizontal DCT2. Stated differently, secondary transform basis candidates associated with the one primary transform basis candidate may include no transform.

When transformer 106 selects, as a primary transform basis, one primary transform basis candidate associated with secondary transform basis candidates including no transform, transformer 106 selects, as a secondary transform basis, one of the secondary transform basis candidates. In this case, transformer 106 may select a secondary transform basis from among these secondary transform basis candidates, based on an evaluation value, such as a RD cost. Alternatively, transformer 106 may select a secondary transform basis from among the secondary transform basis candidates, based on any coding parameter, such as a block size or intra prediction mode.

When transformer 106 selects a secondary transform basis candidate including no transform as a secondary transform basis, transformer 106 performs no secondary transform. On the other hand, when transformer 106 selects another secondary transform basis candidate as the secondary transform basis, transformer 106 performs the secondary transform using the selected secondary transform basis.

Specifically, when transformer 106 selects the combination of vertical DST7 and horizontal DCT2 as a primary transform basis, transformer 106 selects transform basis 2*c* or no transform as a secondary transform basis. Then, when transformer 106 selects transform basis 2*c* as the secondary transform basis, transformer 106 performs the secondary transform using transform basis 2*c*. On the other hand, when transformer 106 selects no transform as the secondary transform basis, transformer 106 performs no secondary transform (i.e., the secondary transform is skipped).

In this example, at least one secondary transform basis candidate including no transform is determined for each primary transform basis candidate. Specifically, at least one secondary transform basis candidate including no transform is different for each primary transform basis candidate. Accordingly, whether to perform the secondary transform and a secondary transform basis when the secondary transform is performed are determined depending on the primary transform basis.

FIG. 17 is a relationship diagram illustrating the first specific example of an association between separable primary transform basis candidates and separable secondary transform basis candidates. In this example, a primary transform is a separable transform corresponding to only DCT2 and DST7, and a secondary transform is a separable transform. The example shows four primary transform basis candidates and four secondary transform basis candidates. The four primary transform basis candidates are the same as those in the example illustrated in FIG. 12.

The four secondary transform basis candidates are the combination of vertical transform basis 2a1 and horizontal transform basis 2a2, the combination of vertical transform basis 2b1 and horizontal transform basis 2b2, the combination of vertical transform basis 2c1 and horizontal transform basis 2c2, and the combination of vertical transform basis 2d1 and horizontal transform basis 2d2.

The combination of vertical transform basis 2a1 and horizontal transform basis 2a2 is associated with the combination of vertical DCT2 and horizontal DCT2. The combination of vertical transform basis 2b1 and horizontal transform basis 2b2 is associated with the combination of vertical DCT2 and horizontal DST7.

The combination of vertical transform basis 2c1 and horizontal transform basis 2c2 is associated with the combination of vertical DST7 and horizontal DCT2. The combination of vertical transform basis 2d1 and horizontal transform basis 2d2 is associated with the combination of vertical DST7 and horizontal DST7.

Transformer 106 selects, as a secondary transform basis, a secondary transform basis candidate associated with a primary transform basis candidate selected as a primary transform basis. For example, when transformer 106 selects the combination of vertical DST7 and horizontal DCT2 as a primary transform basis, transformer 106 selects the combination of vertical transform basis 2c1 and horizontal transform basis 2c2 as a secondary transform basis.

Although the primary transform is equivalent to only DCT2 and DST7 in the example, the primary transform may be equivalent to another transform. Moreover, although the four primary transform basis candidates are used in the example, one primary transform basis candidate may be used, two primary transform basis candidates may be used, three primary transform basis candidates may be used, or at least five primary transform basis candidates may be used.

In the example, the combinations of the vertical transform bases and the horizontal transform bases are used as the secondary transform basis candidates, and each of the vertical transform bases and the horizontal transform bases is determined independently. In other words, the vertical transform basis and the horizontal transform basis can be different. However, the vertical transform basis and the horizontal transform basis need not be independent of each other. Stated differently, the vertical transform basis and the horizontal transform basis may be set as one common transform basis for the vertical direction and the horizontal direction.

Furthermore, in the example, the four secondary transform basis candidates are each associated with a corresponding one of the four primary transform basis candidates, which are different. In other words, a secondary transform basis candidate can be different for each primary transform basis candidate. However, a secondary transform basis candidate need not always be independent for each primary transform basis candidate. For example, one common secondary transform basis candidate may be associated with at least two of the four primary transform basis candidates, which are different.

Specifically, the combination of vertical transform basis 2a1 and horizontal transform basis 2a2 may be associated with the combination of vertical DCT2 and horizontal DCT2. The combination of vertical transform basis 2b1 and horizontal transform basis 2b2 may be associated with the other combinations.

Moreover, in the example, the secondary transform basis candidate associated with the combination of vertical DCT2 and horizontal DST7 is different from the secondary transform basis candidate associated with the combination of vertical DST7 and horizontal DCT2. However, one common secondary transform basis candidate may be associated with primary transform basis candidates constituting combinations of common transform bases having only different direction attributes.

Moreover, two primary transform basis candidates for which the vertical direction and the horizontal direction are interchanged as described above may be associated with two secondary transform basis candidates one of which is obtained by transposing the other. For example, a secondary transform basis candidate is transposed by interchanging data patterns constituting the secondary transform basis candidate. More specifically, the data patterns constituting the secondary transform basis candidate form a matrix, and the secondary transform basis candidate may be transposed by transposing this matrix.

Furthermore, in transposing a secondary transform basis candidate including a vertical transform basis and a horizontal transform basis, the vertical transform basis and the horizontal transform basis may be each transposed. Alternatively, the vertical transform basis and the horizontal transform basis may be transposed by being interchanged with each other. Alternatively, the vertical transform basis and the horizontal transform basis may be each transposed and interchanged with each other.

Moreover, one primary transform basis candidate may be associated with secondary transform basis candidates. When transformer 106 selects, as a primary transform basis, one primary transform basis candidate associated with secondary transform basis candidates, transformer 106 selects, as a secondary transform basis, one of the secondary transform basis candidates associated with the one primary transform basis candidate.

In this case, transformer 106 may select a secondary transform basis from among these secondary transform basis candidates, based on an evaluation value, such as a RD cost. Alternatively, transformer 106 may select a secondary transform basis from among the secondary transform basis candidates, based on any coding parameter, such as a block size or intra prediction mode.

Moreover, the number of at least one secondary transform basis candidate associated with each primary transform basis candidate need not be constant. In other words, when a primary transform basis candidate changes, the number of the at least one secondary transform basis candidate associated with the primary transform basis candidate may vary. For example, the number of at least one secondary transform basis candidate associated with the primary transform basis candidate may be different for each primary transform basis candidate.

Moreover, when a primary transform basis candidate not associated with a secondary transform basis candidate in the table held by transformer 106 etc. is selected, a predetermined transform basis may be selected.

Although FIG. 13 to FIG. 16 illustrate the variations of the example illustrated in FIG. 12, variations similar to the variations of FIG. 13 to FIG. 16 can be applied to the example illustrated in FIG. 17.

For example, as illustrated in FIG. 13, one common secondary transform basis candidate may be associated with primary transform basis candidates. As illustrated in FIG. 14, no transform may be associated as a secondary transform basis candidate with a primary transform basis candidate. As illustrated in FIG. 15, at least one secondary transform basis candidate may be associated with one primary transform basis candidate. As illustrated in FIG. 16, secondary transform basis candidates including no transform may be associated with one primary transform basis candidate.

FIG. 18 is a relationship diagram illustrating the second specific example of an association between separable primary transform basis candidates and separable secondary transform basis candidates. FIG. 18 illustrates an example in which a vertical transform basis and a horizontal transform basis are set as one common transform basis for the vertical direction and the horizontal direction. Specifically, in this example, two transform bases constituting a combination used as a secondary transform basis candidate are set as one common transform basis for the vertical direction and the horizontal direction, compared to the example illustrated in FIG. 17.

In other words, for a secondary transform basis candidate that is a combination of a vertical transform basis and a horizontal transform basis, the horizontal transform basis is identical to the vertical transform basis. For example, for the secondary transform basis candidate associated with the combination of vertical DCT2 and horizontal DCT2, horizontal transform basis 2*a*1 is identical to vertical transform basis 2*a*1. This standardizes and simplifies processing.

Moreover, in the example, for all the secondary transform basis candidates, the vertical transform bases are identical to the horizontal transform bases. However, for part of the secondary transform basis candidates, the vertical transform bases may be identical to the horizontal transform bases. Stated differently, the secondary transform basis candidates may include a transform basis candidate for which a vertical transform basis is identical to a horizontal transform basis, and a transform basis candidate for which a vertical transform basis is different from a horizontal transform basis.

When one primary transform basis candidate is associated with secondary transform basis candidates, for all the second transform basis candidates associated with the one primary transform basis candidate, vertical transform bases may be identical to horizontal transform bases. Alternatively, for part of the secondary transform basis candidates associated with the one primary transform basis candidate, the vertical transform bases may be identical to the horizontal transform bases.

FIG. 19 is a relationship diagram illustrating a specific example of an association between non-separable primary transform basis candidates and non-separable secondary transform basis candidates. In this example, each of a primary transform and a secondary transform is a non-separable transform.

The example shows four primary transform basis candidates and four secondary transform basis candidates. The four secondary transform basis candidates are transform bases 1*a*, 1*b*, 1*c*, and 1*d*. The four secondary transform basis candidates are transform bases 2*a*, 2*b*, 2*c*, and 2*d*. For example, each of the four primary transform basis candidates and the four secondary transform basis candidates is equivalent to the KL transform. Transform bases 1*a*, 1*b*, 1*c*, and 1*d* are associated with transform bases 2*a*, 2*b*, 2*c*, and 2*d*, respectively.

Transformer 106 selects, as a secondary transform basis, a secondary transform basis candidate associated with a primary transform basis candidate selected as a primary transform basis. For example, when transformer 106 selects transform basis 1*c* as a primary transform basis, transformer 106 selects transform basis 2*c* as a secondary transform basis.

Moreover, although the four primary transform basis candidates are used in the example, one primary transform basis candidate may be used, two primary transform basis candidates may be used, three primary transform basis candidates may be used, or at least five primary transform basis candidates may be used.

Furthermore, in the example, the four secondary transform basis candidates are each associated with a corresponding one of the four primary transform basis candidates, which are different. In other words, a secondary transform basis candidate can be different for each primary transform basis candidate. However, a secondary transform basis candidate need not always be independent for each primary transform basis candidate. For example, one common secondary transform basis candidate may be associated with at least two of the four primary transform basis candidates, which are different.

Specifically, transform basis 2*a* may be associated with transform basis 1*a*, and transform basis 2*b* may be associated with each of transform bases 1*b*, 1*c*, and 1*d*.

Moreover, secondary transform basis candidates may be associated with one primary transform basis candidate. When transformer 106 selects, as a primary transform basis, one primary transform basis candidate associated with secondary transform basis candidates, transformer 106 selects, as a secondary transform basis, one of the secondary transform basis candidates associated with the one primary transform basis candidate.

In this case, transformer 106 may select a secondary transform basis from among these secondary transform basis candidates, based on an evaluation value, such as a RD cost. Alternatively, transformer 106 may select a secondary transform basis from among the secondary transform basis candidates, based on any coding parameter, such as a block size or intra prediction mode.

Moreover, the number of at least one secondary transform basis candidate associated with each primary transform basis candidate need not be constant. In other words, when a primary transform basis candidate changes, the number of the at least one secondary transform basis candidate associated with the primary transform basis candidate may vary. For example, the number of at least one secondary transform basis candidate associated with the primary transform basis candidate may be different for each primary transform basis candidate.

Moreover, when a primary transform basis candidate not associated with a secondary transform basis candidate in the table held by transformer 106 etc. is selected, a predetermined transform basis may be selected.

Although FIG. 13 to FIG. 16 illustrate the variations of the example illustrated in FIG. 12, variations similar to the variations of FIG. 13 to FIG. 16 can be applied to the example illustrated in FIG. 19.

For example, as illustrated in FIG. 13, one common secondary transform basis candidate may be associated with primary transform basis candidates. As illustrated in FIG. 14, no transform may be associated as a secondary transform basis candidate with a primary transform basis candidate. As illustrated in FIG. 15, at least one secondary transform basis candidate may be associated with one primary transform basis candidate. As illustrated in FIG. 16, secondary transform basis candidates including no transform may be associated with one primary transform basis candidate.

FIG. 20 is a relationship diagram illustrating a specific example of an association between non-separable primary transform basis candidates and separable secondary transform basis candidates. In this example, a primary transform is a non-separable transform, and a secondary transform is a separable transform. The example shows four primary transform basis candidates and four secondary transform basis candidates.

The four secondary transform basis candidates are transform bases 1*a*, 1*b*, 1*c*, and 1*d*. The four secondary transform basis candidates are the combination of vertical transform basis 2*a*1 and horizontal transform basis 2*a*2, the combination of vertical transform basis 2*b*1 and horizontal transform basis 2*b*2, the combination of vertical transform basis 2*c*1 and horizontal transform basis 2*c*2, and the combination of vertical transform basis 2*d*1 and horizontal transform basis 2*d*2. For example, each of the four primary transform basis candidates and the four secondary transform basis candidates is equivalent to the KL transform.

The combination of vertical transform basis 2*a*1 and horizontal transform basis 2*a*2 is associated with transform basis 1*a*. The combination of vertical transform basis 2*b*1 and horizontal transform basis 2*b*2 is associated with transform basis 1*b*. The combination of vertical transform basis 2*c*1 and horizontal transform basis 2*c*2 is associated with transform basis 1*c*. The combination of vertical transform basis 2*d*1 and horizontal transform basis 2*d*2 is associated with transform basis 1*d*.

Transformer 106 selects, as a secondary transform basis, a secondary transform basis candidate associated with a primary transform basis candidate selected as a primary transform basis. For example, when transformer 106 selects transform basis 1*c* as a primary transform basis, transformer 106 selects the combination of vertical transform basis 2*c*1 and horizontal transform basis 2*c*2 as a secondary transform basis.

Although the four primary transform basis candidates are used in the example, one primary transform basis candidate may be used, two primary transform basis candidates may be used, three primary transform basis candidates may be used, or at least five primary transform basis candidates may be used.

In the example, the combinations of the vertical transform bases and the horizontal transform bases are used as the secondary transform basis candidates, and each of the vertical transform bases and the horizontal transform bases is determined independently. In other words, the vertical transform basis and the horizontal transform basis can be different. However, the vertical transform basis and the horizontal transform basis need not be independent of each other. Stated differently, the vertical transform basis and the horizontal transform basis may be set as one common transform basis for the vertical direction and the horizontal direction.

Furthermore, in the example, the four secondary transform basis candidates are each associated with a corresponding one of the four primary transform basis candidates, which are different. In other words, a secondary transform basis candidate can be different for each primary transform basis candidate. However, a secondary transform basis candidate need not always be independent for each primary transform basis candidate. For example, one common secondary transform basis candidate may be associated with at least two of the four primary transform basis candidates, which are different.

Specifically, the combination of vertical transform basis 2*a*1 and horizontal transform basis 2*a*2 may be associated with transform basis 1*a*. The combination of vertical transform basis 2*b*1 and horizontal transform basis 2*b*2 may be associated with each of transform bases 1*b*, 1*c*, and 1*d*.

Moreover, secondary transform basis candidates may be associated with one primary transform basis candidate. When transformer 106 selects, as a primary transform basis, one primary transform basis candidate associated with secondary transform basis candidates, transformer 106 selects, as a secondary transform basis, one of the secondary transform basis candidates associated with the one primary transform basis candidate.

In this case, transformer 106 may select a secondary transform basis from among these secondary transform basis candidates, based on an evaluation value, such as a RD cost. Alternatively, transformer 106 may select a secondary transform basis from among the secondary transform basis candidates, based on any coding parameter, such as a block size or intra prediction mode.

Moreover, the number of at least one secondary transform basis candidate associated with each primary transform basis candidate need not be constant. In other words, when a primary transform basis candidate changes, the number of the at least one secondary transform basis candidate associated with the primary transform basis candidate may vary. For example, the number of at least one secondary transform basis candidate associated with the primary transform basis candidate may be different for each primary transform basis candidate.

Moreover, when a primary transform basis candidate not associated with a secondary transform basis candidate in the table held by transformer 106 etc. is selected, a predetermined transform basis may be selected.

Although FIG. 13 to FIG. 16 illustrate the variations of the example illustrated in FIG. 12, variations similar to the variations of FIG. 13 to FIG. 16 can be applied to the example illustrated in FIG. 20.

For example, as illustrated in FIG. 13, one common secondary transform basis candidate may be associated with primary transform basis candidates. As illustrated in FIG. 14, no transform may be associated as a secondary transform basis candidate with a primary transform basis candidate. As illustrated in FIG. 15, at least one secondary transform basis candidate may be associated with one primary transform basis candidate. As illustrated in FIG. 16, secondary transform basis candidates including no transform may be associated with one primary transform basis candidate.

Although FIG. 18 illustrates the variation of the example illustrated in FIG. 17, a variation similar to the variation of FIG. 18 can be applied to the example illustrated in FIG. 20. For example, as illustrated in FIG. 18, a common transform basis for the vertical direction and the horizontal direction may be used as a secondary transform basis.

FIG. 21 is a relationship diagram illustrating a specific example of an association between primary transform basis candidates and secondary transform basis candidates in a state in which separable transforms and non-separable transforms are present.

Primary transform basis candidates may include a separable primary transform basis candidate, or may include a non-separable primary transform basis candidate. Transformer 106 performs a separable primary transform or a non-separable primary transform according to a primary transform basis candidate selected as a primary transform basis.

In other words, when transformer 106 selects a separable primary transform basis candidate as a primary transform basis, transformer 106 performs the separable primary transform using the separable primary transform basis candidate selected as the primary transform basis. When transformer 106 selects a non-separable primary transform basis candidate as the primary transform basis, transformer 106 performs the non-separable primary transform using the non-separable primary transform basis candidate selected as the primary transform basis.

A separable secondary transform basis candidate may be associated with a separable primary transform basis candidate, a non-separable secondary transform basis candidate may be associated with the separable primary transform basis candidate, or both of them may be associated with the separable primary transform basis candidate. Further, a separable secondary transform basis candidate may be associated with a non-separable primary transform basis candidate, a non-separable secondary transform basis candidate may be associated with the non-separable primary transform basis candidate, or both of them may be associated with the non-separable primary transform basis candidate. Transformer 106 performs a separable secondary transform or a non-separable secondary transform according to a secondary transform basis candidate selected as a secondary transform basis.

In other words, when transformer 106 selects the separable secondary transform basis candidate as the secondary transform basis, transformer 106 performs the separable secondary transform using the separable secondary transform basis candidate selected as the secondary transform basis. Moreover, when transformer 106 selects the non-separable secondary transform basis candidate as the secondary transform basis, transformer 106 performs the non-separable secondary transform using the non-separable secondary transform basis candidate selected as the secondary transform basis.

Although the secondary transform basis is selected based on the primary transform basis in the above description, the secondary transform basis may be selected based on the primary transform basis and a coding parameter. A coding parameter is encoded by encoder 100 and is decoded by decoder 200. In the following description, an intra prediction mode is used as a coding parameter for selecting a secondary transform basis.

Figure 22:
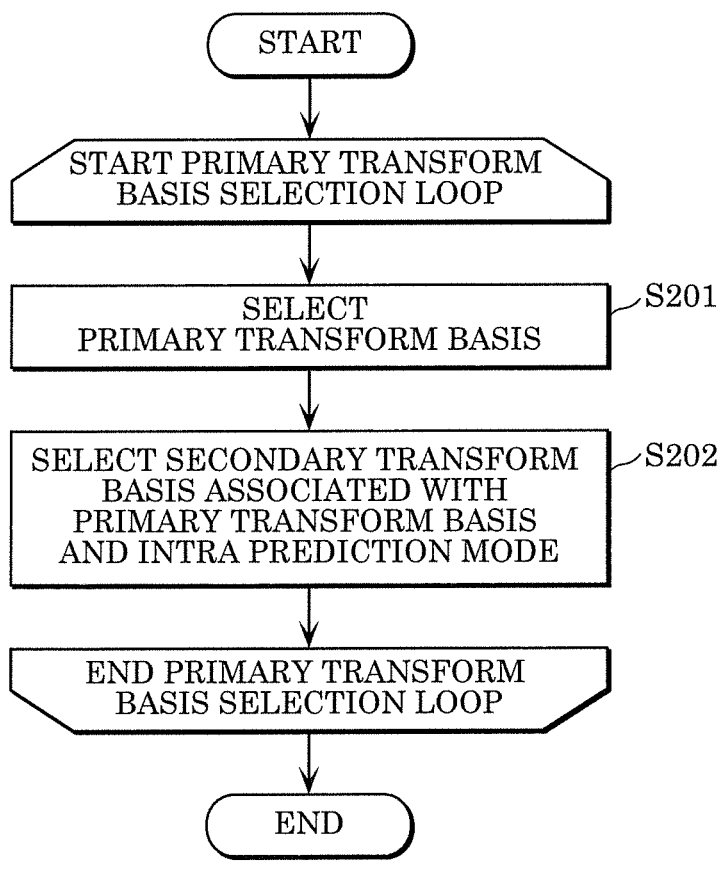
FIG. 22 is a flow chart illustrating selection of a secondary transform basis based on a primary transform basis and an intra prediction mode.

FIG. 22 is a flow chart illustrating selection of a secondary transform basis based on a primary transform basis and an intra prediction mode. For example, transformer 106 of encoder 100 illustrated in FIG. 1 performs the selection illustrated in FIG. 22.

The selection of the primary transform basis (S201) illustrated in FIG. 22 is the same as the selection of the primary transform basis (S101) illustrated in FIG. 11. In the selection of the secondary transform basis (S202) illustrated in FIG. 22, transformer 106 selects a secondary transform basis associated with a primary transform basis and an intra prediction mode, compared to the selection of the secondary transform basis (S102) illustrated in FIG. 11.

In other words, in the example illustrated in FIG. 22, the intra prediction mode is used in addition to the primary transform basis. The intra prediction mode includes, for example, an intra prediction direction and a luminance and chrominance prediction mode (LMChroma mode). For example, when the selected primary transform basis corresponds to a combination of vertical DCT2 and horizontal DCT2, and the intra prediction mode is a planar prediction, transformer 106 selects a secondary transform basis candidate associated with the combination of vertical DCT2 and horizontal DCT2 and the planar prediction.

The secondary transform basis candidate associated with the combination of vertical DCT2 and horizontal DCT2 and the planar prediction may be a secondary transform basis candidate updated by offline learning using training data corresponding to coefficient information in the case of the combination of vertical DCT2 and horizontal DCT2 and the planar prediction. Alternatively, a secondary transform basis candidate equivalent to the KL transform may be determined using a coefficient information model obtained from the combination of vertical DCT2 and horizontal DCT2, based on a prediction error model derived based on the Gauss-Markov model regarding the planar prediction.

FIG. 23 is a relationship diagram illustrating a specific example of an association between intra prediction modes, separable primary transform basis candidates, and non-separable secondary transform basis candidates. In this example, planar prediction and DC prediction are indicated as an intra prediction mode. Further, other intra prediction modes may be used. A primary transform is a separable transform equivalent to only DCT2 and DST7, and a secondary transform is a non-separable transform.

Moreover, in the example, primary transform basis candidates are the combination of vertical DCT2 and horizontal DCT2, the combination of vertical DCT2 and horizontal DST7, the combination of vertical DST7 and horizontal DCT2, the combination of vertical DST7 and horizontal DST7, etc. Secondary transform basis candidates are transform bases 2a, 2b, 2c, 2d, 2e, 2f, 2g, and 2h etc. For example, each of the secondary transform basis candidates is equivalent to the KL transform.

Transform basis 2a is associated with the planar prediction and the combination of vertical DCT2 and horizontal DCT2. Transform basis 2b is associated with the planar prediction and the combination of vertical DCT2 and horizontal DST7. Transform basis 2c is associated with the planar prediction and the combination of vertical DST7 and horizontal DCT2. Transform basis 2d is associated with the planar prediction and the combination of vertical DST7 and horizontal DST7.

Transform basis 2e is associated with the DC prediction and the combination of vertical DCT2 and horizontal DCT2. Transform basis 2f is associated with the DC prediction and the combination of vertical DCT2 and horizontal DST7. Transform basis 2g is associated with the DC prediction and the combination of vertical DST7 and horizontal DCT2. Transform basis 2h is associated with the DC prediction and the combination of vertical DST7 and horizontal DST7.

Transformer 106 selects, as a secondary transform basis, a secondary transform basis candidate associated with the intra prediction mode used for prediction and a primary transform basis candidate selected as a primary transform basis. For example, when the DC prediction is used as the intra prediction mode, and transformer 106 selects the combination of vertical DST7 and horizontal DCT2 as a primary transform basis, transformer 106 selects transform basis 2g as a secondary transform basis.

In the example, primary transform basis candidates are associated with secondary transform basis candidates for each intra prediction mode. In other words, an association between the primary transform basis candidates and the secondary transform basis candidates can be different for each intra prediction mode. Transformer 106 refers to a table as illustrated in FIG. 23, and selects a secondary transform basis candidate associated with an intra prediction mode and a primary transform basis, based on the intra prediction mode and the primary transform basis.

However, the association between the primary transform basis candidates and the secondary transform basis candidates need not always be different for each intra prediction mode. For example, an association between primary transform basis candidates and secondary transform basis candidates may be common to at least two of different intra prediction modes.

The primary transform basis candidates and the secondary transform basis candidates associated with each other for each intra prediction mode have the same relationship as the relationship illustrated in FIG. 12. Stated differently, the description of the example illustrated in FIG. 12 can be applied to the example illustrated in FIG. 23. In addition, the variations illustrated in FIG. 13 to FIG. 21 can be applied to the primary transform basis candidates and the secondary transform basis candidates associated with each other for each intra prediction mode.

For example, as illustrated in FIG. 13, one common secondary transform basis candidate may be associated with primary transform basis candidates. As illustrated in FIG. 14, no transform may be associated as a secondary transform basis candidate with a primary transform basis candidate. As illustrated in FIG. 15, at least one secondary transform basis candidate may be associated with one primary transform basis candidate. As illustrated in FIG. 16, secondary transform basis candidates including no transform may be associated with one primary transform basis candidate.

As illustrated in FIG. 17, each of the primary transform and the secondary transform may be a separable transform. As illustrated in FIG. 18, a vertical transform basis and a horizontal transform basis may be identical in a separable secondary transform basis candidate. As illustrated in FIG. 19, each of the primary transform and the secondary transform may be a non-separable transform. As illustrated in FIG. 20, the primary transform may be a non-separable transform, and the secondary transform may be a separable transform. As illustrated in FIG. 21, each of the primary transform and the secondary transform may include a separable transform and a non-separable transform.

Although the intra prediction mode is used as the coding parameter for selecting the secondary transform basis in the above description, the coding parameter for selecting the secondary transform basis is not limited to the intra prediction mode. At least one of parameters, such as block sizes, quantization parameters, motion vector lengths of motion vectors, or directions of motion vectors, can be used as the coding parameter for selecting the secondary transform basis. In other words, at least one of these may be associated with a primary transform basis candidate and a secondary transform basis candidate.

Moreover, for example, the above coding parameter may be a parameter different from a parameter relating to a transform, and a parameter relating to splitting corresponding to a block size etc., prediction corresponding to a picture type etc., quantization, or filter.

In selection of a secondary transform basis based on a primary transform basis and a coding parameter, there is a possibility that processing is complex and the amount of processing is large, compared to selection of a secondary transform basis based on only the primary transform basis. However, the selection of the secondary transform basis based on the primary transform basis and the coding parameter results in appropriate selection of the secondary transform basis. Accordingly, it is possible to further reduce a coding amount.

Regarding the selection of the secondary transform basis described using FIG. 11 to FIG. 23, when a secondary transform basis is uniquely determined based on not an evaluation value but on a primary transform basis or a primary transform basis and a coding parameter, information indicating the secondary transform basis need not be encoded. In this case, the information indicating the secondary transform basis need not be decoded.

Similarly, when a primary transform basis is uniquely determined based on not an evaluation value but on a coding parameter, information indicating the primary transform basis need not be encoded. In this case, the information indicating the primary transform basis need not be decoded. When a primary transform basis is uniquely determined based on not an evaluation value but on a secondary transform basis or a secondary transform basis and a coding parameter, information indicating the secondary transform basis is encoded, and information indicating the primary transform basis need not be encoded. In this case, the information indicating the primary transform basis need not be decoded.

Accordingly, encoder 100 may encode only one of the primary transform basis and the secondary transform basis. Decoder 200 may decode only one of the primary transform basis and the secondary transform basis.

The bit count of the information indicating the secondary transform basis may depend on the number of at least one secondary transform basis candidate associated with a selected primary transform basis candidate etc. For example, when the number of at least one secondary transform basis candidate associated with a selected primary transform basis candidate etc. is two, the secondary transform basis may be indicated by 1 bit. In other words, in this case, a 1-bit syntax element may be encoded and decoded as information indicating the secondary transform basis. Similarly, the bit count of the information indicating the primary transform basis may depend on the number of primary transform basis candidates.

The number of the at least one secondary transform basis candidate associated with the primary transform basis candidate etc. may be adaptively determined according to the primary transform basis candidate, the intra prediction mode, the block size, etc. For example, when a primary transform basis candidate is a combination of vertical DCT2 and horizontal DCT2, and the intra prediction mode is the planar prediction or the DC prediction, two secondary transform basis candidates may be used; and in other cases, three secondary transform basis candidates may be used.

Although the secondary transform basis is selected based on the primary transform basis etc. in the above description, when a secondary transform basis is selected before a primary transform basis, the primary transform basis may be selected based on the selected secondary transform basis etc. For example, transformer 106 may select a primary transform basis associated with a selected secondary transform basis etc.

Similarly, although the inverse secondary transform basis is selected based on the inverse primary transform basis etc. in the above description, when an inverse secondary transform basis is selected before an inverse primary transform basis, the inverse primary transform basis may be selected based on the selected inverse secondary transform basis etc. For example, transformer 206 may select an inverse primary transform basis associated with a selected inverse secondary transform basis etc.

Transformer 106 may perform a secondary transform not entirely but partially on the result of a primary transform. For example, transformer 106 may perform the secondary transform on low frequency components of the result of the primary transform, or may not perform the secondary transform on high frequency components of the result of the primary transform. In other words, transformer 106 may perform the secondary transform on a sub-block having an arbitrary size in the low frequency side in a block to be transformed.

A transform matrix may not always be used in each of the primary transform and the secondary transform. For example, a transform function equivalent to a transform matrix may be used. An orthogonal transform equivalent to the primary transform or the secondary transform may be performed by superimposing Givens rotations. Butterfly computation may be used.

For example, a separable transform and a non-separable transform may be present in the primary transform or the secondary transform. For example, when the intra prediction mode indicates 18 equivalent to a horizontal intra prediction direction, 50 equivalent to a vertical intra prediction direction, or a value close to these, the separable transform may be used. In other cases, the non-separable transform may be used. In other words, a separable transform basis or a non-separable transform basis may be selected based on the intra prediction mode.

The selection of the secondary transform basis based on the primary transform basis etc. may be enabled or disabled on a per slice basis. In other words, information indicating whether the selection of the secondary transform basis based on the primary transform basis etc. is enabled may be encoded and decoded for each slice. Moreover, the selection of the secondary transform basis based on the primary transform basis etc. may be enabled or disabled on a per tile basis. In other words, information indicating whether the selection of the secondary transform basis based on the primary transform basis etc. is enabled may be encoded and decoded for each tile.

Furthermore, the selection of the secondary transform basis based on the primary transform basis etc. may be enabled or disabled on a per CTU basis. In other words, information indicating whether the selection of the secondary transform basis based on the primary transform basis etc. is enabled may be encoded and decoded for each CTU. Moreover, the selection of the secondary transform basis based on the primary transform basis etc. may be enabled or disabled on a per CU basis. In other words, information indicating whether the selection of the secondary transform basis based on the primary transform basis etc. is enabled may be encoded and decoded for each CU.

Furthermore, the selection of the secondary transform basis based on the primary transform basis etc. may be enabled or disabled according to a frame type such as an I frame, a P frame, or a B frame. Moreover, the selection of the secondary transform basis based on the primary transform basis etc. may be enabled or disabled according to a prediction mode such as the intra prediction or the inter prediction.

Furthermore, the selection of the secondary transform basis based on the primary transform basis etc. may be enabled or disabled according to luminance or chrominance. For example, the selection of the secondary transform basis based on the primary transform basis etc. may be performed for one of the luminance and the chrominance, and the selection of the secondary transform basis based on the primary transform basis etc. may not be performed for the other of the luminance and the chrominance. Alternatively, the selection of the secondary transform basis based on the primary transform basis etc. may be performed for each of the luminance and the chrominance.

When transformer 106 does not perform the selection of the secondary transform basis based on the primary transform basis etc., transformer 106 may select a secondary transform basis based on another selection criterion. For example, transformer 106 may select a predetermined secondary transform basis, may select a secondary transform basis based on an evaluation value, or may select a secondary transform basis based on a coding parameter.

Transformer 106 is not limited to selecting a primary transform basis from among primary transform basis candidates, or may determine a primary transform basis more flexibly. For example, transformer 106 may construct a primary transform basis dynamically according to a coding parameter etc., or may adjust a selected primary transform basis according to a coding parameter etc.

Similarly, transformer 106 is not limited to selecting a secondary transform basis from among secondary transform basis candidates, or may determine a secondary transform basis more flexibly. For example, in determining a secondary transform basis, transformer 106 may generate the secondary transform basis dynamically according to a primary transform basis etc., or may adjust a selected secondary transform basis according to a coding parameter etc.

Implementation Example of Encoder

Figure 24:
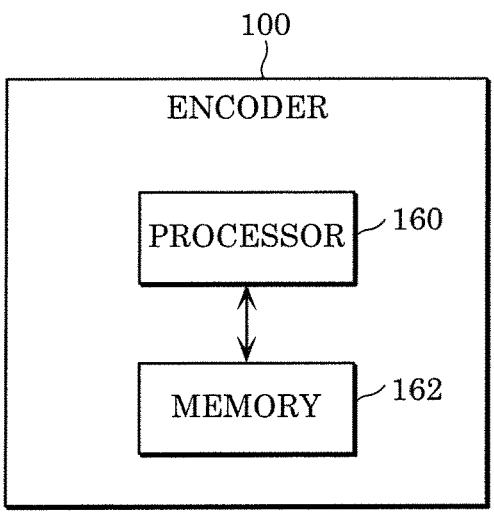
FIG. 24 is a block diagram illustrating an implementation example of an encoder according to Embodiment 1.

FIG. 24 is a block diagram illustrating an implementation example of encoder 100 according to Embodiment 1. Encoder 100 includes processor 160 and memory 162. For example, the plurality of constituent elements of encoder 100 illustrated in FIG. 1 are implemented by processor 160 and memory 162 illustrated in FIG. 24.

Processor 160 is an electronic circuit accessible to memory 162, and performs information processing. For example, processor 160 is an exclusive or general processor that encodes a video using memory 162. Processor 160 may be a central processing unit (CPU).

Processor 160 may include a plurality of electronic circuits, or may include a plurality of sub-processors. Moreover, processor 160 may perform the functions of constituent elements among the plurality of constituent elements of encoder 100 illustrated in FIG. 1, except the constituent elements that store information.

Memory 162 is an exclusive or general memory for storing information used by processor 160 to encode a video. Memory 162 may be an electronic circuit, may be connected to processor 160, or may be included in processor 160.

Memory 162 may include a plurality of electronic circuits, or may include a plurality of sub-memories. Memory 162 may be a magnetic disk or an optical disc etc., or may be expressed as storage or a recording medium etc. Further, memory 162 may be a non-volatile memory or a volatile memory.

Moreover, memory 162 may perform the functions of, among the plurality of constituent elements of encoder 100 illustrated in FIG. 1, the constituent elements that store information. Specifically, memory 162 may perform the functions of block memory 118 and frame memory 122 illustrated in FIG. 1.

Memory 162 may store a video to be encoded, or may store a bitstream corresponding to an encoded video. Moreover, memory 162 may store a program for causing processor 160 to encode a video. Furthermore, memory 162 may store information etc. indicating an association between primary transform basis candidates and secondary transform basis candidates.

It should be noted that not all of the plurality of constituent elements illustrated in FIG. 1 need to be implemented by encoder 100, and not all of the processes described above need to be performed by encoder 100. Some of the plurality of constituent elements illustrated in FIG. 1 may be included in another device, and some of the processes described above may be performed by another device. Processing relating to transform is properly performed by encoder 100 implementing some of the plurality of constituent elements illustrated in FIG. 1 and performing some of the processes described above.

Figure 25:
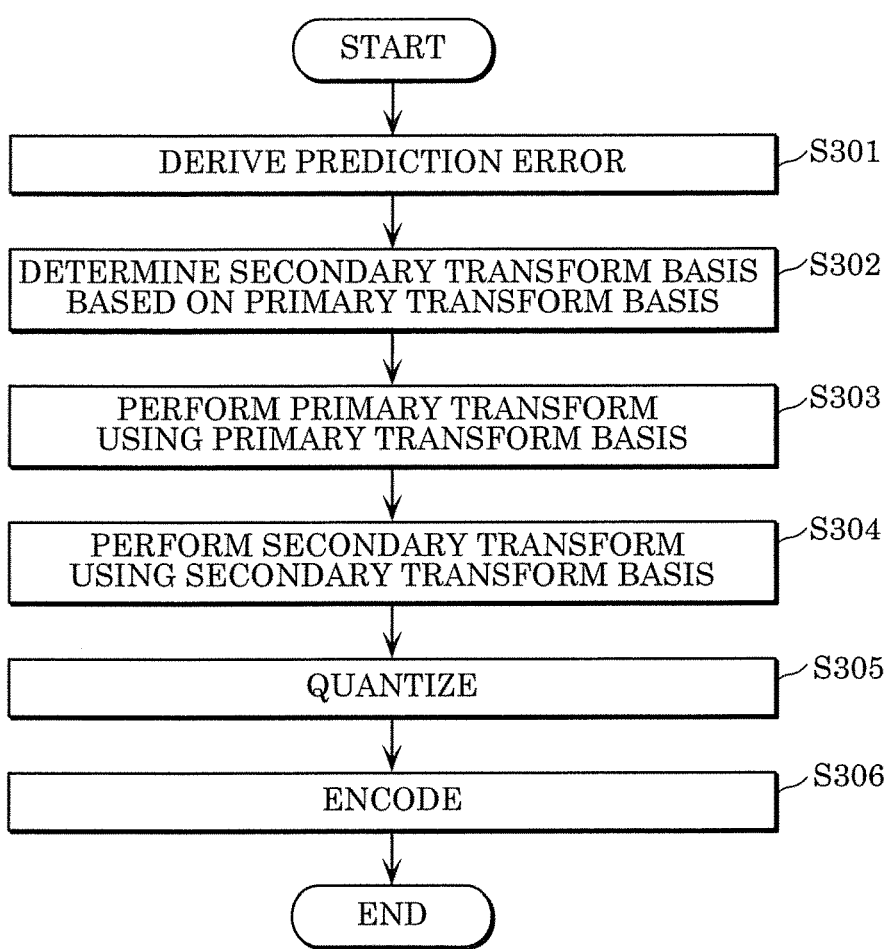
FIG. 25 is a flow chart illustrating an example of operations performed by the encoder according to Embodiment 1.

FIG. 25 is a flow chart illustrating an example of operations performed by encoder 100 illustrated in FIG. 24. For example, encoder 100 illustrated in FIG. 24 performs the operations illustrated in FIG. 25 when encoder 100 encodes a video.

Specifically, processor 160 derives a prediction error by subtracting a prediction image from an image included in a video (S301). Next, processor 160 determines a secondary transform basis based on a primary transform basis (S302). Then, processor 160 performs a primary transform on the prediction error using the primary transform basis (S303). Next, processor 160 performs a secondary transform on the result of the primary transform using the secondary transform basis (S304).

After that, processor 160 performs quantization on the result of the secondary transform (S305). Finally, processor 160 encodes a result of the quantization as data of the image (S306).

For example, processor 160 may determine the secondary transform basis based on the primary transform basis and a parameter encoded when the processor encodes the video. This parameter may be a parameter indicating an intra prediction mode. In addition, processor 160 may determine the secondary transform basis based on the primary transform basis and the intra prediction mode indicated by the parameter.

Moreover, for example, processor 160 may determine the primary transform basis from among a plurality of primary transform basis candidates. In addition, processor 160 may determine the secondary transform basis from among at least one secondary transform basis candidate associated with a primary transform basis candidate determined as the primary transform basis among the plurality of primary transform basis candidates.

Moreover, for example, at least two of the plurality of primary transform basis candidates may be associated with a common secondary transform basis candidate. Furthermore, a total number of at least one secondary transform basis candidate associated with the primary transform basis candidate may depend on the primary transform basis candidate.

Moreover, for example, the secondary transform basis determined when the primary transform basis is a combination of a first transform basis for a vertical direction and a second transform basis for a horizontal direction may be identical to the secondary transform basis determined when the primary transform basis is a combination of the second transform basis for the vertical direction and the first transform basis for the horizontal direction. Furthermore, the secondary transform basis determined when the primary transform basis is a combination of a first transform basis for a vertical direction and a second transform basis for a horizontal direction may be a transform basis obtained by transposing the secondary transform basis determined when the primary transform basis is a combination of the second transform basis for the vertical direction and the first transform basis for the horizontal direction.

Moreover, for example, when the secondary transform basis is a combination of a transform basis for a vertical direction and a transform basis for a horizontal direction, the transform basis for the vertical direction and the transform basis for the horizontal direction may be identical.

Moreover, for example, processor 160 may encode only one of the information indicating the primary transform basis and the information indicating the secondary transform basis.

Moreover, for example, when there is only one secondary transform basis candidate associated with a primary transform basis candidate determined as the primary transform basis, processor 160 may avoid encoding information indicating the secondary transform basis determined. Furthermore, when a total number of transform basis candidates for one of information indicating the primary transform basis and information indicating the secondary transform basis is limited to one, processor 160 may encode only the other of the information indicating the primary transform basis and the information indicating the secondary transform basis.

Moreover, for example, the secondary transform basis may be a transform basis equivalent to Karhunen-Loeve transform. In addition, the secondary transform basis may be a transform basis learned based on the primary transform basis.

Moreover, for example, when the secondary transform basis is a separable transform basis, processor 160 may perform a separable transform as the secondary transform, and when the secondary transform basis is a non-separable transform basis, processor 160 may perform a non-separable transform as the secondary transform. Furthermore, processor 160 may determine whether to perform the secondary transform, and the secondary transform basis when the secondary transform is performed, based on the primary transform basis.

Moreover, for example, each of the primary transform and the secondary transform may be a separable transform or a non-separable transform.

Processor 160 may separate the primary transform into a plurality of directional primary transforms, and may perform the primary transform by performing the plurality of directional primary transforms. Alternatively, processor 160 may perform the primary transform without separating the primary transform into the plurality of directional primary transforms. Moreover, processor 160 may separate the secondary transform into a plurality of directional secondary transforms, and may perform the secondary transform by performing the plurality of directional secondary transforms. Alternatively, processor 160 may perform the secondary transform without separating the secondary transform into the plurality of directional secondary transforms.

It should be noted that encoder 100 is not limited to the above-described implementation example, or may include subtractor 104, transformer 106, quantizer 108, and entropy encoder 110. These constituent elements may perform the above-described operations.

For example, subtractor 104 may derive a prediction error by subtracting a prediction image from an image included in a video. Transformer 106 may determine a secondary transform basis based on a primary transform basis. Moreover, transformer 106 may perform a primary transform on the prediction error using the primary transform basis. Furthermore, transformer 106 may perform a secondary transform on the result of the primary transform using the secondary transform basis.

Quanitzer 108 may perform quantization on a result of the secondary transform. Entropy encoder 110 may encode a result of the quantization as data of the image.

Further, transformer 106 may perform other operations relating to transform, and entropy encoder 110 may perform other operations relating to encoding. In addition, transformer 106 may be divided into a primary transform basis determiner that determines a primary transform basis, a primary transformer that performs a primary transform, a secondary transform basis determiner that determines a secondary transform basis, and a secondary transformer that performs a secondary transform.

Implementation Example of Decoder

Figure 26:
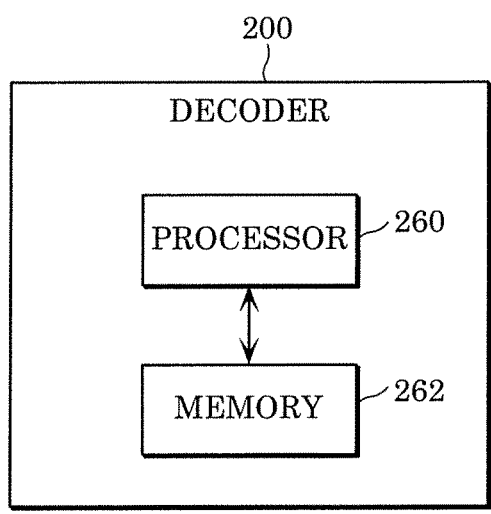
FIG. 26 is a block diagram illustrating an implementation example of a decoder according to Embodiment 1.

FIG. 26 is a block diagram illustrating an implementation example of decoder 200 according to Embodiment 1. Decoder 200 includes processor 260 and memory 262. For example, the plurality of constituent elements of decoder 200 illustrated in FIG. 10 are implemented by processor 260 and memory 262 illustrated in FIG. 26.

Processor 260 is an electronic circuit accessible to memory 262, and performs information processing. For example, processor 260 is an exclusive or general processor that decodes a video using memory 262. Processor 260 may be a central processing unit (CPU).

Processor 260 may include a plurality of electronic circuits, or may include a plurality of sub-processors. Moreover, processor 260 may perform the functions of constituent elements among the plurality of constituent elements of decoder 200 illustrated in FIG. 10, except the constituent elements that store information.

Memory 262 is an exclusive or general memory for storing information used by processor 260 to decode a video. Memory 262 may be an electronic circuit, may be connected to processor 260, or may be included in processor 260.

Memory 262 may include a plurality of electronic circuits, or may include a plurality of sub-memories. Memory 262 may be a magnetic disk or an optical disc etc., or may be expressed as storage or a recording medium etc. Further, memory 262 may be a non-volatile memory or a volatile memory.

Moreover, memory 262 may perform the functions of, among the plurality of constituent elements of decoder 200 illustrated in FIG. 10, the constituent elements that store information. Specifically, memory 262 may perform the functions of block memory 210 and frame memory 214 illustrated in FIG. 10.

Memory 262 may store a bitstream corresponding to an encoded video, or may store a video corresponding to a decoded bitstream. Moreover, memory 262 may store a program for causing processor 260 to decode a video. Furthermore, memory 262 may store information etc. indicating an association between inverse primary transform basis candidates and inverse secondary transform basis candidates.

It should be noted that not all of the plurality of constituent elements illustrated in FIG. 10 need to be implemented by decoder 200, and not all of the processes described above need to be performed by decoder 200. Some of the plurality of constituent elements illustrated in FIG. 10 may be included in another device, and some of the processes described above may be performed by another device. Processing relating to transform is properly performed by decoder 200 implementing some of the plurality of constituent elements illustrated in FIG. 10 and performing some of the processes described above.

Figure 27:
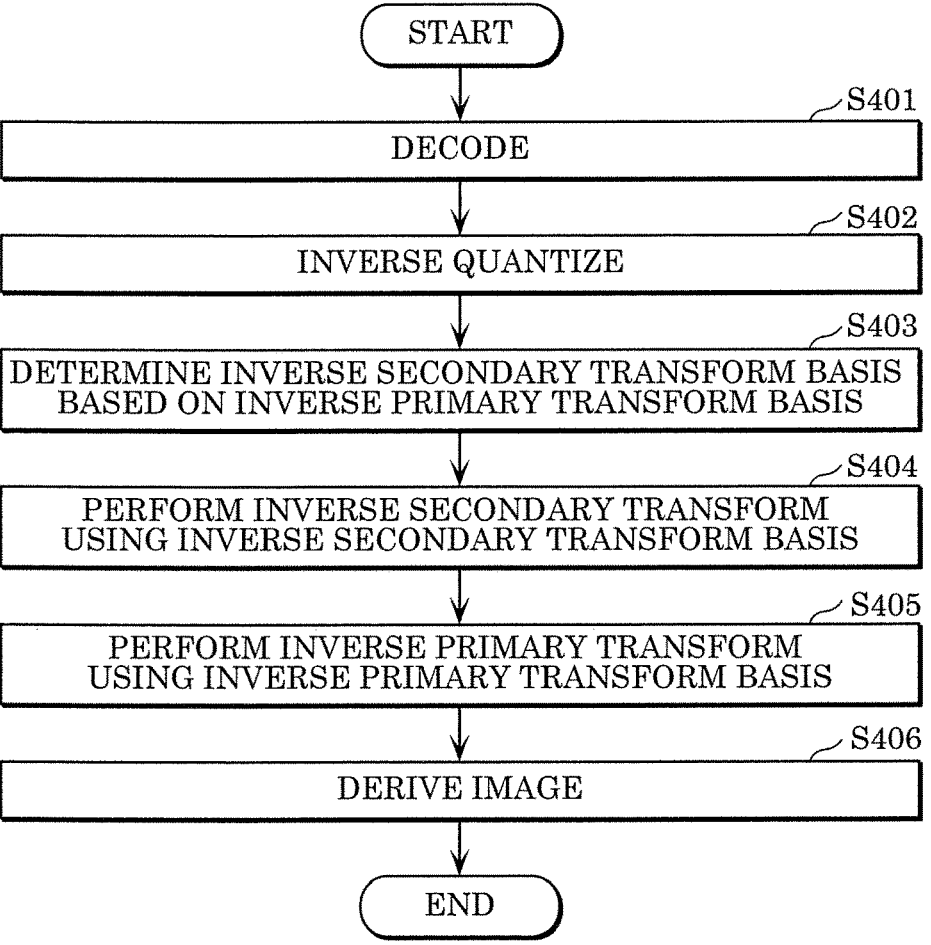
FIG. 27 is a flow chart illustrating an example of operations performed by the decoder according to Embodiment 1.

FIG. 27 is a flow chart illustrating an example of operations performed by decoder 200 illustrated in FIG. 26. For example, decoder 200 illustrated in FIG. 26 performs the operations illustrated in FIG. 27 when decoder 200 decodes a video.

Specifically, processor 260 decodes data of an image included in a video (S401). Next, processor 260 performs inverse quantization on the data (S402).

Then, processor 260 determines an inverse secondary transform basis based on an inverse primary transform basis (S403). Next, processor 260 performs an inverse secondary transform on the result of the inverse quantization using the inverse secondary transform basis (S404). After that, processor 260 performs an inverse primary transform on the result of the inverse secondary transform using the inverse primary transform basis (S405). Finally, processor 260 derives the image by adding a result of the inverse primary transform as a prediction error of the image to a prediction image of the image (S406).

For example, processor 260 may determine the inverse secondary transform basis based on the inverse primary transform basis and a parameter decoded when the processor decodes the video. This parameter may be a parameter indicating an intra prediction mode. In addition, processor 260 may determine the inverse secondary transform basis based on the inverse primary transform basis and the intra prediction mode indicated by the parameter.

Moreover, for example, processor 260 may determine the inverse primary transform basis from among a plurality of inverse primary transform basis candidates. Furthermore, processor 260 may determine the inverse secondary transform basis from among at least one inverse secondary transform basis candidate associated with an inverse primary transform basis candidate determined as the inverse primary transform basis among the plurality of inverse primary transform basis candidates.

Moreover, for example, at least two of the plurality of inverse primary transform basis candidates may be associated with a common inverse secondary transform basis candidate. Furthermore, a total number of the at least one inverse secondary transform basis candidate associated with the inverse primary transform basis candidate may depend on the inverse primary transform basis candidate.

Moreover, for example, the inverse secondary transform basis determined when the inverse primary transform basis is a combination of a first transform basis for a vertical direction and a second transform basis for a horizontal direction may be identical to the inverse secondary transform basis determined when the inverse primary transform basis is a combination of the second transform basis for the vertical direction and the first transform basis for the horizontal direction. Furthermore, the inverse secondary transform basis determined when the inverse primary transform basis is a combination of a first transform basis for a vertical direction and a second transform basis for a horizontal direction may be a transform basis obtained by transposing the inverse secondary transform basis determined when the inverse primary transform basis is a combination of the second transform basis for the vertical direction and the first transform basis for the horizontal direction.

Moreover, for example, when the inverse secondary transform basis is a combination of a transform basis for a vertical direction and a transform basis for a horizontal direction, the transform basis for the vertical direction and the transform basis for the horizontal direction may be identical.

Moreover, for example, processor 260 may decode only one of the information indicating the inverse primary transform basis and the information indicating the inverse secondary transform basis.

Moreover, for example, when there is only one inverse secondary transform basis candidate associated with an inverse primary transform basis candidate determined as the inverse primary transform basis, processor 260 may avoid decoding information indicating the inverse secondary transform basis determined. Furthermore, when a total number of transform basis candidates for one of information indicating the inverse primary transform basis and information indicating the inverse secondary transform basis is limited to one, processor 260 may decode only the other of the information indicating the inverse primary transform basis and the information indicating the inverse secondary transform basis.

Moreover, for example, the inverse secondary transform basis may be a transform basis equivalent to Karhunen-Loeve transform. In addition, the inverse secondary transform basis may be a transform basis learned based on the inverse primary transform basis.

Moreover, for example, when the inverse secondary transform basis is a separable inverse transform basis, processor 260 may perform a separable inverse transform as the inverse secondary transform, and when the inverse secondary transform basis is a non-separable inverse transform basis, processor 260 may perform a non-separable inverse transform as the inverse secondary transform.

Moreover, for example, processor 260 may determine whether to perform the inverse secondary transform, and the inverse secondary transform basis when the inverse secondary transform is performed, based on the inverse primary transform basis.

Moreover, for example, each of the inverse primary transform and the inverse secondary transform may be a separable inverse transform or a non-separable inverse transform.

Processor 260 may separate the inverse primary transform into a plurality of directional inverse primary transforms, and may perform the inverse primary transform by performing the plurality of directional inverse primary transforms. Alternatively, processor 260 may perform the inverse primary transform without separating the inverse primary transform into the plurality of directional inverse primary transforms. Moreover, processor 260 may separate the inverse secondary transform into a plurality of directional inverse secondary transforms, and may perform the inverse secondary transform by performing the plurality of directional inverse secondary transforms. Alternatively, processor 260 may perform the inverse secondary transform without separating the inverse secondary transform into the plurality of directional inverse secondary transforms.

It should be noted that decoder 200 is not limited to the above-described implementation example, or may include entropy decoder 202, inverse quantizer 204, inverse transformer 206, and adder 208. These constituent elements may perform the above-described operations.

For example, entropy decoder 202 may decode data of an image included in a video. Inverse quantizer 204 may perform inverse quantization on the data.

Inverse transformer 206 may determine an inverse secondary transform basis based on an inverse primary transform basis. Moreover, inverse transformer 206 may perform an inverse secondary transform on the result of the inverse quantization using the inverse secondary transform basis. Furthermore, inverse transformer 206 may perform an inverse primary transform on the result of the inverse secondary transform using the inverse primary transform basis. Adder 208 may derive the image by adding a result of the inverse primary transform as a prediction error of the image to a prediction image of the image.

Further, inverse transformer 206 may perform other operations relating to transform, and entropy decoder 202 may perform other operations relating to decoding. In addition, inverse transformer 206 may be divided into an inverse transform basis determiner that determines an inverse primary transform basis, an inverse primary transformer that performs an inverse primary transform, an inverse secondary transform basis determiner that determines an inverse secondary transform basis, an inverse secondary transformer that performs an inverse secondary transform, etc.

[Supplemental Information]

Encoder 100 and decoder 200 in the present embodiment may be used respectively as an image encoder and an image decoder, or may be used respectively as a video encoder and a video decoder. Alternatively, encoder 100 and decoder 200 can be each used as a transformer.

To put it differently, encoder 100 and decoder 200 may correspond only to transformer 106 and inverse transformer 206. Other constituent elements such as inter predictor 126 or 218 may be included in another device.

At least part of the present embodiment may be used as an encoding method, may be used as a decoding method, may be used as a transforming method, or may be used as another method.

In the present embodiment, each of the constituent elements may be configured of dedicated hardware, or may be implemented by executing a software program suitable for the constituent element. Each constituent element may be implemented by a program executor such as a CPU or a processor reading and executing a software program recorded on a recording medium such as a hard disk or a semiconductor memory.

Specifically, each of encoder 100 and decoder 200 may include processing circuitry, and storage electrically connected to the processing circuitry and accessible from the processing circuitry. For example, the processing circuitry corresponds to processor 160 or 260, and the storage corresponds to memory 162 or 262.

The processing circuitry includes at least one of dedicated hardware or a program executor, and performs processing using the storage. When the processing circuitry includes the program executor, the storage stores a software program executed by the program executor.

Here, software that implements, for example, encoder 100 or decoder 200 according to the present embodiment is a program as follows.

Specifically, the program may cause a computer to execute an encoding method of encoding a video, the encoding method including: deriving a prediction error of an image included in the video, by subtracting a prediction image of the image from the image; determining a secondary transform basis based on a primary transform basis, the primary transform basis being a transform basis for a primary transform to be performed on the prediction error, the secondary transform basis being a transform basis for a secondary transform to be performed on a result of the primary transform; performing the primary transform on the prediction error using the primary transform basis; performing the secondary transform on a result of the primary transform using the secondary transform basis; performing quantization on a result of the secondary transform; and encoding a result of the quantization as data of the image.

Alternatively, the program may cause a computer to execute a decoding method of decoding a video, the decoding method including: decoding data of an image included in the video; performing inverse quantization on the data; determining an inverse secondary transform basis based on an inverse primary transform basis, the inverse primary transform basis being a transform basis for an inverse primary transform to be performed on a result of an inverse secondary transform, the inverse secondary transform basis being a transform basis for the inverse secondary transform to be performed on a result of the inverse quantization; performing the inverse secondary transform on a result of the inverse quantization using the inverse secondary transform basis; performing the inverse primary transform on a result of the inverse secondary transform using the inverse primary transform basis; and deriving the image by adding a result of the inverse primary transform as a prediction error of the image to a prediction image of the image.

Each constituent element may be a circuit as described above. These circuits may constitute one circuitry as a whole, or may be separate circuits. Each constituent element may be implemented by a general processor, or may be implemented by an exclusive processor.

Processing executed by a specific constituent element may be executed by another constituent element. In addition, the processing execution order may be changed, or a plurality of processes may be executed in parallel. An encoding and decoding device may include encoder 100 and decoder 200.

The ordinal numbers such as "first" and "second" used in the description may be changed as appropriate. A new ordinal number may be given to the constituent elements, or the ordinal numbers of the constituent elements may be removed.

Although aspects of encoder 100 and decoder 200 have been described above based on the embodiment, the aspects of encoder 100 and decoder 200 are not limited to the embodiment. Various modifications to the present embodiment that are conceivable to those skilled in the art, as well as embodiments resulting from combinations of constituent elements in different embodiments may be included within the scope of the aspects of encoder 100 and decoder 200, so long as they do not depart from the essence of the present disclosure.

The present aspect may be implemented in combination with one or more of the other aspects in the present disclosure. In addition, part of the processes in the flowcharts, part of the constituent elements of the apparatuses, and part of the syntax described in this aspect may be implemented in combination with other aspects.

Embodiment 2

As described in each of the above embodiments, each functional block can typically be realized as an MPU and memory, for example. Moreover, processes performed by each of the functional blocks are typically realized by a program execution unit, such as a processor, reading and executing software (a program) recorded on a recording medium such as ROM. The software may be distributed via, for example, downloading, and may be recorded on a recording medium such as semiconductor memory and distributed. Note that each functional block can, of course, also be realized as hardware (dedicated circuit).

Moreover, the processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture encoding method (image encoding method) and the moving picture decoding method (image decoding method) described in each of the above embodiments and a system that employs the same will be described. The system is characterized as including an image encoder that employs the image encoding method, an image decoder that employs the image decoding method, and an image encoder/decoder that includes both the image encoder and the image decoder. Other configurations included in the system may be modified on a case-by-case basis.

Usage Examples

Figure 28:
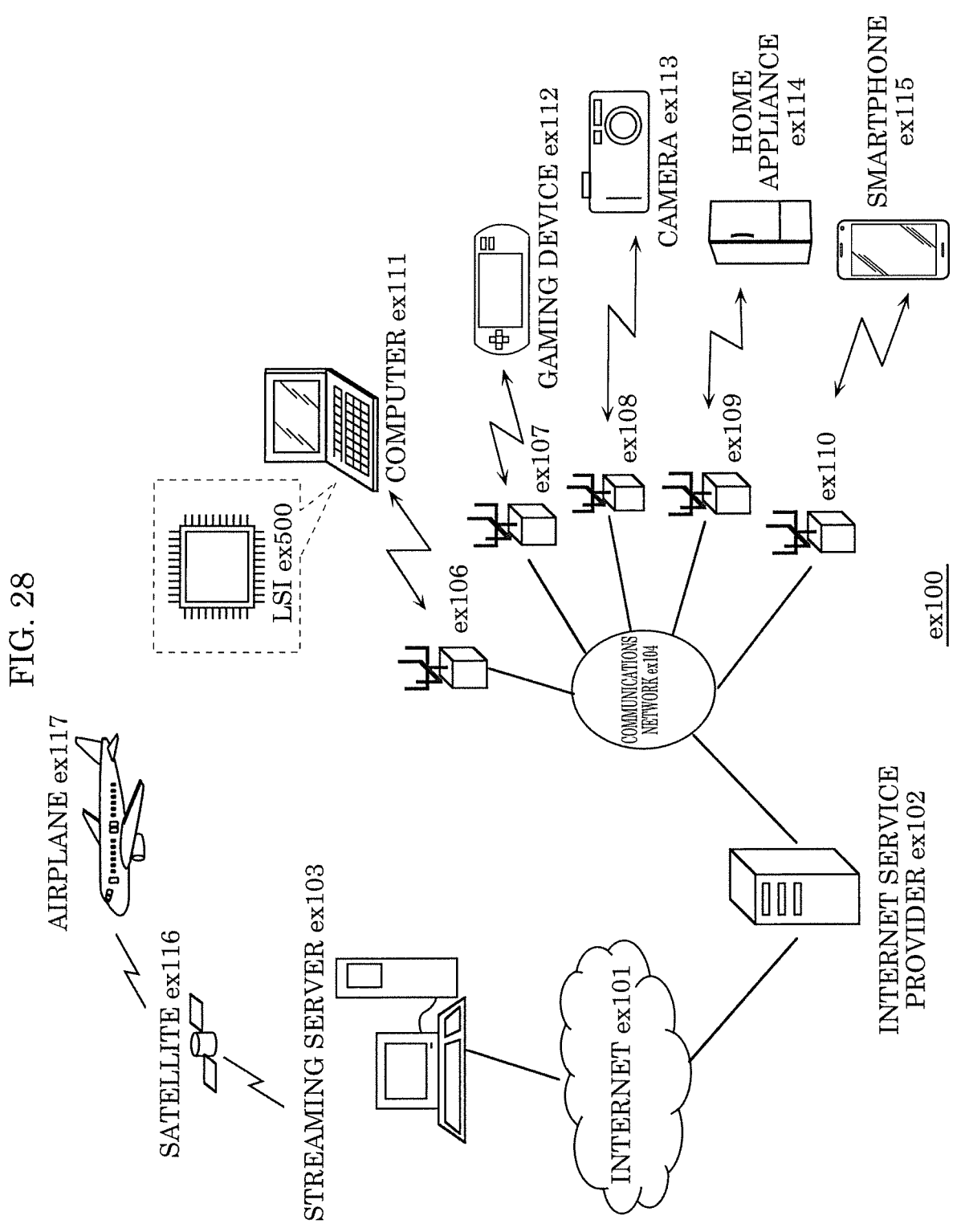
FIG. 28 illustrates an overall configuration of a content providing system for implementing a content distribution service.

FIG. 28 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiments on still-image or video content captured by a user via the terminal, multiplexes video data obtained via the encoding and audio data obtained by encoding audio corresponding to the video, and transmits the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoder according to one aspect of the present disclosure.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information, and the server may generate superimposed data based on three-dimensional data stored in the server in accordance with the received motion, and encode and stream the generated superimposed data to the decoder. Note that superimposed data includes, in addition to RGB values, an α value indicating transparency, and the server sets the α value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoder or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

[Scalable Encoding]

Figure 29:
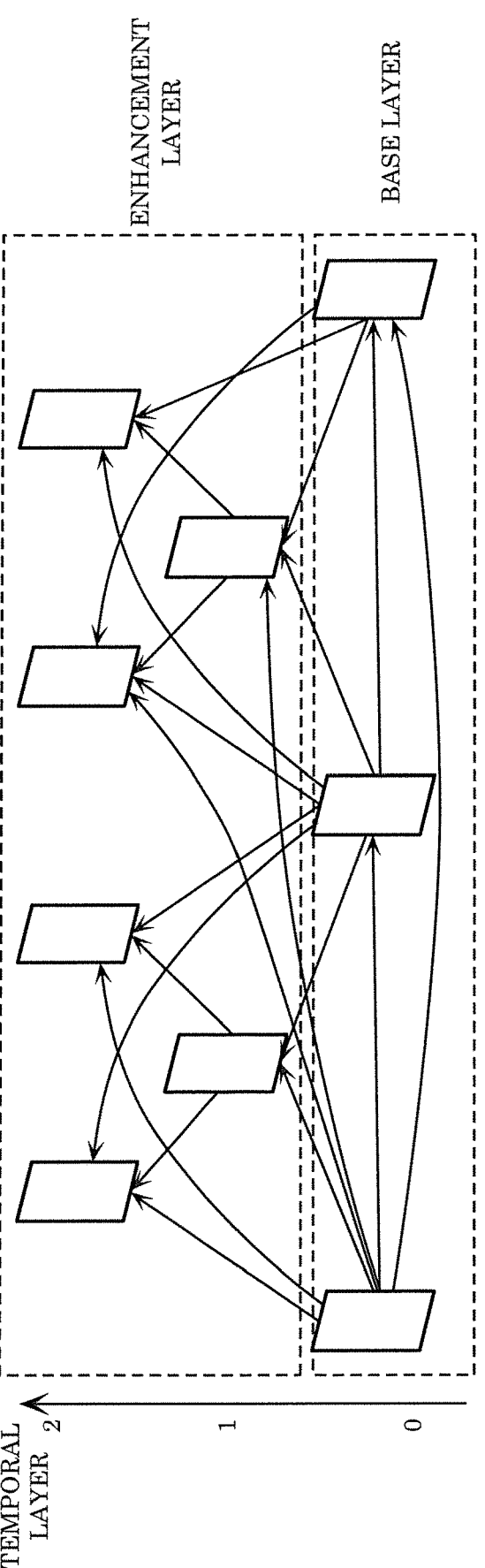
FIG. 29 illustrates one example of an encoding structure in scalable encoding.

The switching of content will be described with reference to a scalable stream, illustrated in FIG. 29, that is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 29. Note that there may be a plurality of individual streams that are of the same content but different quality. In other words, by determining which layer to decode up to based on internal factors, such as the processing ability on the decoder side, and external factors, such as communication bandwidth, the decoder side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoder side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 30:
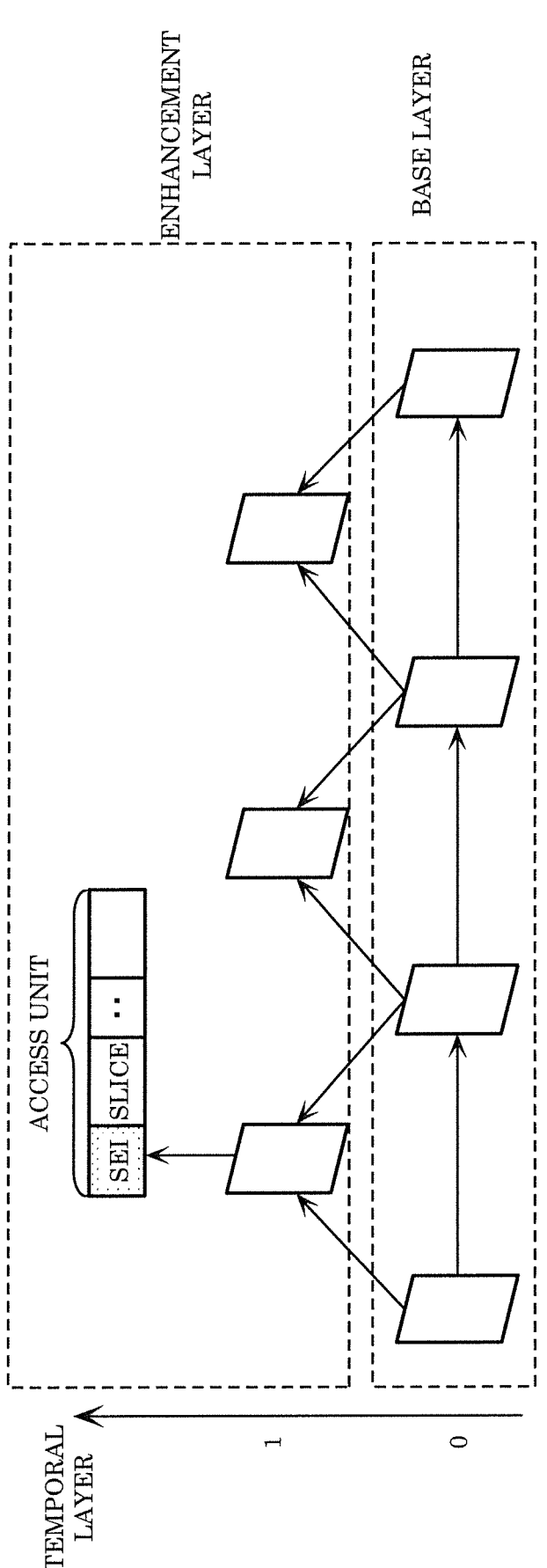
FIG. 30 illustrates one example of an encoding structure in scalable encoding.

Alternatively, a configuration in which a picture is divided into, for example, tiles in accordance with the meaning of, for example, an object in the image, and on the decoder side, only a partial region is decoded by selecting a tile to decode, is also acceptable. Moreover, by storing an attribute about the object (person, car, ball, etc.) and a position of the object in the video (coordinates in identical images) as metadata, the decoder side can identify the position of a desired object based on the metadata and determine which tile or tiles include that object. For example, as illustrated in FIG. 30, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoder side can obtain, for example, the time at which a specific person appears in the video, and by fitting that with picture unit information, can identify a picture in which the object is present and the position of the object in the picture.

US 12,641,234 B2

59

[Web Page Optimization]

Figure 31:
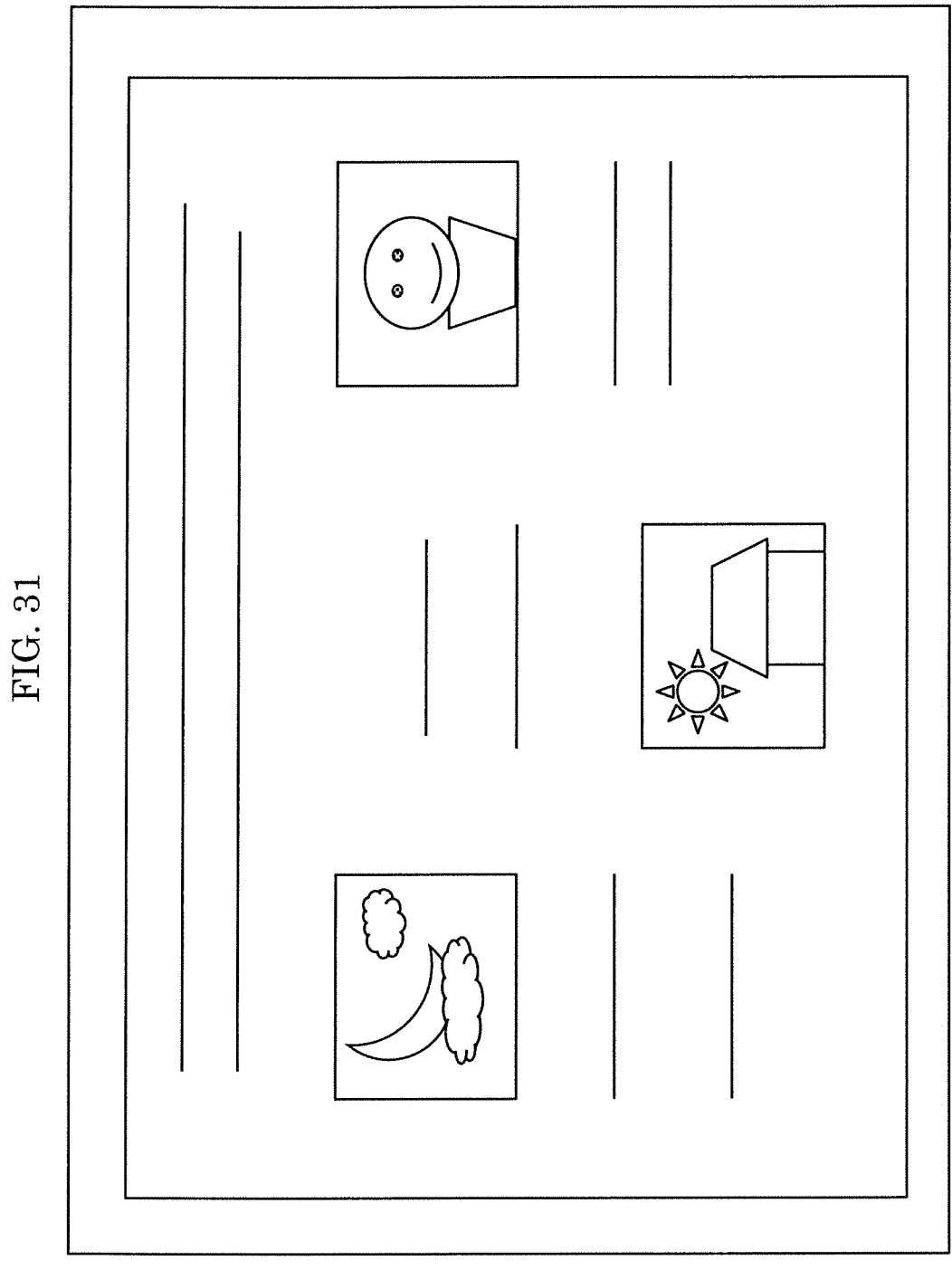
FIG. 31 illustrates an example of a display screen of a web page.
Figure 32:
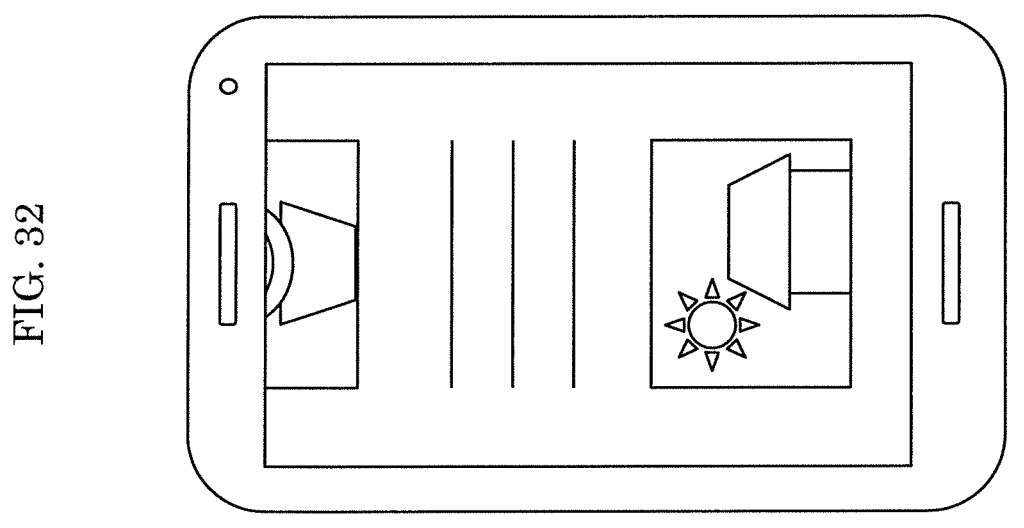

FIG. 31 illustrates an example of a display screen of a web page on, for example, computer ex111. FIG. 32 illustrates an example of a display screen of a web page on, for example, smartphone ex115. As illustrated in FIG. 31 and FIG. 32, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

[Autonomous Driving]

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is updated.

With this, in content providing system ex100, the client can receive, decode, and reproduce, in real time, encoded information transmitted by the user.

[Streaming of Individual Content]

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server-either when prompted or automatically-edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person. Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture, and the head region may be replaced with another image as the person moves.

Moreover, since there is a demand for real-time viewing of content produced by individuals, which tends to be small in data size, the decoder first receives the base layer as the highest priority and performs decoding and reproduction, although this may differ depending on bandwidth. When the content is reproduced two or more times, such as when the decoder receives the enhancement layer during decoding and reproduction of the base layer and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

Other Usage Examples

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoder (image encoder) or the moving picture decoder (image decoder) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

[Hardware Configuration]

Figure 33:
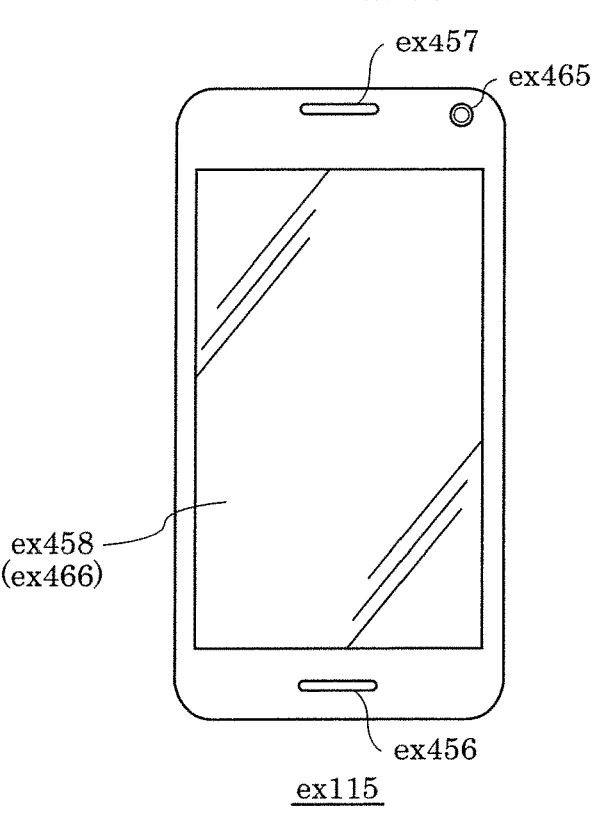
FIG. 33 illustrates an example of a smartphone.
Figure 34:
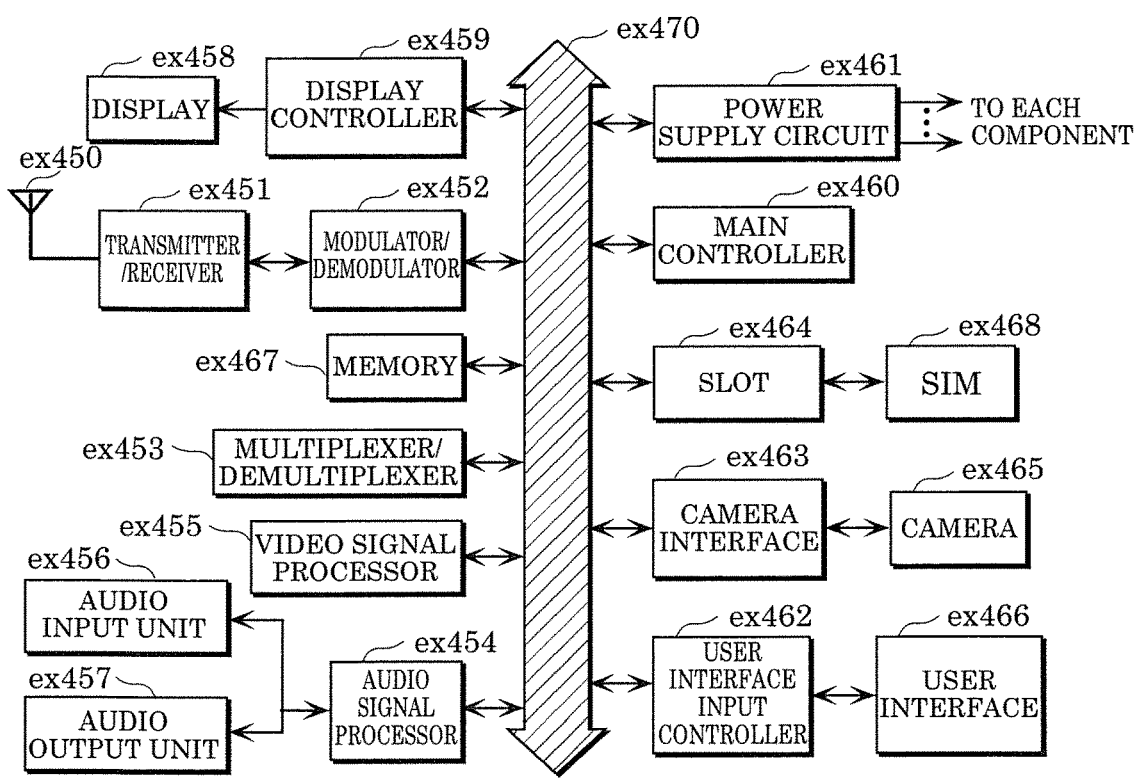
FIG. 34 is a block diagram illustrating a configuration example of a smartphone.

FIG. 33 illustrates smartphone ex115. FIG. 34 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoder and a decoder; a transmitter terminal including only an encoder; and a receiver terminal including only a decoder. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly, a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to, for example, television receivers, digital video recorders, car navigation systems, mobile phones, digital cameras, digital video cameras, teleconference systems, or electronic mirrors, etc.

What is claimed is:

1. An encoder comprising:
a processor; and
memory,
wherein, using the memory, the processor:
   derives a residual signal of a current block by subtracting a prediction signal from an input signal;
   determines an intra prediction mode used for the current block;
   performs a primary transform on the residual signal, using a primary transform basis, to generate first transform coefficients;
   when the primary transform basis is different from predetermined transform bases, performs a quantization on the first transform coefficients without performing a secondary transform;
   when the primary transform basis is included in the predetermined transform bases, (i) performs a secondary transform on the first transform coefficients, using a secondary transform basis selected from among one or more candidate secondary transform bases, to generate second transform coefficients, and (ii) performs a quantization on the second transform coefficients; and
   generates a bitstream by encoding a result of the quantization,
   wherein the secondary transform is performed on a part of the first transform coefficients generated by the primary transform, and
   wherein the secondary transform basis is selected based on the intra prediction mode and a size of the current block.

2. A decoder comprising:
a processor; and
memory,
wherein, using the memory, the processor:
   determines an intra prediction mode used for a current block;
   determines an inverse primary transform basis used for an inverse primary transform;

performs an inverse quantization on quantized coefficient of the current block to generate second transform coefficients;
   when the inverse primary transform basis is different from predetermined inverse transform bases, performs the inverse primary transform on the second transform coefficients using the inverse primary transform basis without performing an inverse secondary transform, to generate a residual signal of the current block; and
   when the inverse primary transform basis is included in the predetermined inverse transform bases, (i) performs an inverse secondary transform on the second transform coefficients, using an inverse secondary transform basis selected from among one or more candidate inverse secondary transform bases, to generate first transform coefficients and (ii) performs the inverse primary transform on the first transform coefficients, using the inverse primary transform basis, to generate a residual signal of the current block,
   wherein the inverse secondary transform is performed on a part of the second transform coefficients generated by the inverse quantization, and
   wherein the inverse secondary transform basis is selected based on the intra prediction mode and a size of the current block.

3. An encoding method comprising:
deriving a residual signal of a current block by subtracting a prediction signal from an input signal;
determining an intra prediction mode used for the current block;
performing a primary transform on the residual signal, using a primary transform basis, to generate first transform coefficients;
when the primary transform basis is different from predetermined transform bases, performing a quantization on the first transform coefficients without performing a secondary transform;
when the primary transform basis is included in the predetermined transform bases, (i) performing a secondary transform on the first transform coefficients, using a secondary transform basis selected from among one or more candidate secondary transform bases, to generate second transform coefficients, and (ii) performing a quantization on the second transform coefficients; and
generating a bitstream by encoding a result of the quantization,
wherein the secondary transform is performed on a part of the first transform coefficients generated by the primary transform, and
wherein the secondary transform basis is selected based on the intra prediction mode and a size of the current block.

4. A decoding method comprising:
determining an intra prediction mode used for a current block;
determining an inverse primary transform basis used for an inverse primary transform;
performing an inverse quantization on quantized coefficient of the current block to generate second transform coefficients;
when the inverse primary transform basis is different from predetermined inverse transform bases, performing the inverse primary transform on the second transform coefficients using the inverse primary transform basis without performing an inverse secondary transform, to generate a residual signal of the current block; and when the inverse primary transform basis is included in the predetermined inverse transform bases, (i) performing an inverse secondary transform on the second transform coefficients, using an inverse secondary transform basis selected from among one or more candidate inverse secondary transform bases, to generate first transform coefficients and (ii) performing the inverse primary transform on the first transform coefficients, using the inverse primary transform basis, to generate a residual signal of the current block, wherein the inverse secondary transform is performed on a part of the second transform coefficients generated by the inverse quantization, and wherein the inverse secondary transform basis is selected based on the intra prediction mode and a size of the current block.

* * * * *